(12) United States Patent
Matsumoto et al.

(10) Patent No.: US 10,940,710 B2
(45) Date of Patent: Mar. 9, 2021

(54) IMAGE FORMING APPARATUS

(71) Applicant: FUJI XEROX CO., LTD., Tokyo (JP)

(72) Inventors: Masashi Matsumoto, Kanagawa (JP); Hiroaki Awano, Kanagawa (JP); Yutaka Nobe, Kanagawa (JP); Takuya Makita, Kanagawa (JP); Naoto Terao, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/794,821

(22) Filed: Feb. 19, 2020

(65) Prior Publication Data
US 2020/0180339 A1 Jun. 11, 2020

Related U.S. Application Data

(62) Division of application No. 16/113,609, filed on Aug. 27, 2018, now Pat. No. 10,603,945.

(30) Foreign Application Priority Data

Mar. 22, 2018 (JP) .............................. JP2018-054344
Mar. 22, 2018 (JP) .............................. JP2018-054349
Mar. 22, 2018 (JP) .............................. JP2018-054354

(51) Int. Cl.
*B31F 5/02* (2006.01)
*B42C 1/12* (2006.01)
(Continued)

(52) U.S. Cl.
CPC ................ *B42C 1/12* (2013.01); *B31F 5/001* (2013.01); *B31F 5/02* (2013.01); *B65H 37/04* (2013.01); *B65H 43/00* (2013.01); *B31F 2201/00* (2013.01); *B31F 2201/0702* (2013.01); *B31F 2201/0756* (2013.01); *B31F 2201/0779* (2013.01); *B65H 2301/43828* (2013.01);
(Continued)

(58) Field of Classification Search
CPC .... B31F 1/07; B31F 5/001; B31F 5/02; B31F 2201/0702; B31F 2201/0756; B31F 2201/0779; B65H 37/04; B65H 43/00; B65H 2301/43828; B65H 2301/51616; G03G 15/6544; G03G 2215/00852
USPC ........................................... 270/58.07, 58.09
See application file for complete search history.

(56) References Cited

U.S. PATENT DOCUMENTS 7,037,406 B2   5/2006   Kershaw et al.
7,326,322 B2   2/2008   Ruthven et al.
(Continued)

FOREIGN PATENT DOCUMENTS

JP   2010-189101 A   9/2010
JP   2013-040024 A   2/2013
(Continued)

OTHER PUBLICATIONS

Sep. 13, 2019 Office Action issued in U.S. Appl. No. 16/113,609.

Primary Examiner — Leslie A Nicholson, III
(74) Attorney, Agent, or Firm — Oliff PLC

(57) ABSTRACT

An image forming apparatus includes: a needleless binding device configured to form a recessed or raised impression as a needleless binding part by performing needleless binding on a bundle of sheets; an environment sensor; and a controller configured to perform, based on a value detected by the environment sensor, control to display a confirmation image requesting a user to make confirmation on the needleless binding prior to execution of the needleless binding.

3 Claims, 51 Drawing Sheets

(51) Int. Cl.
*B65H 37/04* (2006.01)
*B31F 5/00* (2006.01)
*B65H 43/00* (2006.01)
*G03G 15/00* (2006.01)

(52) U.S. Cl.
CPC ............ *B65H 2301/51616* (2013.01); *G03G 15/6544* (2013.01); *G03G 2215/00852* (2013.01)

(56) References Cited

U.S. PATENT DOCUMENTS

| | | |
|---|---|---|
| 7,799,176 B2 | 9/2010 | Schulz |
| 7,857,941 B2 | 12/2010 | Ruthven et al. |
| 9,126,794 B2 | 9/2015 | Abe et al. |
| 9,259,894 B2 | 2/2016 | Abe et al. |
| 10,060,062 B2 | 8/2018 | Valle et al. |
| 2013/0214470 A1 | 8/2013 | Yokomizo |
| 2014/0339754 A1 | 11/2014 | Abe et al. |
| 2015/0239587 A1 | 8/2015 | Abe |
| 2015/0350469 A1 | 12/2015 | Kanamoto |

FOREIGN PATENT DOCUMENTS

| | | |
|---|---|---|
| JP | 2013-170067 A | 9/2013 |
| JP | 2014-091249 A | 5/2014 |
| JP | 2014-226799 A | 12/2014 |
| JP | 2014-240126 A | 12/2014 |
| JP | 2015-001702 A | 1/2015 |
| JP | 2015-013386 A | 1/2015 |
| JP | 2015-227038 A | 12/2015 |

FIG.10

CONFIRMATION BEFORE NEEDLELESS BINDING

UNDER THE CURRENT ENVIRONMENT, IF AN IMAGE IS INCLUDED IN A BINDING TARGET PORTION, THERE WILL BE A POSSIBILITY THAT THE HOLDING FORCE OF THE BINDING PART IS WEAKENED. PLEASE CONFIRM THE PRESENCE OR ABSENCE OF AN IMAGE. IF THERE IS AN IAMGE, IMAGE ERASING IS RECOMMENDED.

☐ IMAGE ERASING

| | 320 ↙ | 324 |
|---|---|---|
| 322 | BINDING TYPE A (LEFT, TWO POINTS, VERTICAL) | IMAGE ERASING TYPE A |
| | ... | ... |
| | BINDING TYPE B (LEFT UPPER, ONE POINT, INCLINED) | IMAGE ERASING TYPE B |
| | ... | ... |
| | BINDING TYPE C (UPPER, TWO POINTS, HORIZONTAL) | IMAGE ERASING TYPE C |
| | ... | ... |

FIG.15

| SHEET LIST SUITABLE FOR NEEDLE BINDING | |
|---|---|
| NORMAL ENVIRONMENT | LOW HUMIDITY ENVIRONMENT |
| SHEET AAAA | SHEET AAAA |
| SHEET BBBB | SHEET BBBB |
| SHEET CCCC | |
| SHEET DDDD | |
| ... | |

FIG.32

| ENVIRONMENT 364 | SHEET QUALITY (TEARING HARDNESS) 366 | OVERALL EVALUATION (EVALUATION OF STRETCHABILITY UNDER THE CURRENT ENVIRONMENT) 368 | SPEED MODE TO BE APPLIED 370 |
|---|---|---|---|
| HIGH HUMIDITY | HIGH | HIGH | HIGH SPEED MODE |
| HIGH HUMIDITY | LOW | MEDIUM | NORMAL SPEED MODE |
| LOW HUMIDITY | HIGH | MEDIUM | NORMAL SPEED MODE |
| LOW HUMIDITY | LOW | LOW | LOW SPEED MODE |

FIG.35

NON-APPLICABLE DETERMINATION CONDITION
(A) OFF OF OPERATION MODE AUTOMATIC SELECTION FUNCTION BY USER
(B) SPECIFIC TYPE OF SHEET (E.G., SHEET CONTAINING MUCH ASH)
(C) EXISTENCE OF IMAGE IN BINDING TARGET PORTION

FIG.37

| ENVIRONMENT ~450 | OPERATION MODE ~452 | STANDARD BINDING LOAD ~454 |
|---|---|---|
| LOW HUMIDITY | NORMAL MODE | 5000N |
| HIGH HUMIDITY | PAPER DUST REDUCTION MODE | 4500N |

FIG.39

| SITUATION 456 | | OPERATION MODE 458 | BINDING LOAD (STANDARD VALUE) 460 |
|---|---|---|---|
| LOW HUMIDITY | MOISTURE-UNCONTROLLED STATE | NORMAL MODE | 5000N |
| | MOISTURE-CONTROLLED STATE | | 5000N |
| HIGH HUMIDITY | MOISTURE-UNCONTROLLED STATE | | 5000N |
| | MOISTURE-CONTROLLED STATE | PAPER DUST REDUCTION MODE | 4500N |

FIG.41

| SITUATION | | | OPERATION MODE 465 | STANDARD BINDING LOAD 466 |
|---|---|---|---|---|
| LOW HUMIDITY | MOISTURE-UNCONTROLLED STATE | PLAIN PAPER | NORMAL MODE 1 | 5500N |
| | | RECYCLED PAPER | NORMAL MODE 2 | 5000N |
| | MOISTURE-CONTROLLED STATE | PLAIN PAPER | NORMAL MODE 3 | 5500N |
| | | RECYCLED PAPER | NORMAL MODE 4 | 5000N |
| HIGH HUMIDITY | MOISTURE-UNCONTROLLED STATE | PLAIN PAPER | PAPER DUST REDUCTION MODE 1 | 4800N |
| | | RECYCLED PAPER | PAPER DUST REDUCTION MODE 2 | 4500N |
| | MOISTURE-CONTROLLED STATE | PLAIN PAPER | PAPER DUST REDUCTION MODE 3 | 4500N |
| | | RECYCLED PAPER | PAPER DUST REDUCTION MODE 4 | 4200N |

SHEET RECOMMENDED WHEN NEEDLELESS BINDING IS PERFORMED UNDER THE CURRENT ENVIRONMENT IS AS FOLLOWS. — 476

SHEET AA
SHEET BB
← 478

WHEN NEEDLELESS BINDING IS PERFORMED UNDER THE CURRENT ENVIRONMENT, IT IS RECOMMENDED TO EXECUTE THE FOLLOWING PROCESS. IF THE PROCESS IS REQUIRED, CHECK IT.

☐ IMAGE ERASING PROCESS

OK

S44

IMAGE FORMING APPARATUS

CROSS-REFERENCE TO RELATED APPLICATIONS

This application a Divisional application of U.S. patent application Ser. No. 16/113,609, filed Aug. 27, 2018 which in turn is based on and claims priority under 35 USC 119 from Japanese Patent Application No. 2018-054354 filed Mar. 22, 2018, Japanese Patent Application No. 2018-054344 filed Mar. 22, 2018, and Japanese Patent Application No. 2018-054349 filed Mar. 22, 2018.

BACKGROUND

(i) Technical Field

The present disclosure relates to an image forming apparatus.

(ii) Related Art

An image forming apparatus includes, for example, an image forming unit and a post-processing unit. The post-processing unit may be incorporated in the image forming unit. The image forming unit is an apparatus for forming an image on a sheet as a recording material. The post-processing unit is also called a finisher and applies a post-processing to a sheet or a bundle of sheets on which an image has been formed. Needleless binding (or needleless staple) and needle binding (or needle staple) are known as a post-processing. There are several methods for the needleless binding including a crimping method as a representative one. The crimping method is a method of pinching a bundle of sheets between upper and lower tooth rows to form a recessed or raised impression as a needleless binding part. In the needleless binding part, an entanglement of fibers occurs between sheets, which bind the sheets with each other.

JP-A-2013-170067 discloses a technique for dividing and binding a bundle of sheets to be bound with no needle by a predetermined unit or less when the bundle of sheets includes a large number of sheets.

JP-A-2015-001702 discloses a technique for selecting needle binding when the number of sheets to be subjected to needleless binding is equal to or larger than a predetermined number of sheets.

JP-A-2015-227038 discloses a technique for displaying information on sheets or a bundle of sheets that can be bound with no needle.

JP-A-2014-240126 discloses a technique for controlling a pressing force in accordance with the sheet moisture content in the crimping type needleless binding.

JP-A-2014-226799 discloses a technique for varying the pressing force holding time according to humidity in the crimping type needleless binding.

JP-A-2013-040024 discloses a technique for changing an operation speed according to, for example, humidity in needleless binding. However, the disclosed technique is a die cutting method and is not a crimping method that causes entanglement of fibers.

JP-A-2014-091249 discloses a technique for removing paper dust jammed between teeth in the crimping type needleless binding by blank beating. Further, JP-A-2014-091249 discloses a technique for controlling a pressing force according to the sheet moisture content in the crimping type needleless binding.

Needleless binding of a bundle of sheets forms a recessed or raised impression as a needleless binding part. The quality of the needleless binding part varies depending on the environment in which the bundle of sheets is placed. For example, in a low-humidity environment, there is a tendency that the holding force of the binding part (binding force between papers) decreases as compared to a high-humidity environment. There is a demand for preventing the quality of the needleless binding part from being contrary to the user's expectation.

In the crimping method, a recessed or raised impression is formed as a binding part on a bundle of sheets. When a defective point such as a rupture or a tear occurs in the binding part, the holding force of the binding part (binding force between papers) decreases. Therefore, it is required to prevent such defective part from occurring. In particular, there is a demand for preventing a defective point from occurring due to an excessive speed of binding operation under a specific environment. Meanwhile, it is also required to shorten the binding processing time as long as such a problem does not occur.

When a recessed or raised impression is formed as a binding part by pinching a bundle of sheets between a pair of tooth rows, paper dust may remain, depending on situations, in one or more spaces (i.e., valleys) between teeth and may gradually grow to a large size. When paper dust clogging which cannot be ignored occurs in any interdental space, a proper binding process cannot be performed. As a result, the holding force of the binding part (binding force between papers) is reduced. Or, such paper dust clogging may give an excessive load to a mechanism forming the binding part. Therefore, it is required to apply the operation conditions under which paper dust clogging hardly occurs. However, when such operation conditions are uniformly applied, depending on a situation, the operation conditions may be excessive countermeasures, which may cause another problem (e.g., deterioration of the quality of the binding part).

SUMMARY

Aspects of non-limiting embodiments of the present disclosure relate to providing a technique for allowing a user to recognize a possible situation where the quality of a needleless binding part is likely to deteriorate depending on the environment or giving the user an opportunity to avoid such a situation, prior to execution of needleless binding.

Aspects of non-limiting embodiments of the present disclosure also relate to providing a technique for adapting the binding operation to the stretchability of sheets when a recessed or raised impression is formed as a binding part on a bundle of sheets.

Aspects of non-limiting embodiments of the present disclosure further relate to providing a needleless binding apparatus that can perform binding operation with less paper dust clogging depending on situations when forming a recessed or raised impression as a binding part by pinching a bundle of sheets between a pair of tooth rows.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an image forming apparatus including: a needleless binding device configured to form a recessed or raised impression as a needleless binding part by performing needleless binding on a bundle of sheets; an environment sensor; and a controller configured to perform, based on a value detected by the environment sensor, control to display a confirmation image requesting a user to make confirmation on the needleless binding prior to execution of the needleless binding.

BRIEF DESCRIPTION OF THE DRAWINGS

Exemplary embodiments of the present disclosure will be described in detail based on the following figures, wherein:

FIG. 10 is a view illustrating a confirmation image displayed in the second operation example;

FIG. 11 is a view illustrating an example of a management table;

FIG. 15 is a view illustrating an example of a list of needleless binding compatible sheets;

FIG. 32 is a view illustrating a speed mode determination condition in the second operation example;

FIG. 35 is a view for explaining an inapplicable determination condition;

FIG. 37 is a view illustrating a first example of an operation mode selection method;

FIG. 39 is a view illustrating a second example of the operation mode selection method;

FIG. 41 is a view illustrating a third example of the operation mode selection method;

FIG. 46 is a view illustrating a first display example;

FIG. 48 is a view illustrating a second display example;

DETAILED DESCRIPTION

First Exemplary Embodiment

Hereinafter, a first exemplary embodiment of the present disclosure will be described with reference to the accompanying drawings.

(1) Image Forming Apparatus

Figure 1:
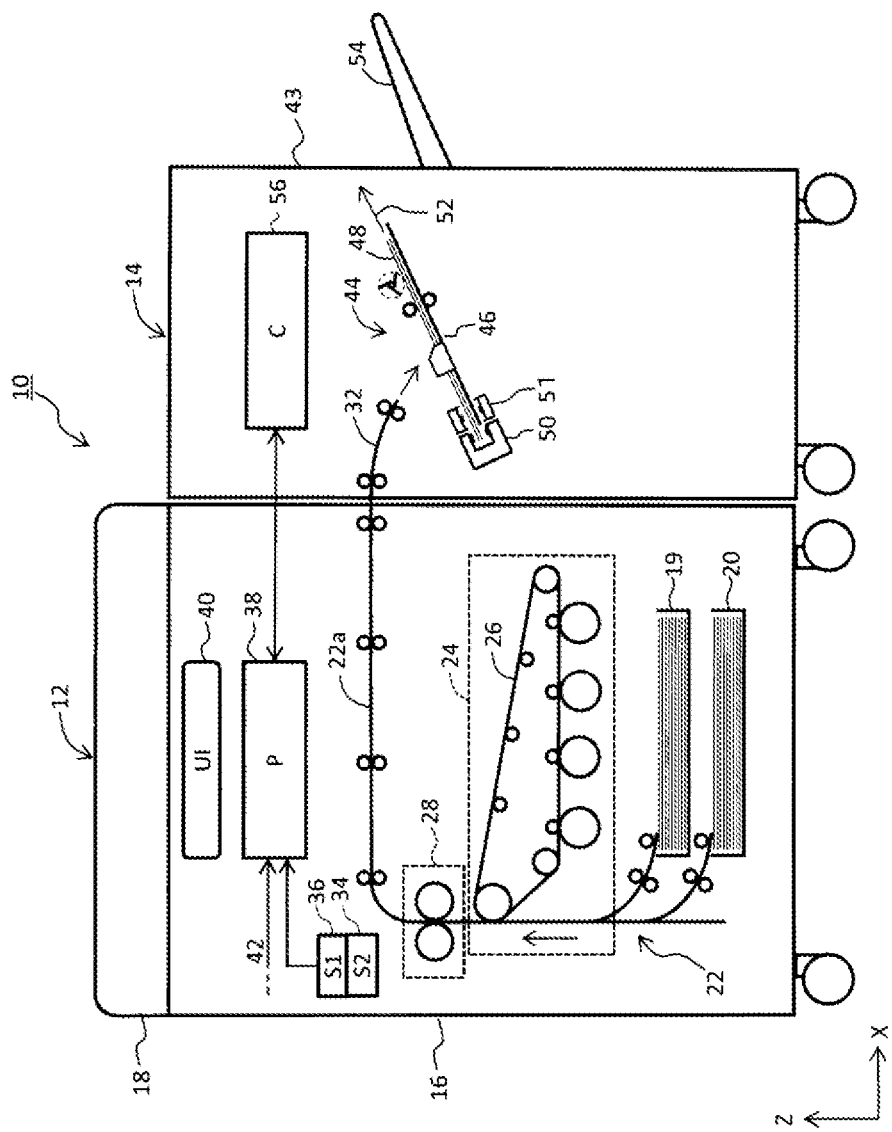
FIG. 1 is a schematic view illustrating an image forming apparatus according to an exemplary embodiment.

FIG. 1 illustrates a schematic configuration of an image forming apparatus according to a first exemplary embodiment. In the figure, the X direction is a first horizontal direction, and the Z direction is a vertical direction (perpendicular direction). A direction orthogonal to the X direction and the Z direction corresponds to the Y direction as a second horizontal direction.

The illustrated image forming apparatus 10 is a multifunctional apparatus functioning as, for example, a copying machine, a printer, and a scanner, which is also referred to as a multifunctional machine. The image forming apparatus 10 includes an image forming unit 12 and a post-processing unit 14 interconnected in the X direction. The image forming unit 12 is to form an image on a sheet as a recording material. The post-processing unit 14 is to perform post-processing on the sheet on which the image has been formed. In the illustrated configuration example, the post-processing unit 14 has a function of performing needleless binding (needleless staple) and needle binding (needle staple). Besides these bindings, for example, drilling (punching) and center folding are known as the post-processing. In the post-processing unit 14, one or plural post-processing other than binding may be executed. Plural post-processing may be executed in the image forming unit 12.

In the illustrated example, the image forming unit 12 includes a main body part 16 and an upper part 18. The upper part 18 is provided so as to be opened/closed with respect to the main body part 16 and equipped with an automatic document feeder (ADF) therein. The main body portion 16 includes a housing in which components to be described below are accommodated.

Plural stacked sheets are accommodated in each of sheet feeding cassettes (sheet feeding trays) 19 and 20. Each of the sheet feeding cassettes 19 and 20 is provided to be drawable. Sheets to be sequentially taken out from any of the sheet feeding cassettes 19 and 20 are transported along a sheet transport path 22. A sheet inverter is provided on the sheet transport path 22, as necessary. In addition, the upstream side and the downstream side in the sheet transport path 22 are defined relative to the flow of a sheet.

The image forming unit 12 illustrated in FIG. 1 includes an intermediate transfer unit 24. The intermediate transfer unit 24 includes a rotating intermediate transfer belt 26. Plural toner images corresponding to plural colors are transferred on the intermediate transfer belt 26 (primary transfer) by the image forming unit. The image forming unit includes, for example, plural photoconductor drums corresponding to the plural colors. The plural toner images on the intermediate transfer belt 26 are transferred onto a sheet (secondary transfer). The sheet after the secondary transfer is sent to a fixing unit 28 where a fixing process is performed. The fixing process temperature can be changed according to a selected image quality mode. The sheet after the image formation is sent to the downstream side of the sheet transport path 22. For example, a post-processing part may be provided in a middle portion 22a. The post-processing part may be assembled outside the housing. The sheet after the image formation is delivered from the image forming unit 12 to the post-processing unit 14. An image forming method other than the above-mentioned image forming method may be adopted. When image erasing to be described later is instructed, a portion of the image is erased in an image processing process and an image forming process according to the image erasing condition and the image after the image erasing process is then formed on the sheet. Such a process is executed by a controller 38 which will be described later.

The controller 38 is provided in the main body part 16. The controller 38 includes, for example, a processor that operates according to a program, and functions as a control unit. The controller 38 controls the operation of each constituent element included in the image forming apparatus 10. A user interface (UI) 40 is connected to the controller 38. The UI 40 is configured by, for example, a liquid crystal display with a patch panel. A necessary operation button (virtual button) and, for example, a message are displayed on the screen of the UI 40. Image processing conditions and post-processing conditions are designated by a user using the UI 40. For example, needleless binding is designated by the user using the UI 40. When a personal computer (PC) is connected to the image forming apparatus 10 via a network, image processing conditions and post-processing conditions may be designated on the PC. An image to be displayed on, for example, the UI 40 is generated by the controller 38.

As will be described later, the controller 38 controls the operation of the binding mechanism 44 that performs the needleless binding and the needle binding via a control board 56 in the post-processing unit 14. A unit for controlling the binding mechanism 44 may be provided in the post-processing unit 14 or may be provided across the image forming unit 12 and the post-processing unit 14.

Values detected by a temperature sensor 34 and a humidity sensor 36 constituting an environment sensor unit are each input to the controller 38. In the illustrated configuration example, the temperature sensor 34 and the humidity sensor 36 are provided in the vicinity of the fixing unit 28, but may be provided at other positions inside or outside the housing. Alternatively, a detected environmental value may be input from the outside (see reference numeral 42). For example, a sensor for measuring sheet quality or type and a sensor for measuring sheet moisture content may be provided, and output signals from these sensors may be used under the control of the controller 38.

The post-processing unit 14 will be described. The post-processing unit 14 includes a housing 43 in which a binding mechanism 44 is provided. The sheet delivered from the image forming unit 12 is transported along a sheet transport path 32. In the case where needleless binding or needle binding is designated as the post-processing, the accommodated sheet is sent to the binding mechanism 44.

The binding mechanism 44 has a function of performing needleless binding by a crimping method and a function of performing needle binding using a staple needle. In the former crimping method, a recessed or raised impression is formed as a needleless binding part on a bundle of sheets. In the exemplary embodiment, the binding mechanism 44 has a high binding ability to form a needleless binding part for a bundle of sheets including, for example, ten or a dozen sheets in the needleless binding. In order to align the sheets, the binding mechanism 44 is provided in an inclined state. The binding mechanism 44 includes an inclined loading plate 46, a needleless binding device 50 provided on the lower end side thereof, and a needle binding device 51 provided on the lower end side of the loading plate 46. A bundle 48 of sheets is placed on the loading plate 46, and the needleless binding device 50 performs needleless binding on the end portion of the bundle 48 of sheets, or the needle binding device 51 performs needle binding. According to the needleless binding, a recessed or raised impression is formed as a needleless binding part as already described. Sheets are coupled with each other by the binding effect of the needleless binding part. The binding effect is caused by entanglement of sheet fibers between the sheets, and the extent thereof or the possibility of an occurrence of breakage in the needleless binding part depends on the environment, particularly on humidity. Therefore, as will be described in detail later, information is provided to the user prior to needleless binding depending on the environment. A binding part may be formed in a portion other than the end portion of the bundle of sheets.

The post-processing unit 14 includes the control board 56. The control board 56 includes, for example, two PWM (Pulse Width Modulation) controllers for supplying a drive signal to a motor of the needleless binding device 50 and a motor of the needle binding device 51. The controller 38 in the image forming unit 12 controls the operations of the two motors via the control board 56. Further, the controller 38 controls operations of various movable parts of the binding mechanism 44. After the post-processing, the bundle of sheets is discharged onto a discharge tray 54.

(2) Configuration and Operation of Binding Mechanism

Figure 2:
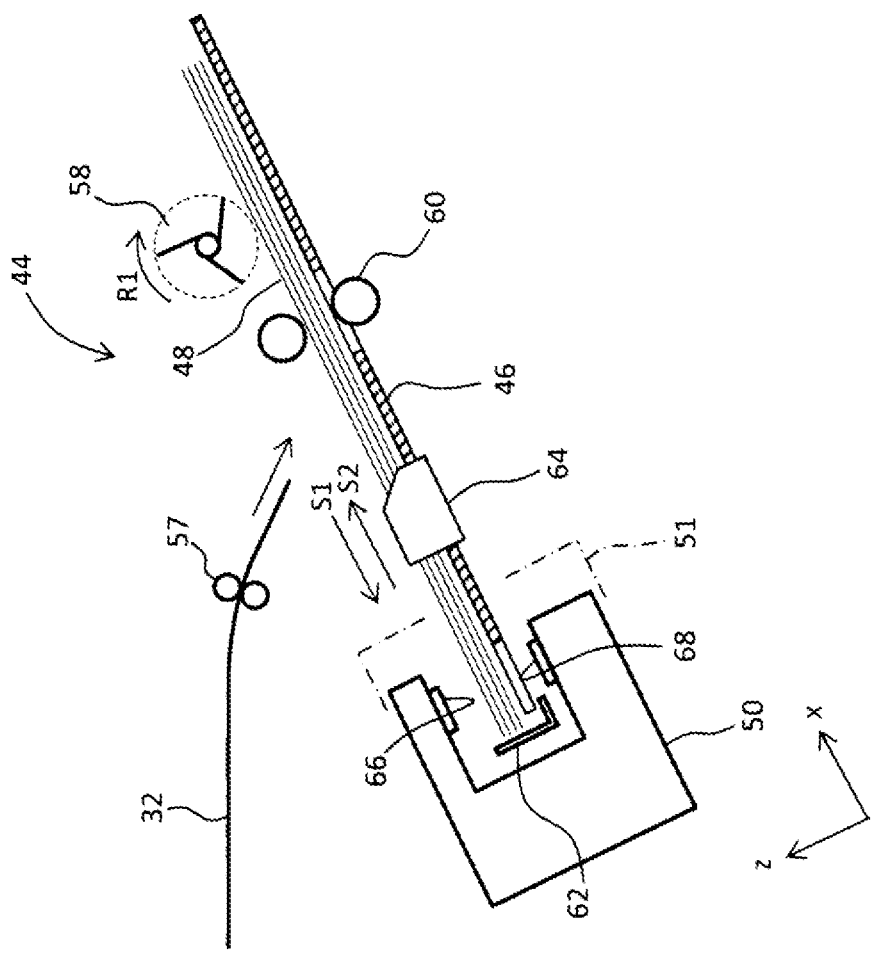
FIG. 2 is a schematic view illustrating a binding mechanism.

FIG. 2 illustrates a specific configuration of the binding mechanism 44. The illustrated configuration is an example, and various mechanisms may be adopted as the binding mechanism 44. In FIG. 2, the x direction is a direction in which a sheet advances and retracts on the loading plate 46 functioning as a tray, and the z direction is a direction perpendicular to the x direction, which is a direction orthogonal to the loading plate 46. The x direction and the z direction are rotated by a predetermined angle in the counterclockwise direction with respect to the X direction and the Z direction illustrated in FIG. 1. The direction orthogonal to the x direction and the z direction is the y direction, which coincides with the above-mentioned Y direction.

A pair of rollers 57 is provided in the vicinity of the downstream end of the sheet transport path 32, and sheets sequentially reeled out from the roller pair 57 are stacked on the loading plate 46. These sheets form a bundle 48 of sheets. In the needleless binding, the number of sheets constituting the bundle 48 of sheets is, for example, in a range of 2 to 10 and is designated in advance. The bundle 48 of sheets may be constituted by the larger number of sheets. In the needle binding, it is possible to bind the bundle 48 of sheets which is constituted by the number of sheets larger than the upper limit of needleless binding. Moreover, since a needle is used, the needle binding can usually obtain sufficient holding force regardless of the environment.

When aligning the bundle 48 of sheets, a paddle 58 rotates in the R1 direction, and a force in the x direction, that is, the Si direction, is exerted on each sheet by this rotation. An end guide 62 is provided in the vicinity of the end portion in the −x direction of the loading plate 46, and the position of each sheet in the x direction is aligned by collision of each sheet to the end guide 62. A tamper part 64 includes a pair of tamper members that press both ends of the bundle 48 of sheets in the y direction, and the position of each sheet in the y direction is aligned by the pair of tamper members moving towards each other. As a method of aligning the bundle 48 of sheets, a method other than the above-described method may be adopted.

In FIG. 2, the needleless binding device 50 is schematically represented with a slight exaggeration. In FIG. 2, the needle binding device 51 is conceptually illustrated by a one-dot chain line.

After the aligned state of the bundle 48 of sheets is formed, the needleless binding device 50 performs a needleless binding process on a portion selected on the bundle 48 of sheets. This also applies to the needle binding device 51. The needleless binding device 50 has a pair of tooth rows, specifically, an upper tooth row 66 and a lower tooth row 68, with the end portion of the bundle 48 of sheets pinched therebetween by a constant load. At that time, the intermeshing state of the upper tooth row 66 and the lower tooth row 68 is formed. Thereby, a recessed or raised impression is formed as a needleless binding part. After the execution of the needleless binding process, the bundle 48 of sheets is transported in the +x direction, that is, the S2 direction. At that time, a roller pair 60 holding the bundle 48 of sheets rotates.

Figure 3:
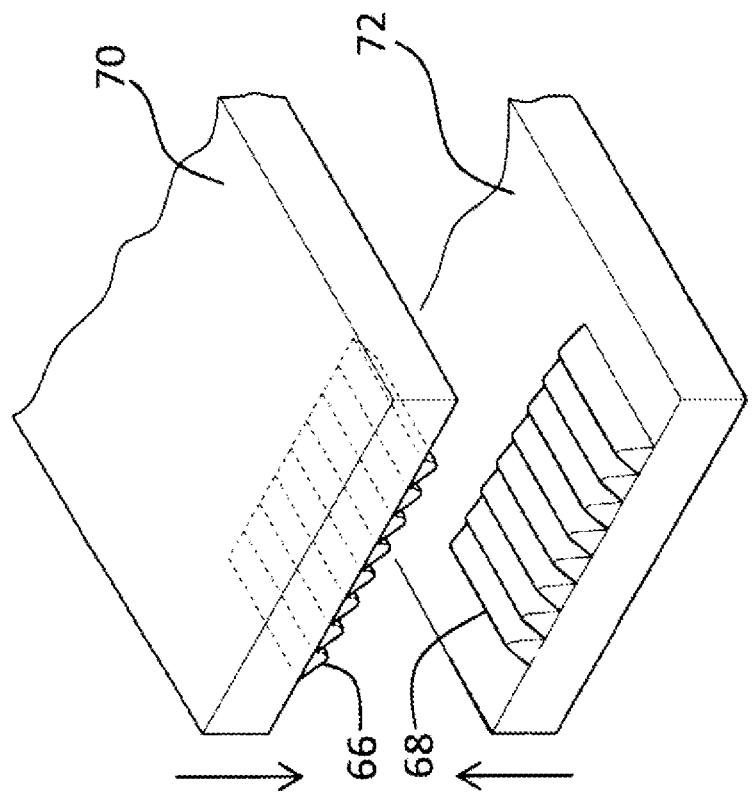
FIG. 3 is a perspective view illustrating a pair of tooth rows.

FIG. 3 schematically illustrates the main part of the needleless binding device. FIG. 3 illustrates the standby state before the needleless binding operation. The needleless binding device includes an upper movable base 70, a lower movable base 72, an upper tooth row 66, and a lower tooth row 68. The upper tooth row 66 is arranged downward on the lower surface of the upper movable base 70, and the lower tooth row 68 is arranged upward on the upper surface of the lower movable base 72. In the standby state, the upper movable base 70 and the lower movable base 72 are positioned at a distance from each other.

The upper movable base 70 and the lower movable base 72 move towards each other (binding operation) in a state in which the end portion of the bundle of sheets is sandwiched between the upper tooth row 66 and the lower tooth row 68. Thereby, an intermeshing state of the upper tooth row 66 and the lower tooth row 68, that is, a kind of collision state, occurs, and as a result, a needleless binding part is formed on the bundle of sheets. Thereafter, the upper movable base 70 and the lower movable base 72 move in a direction away from each other (return operation) to return to the standby state. This operation is repeated in the unit of needle-less binding part formation.

The upper tooth row 66 and the lower tooth row 68 have, for example, ten or a dozen teeth (projections). In the exemplary embodiment, the same is used as the upper tooth row 66 and the lower tooth row 68 in order to reduce the manufacturing cost and align the upper and lower teeth. The pair of tooth rows illustrated in FIG. 3 is merely an example, and various kinds of tooth rows can be used. Only one of the upper tooth row 66 and the lower tooth row 68 may be moved.

Figure 4:
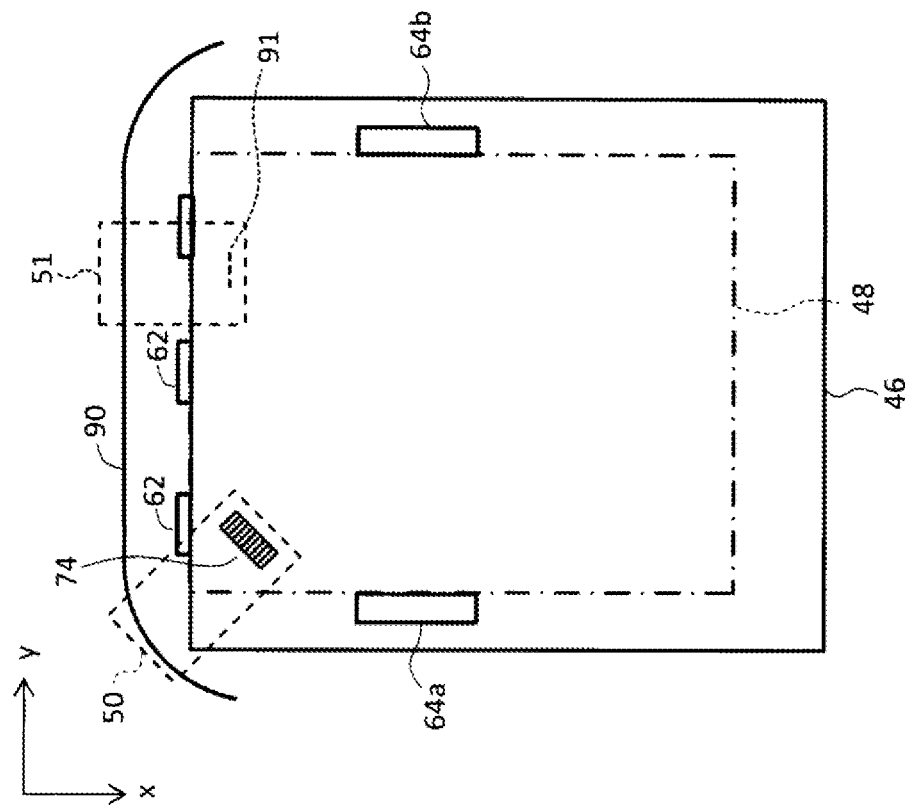
FIG. 4 is a view illustrating operations of a needleless binding device and a needle binding device.

FIG. 4 illustrates the upper surface of the loading plate 46. The bundle 48 of sheets after the alignment is placed on the loading plate 46. Both ends of the bundle 48 of sheets in the y direction are pressed by a pair of tamper members 64a and 64b. The end portion of the bundle 48 of sheets in the −x direction abuts against the end guide 62. In the illustrated configuration example, the needleless binding device 50 is movable along a rail 90 and performs a needleless binding operation at a designated location. In the illustrated configuration example, the needle binding device 51 is also movable along the rail 90 and performs a needle binding operation at a designated location. However, in FIG. 4, the rail 90 is conceptually illustrated.

For example, when forming the needleless binding part 74 with respect to the corner portion (upper left corner portion) of the bundle 48 of sheets, the needleless binding device 50 is set at an illustrated position, and the needleless binding is executed at that position. When the needle binding is executed by the needle binding device 51, plural sheets are bundled by a needle 91. In order to prevent physical interference between the needleless binding device 50 and the needle binding device 51, a mechanism for retracting either or both of them is provided. In a case where such a mechanism is not provided, the movement of the needleless binding device 50 and the needle binding device 51 is controlled so as to cause no interference.

The needle binding device 51 may be provided on the opposite side (lower side in FIG. 4) of the loading plate 46. Further, a needleless binding mechanism and a needle binding mechanism may be separately provided.

(3) Operation Control

Figure 5:
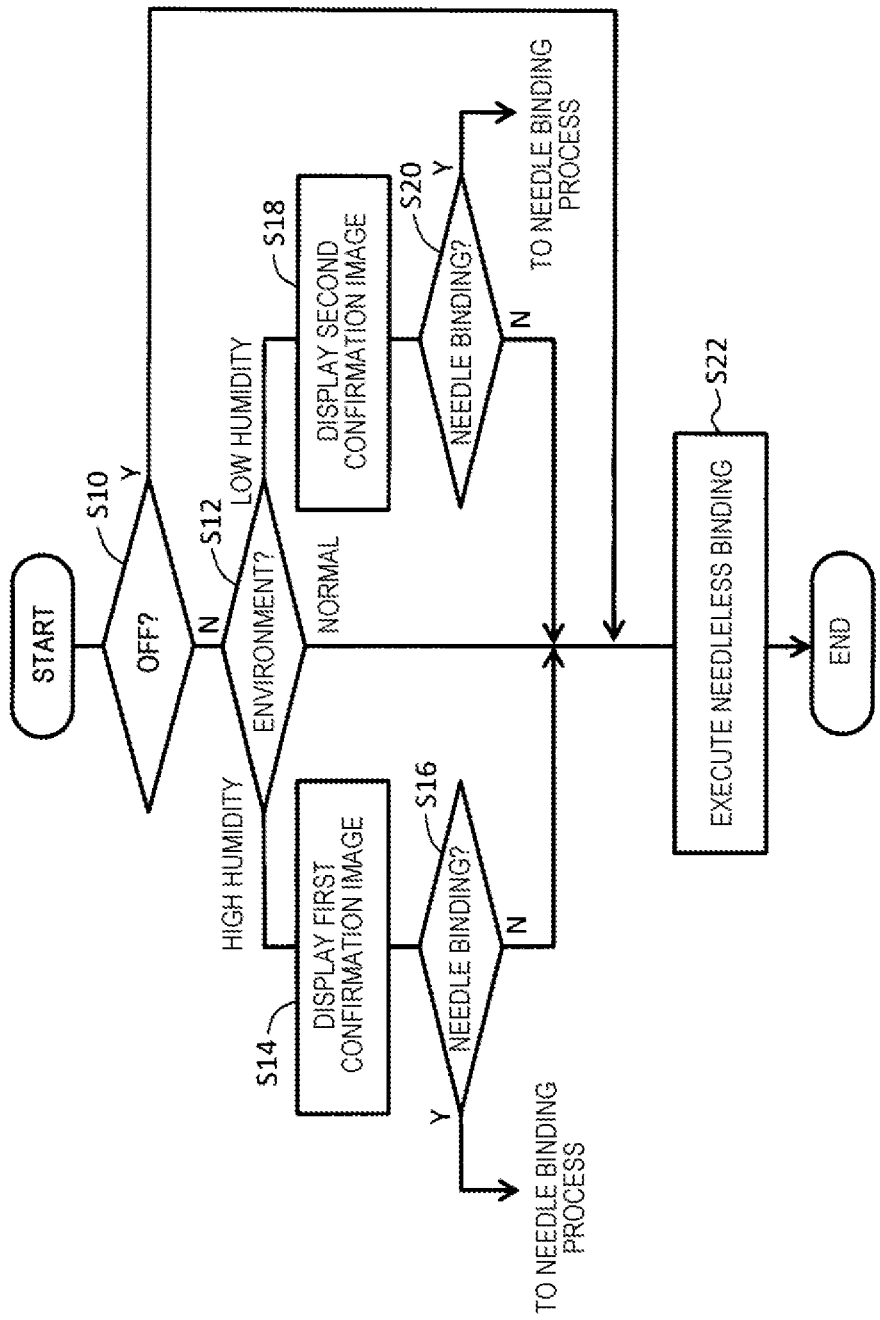
FIG. 5 is a flowchart illustrating a first operation example (first control example)

FIG. 5 illustrates a first operation example. A first control example executed by the controller will be described by way of explanation of the first operation example. The same or similar elements in the respective figures are denoted by the same reference numerals or process numbers, and explanation thereof will not be repeated.

For example, when a user instructs needleless binding on the UI, the process illustrated in FIG. 5 is started. In S10, it is determined whether or not a confirmation screen display function (main function) is turned off. When this function is turned off, the process proceeds to S22. When this function is not turned off, it is determined in S12 whether the current environment is a high-humidity environment, a normal environment or a low-humidity environment, based on a value detected by an environment sensor. In that case, for example, when the humidity detected by a humidity sensor is equal to or larger than an upper threshold value, it is determined that the environment is high humidity. When the humidity is equal to or larger than a lower threshold value and smaller than the upper threshold value, it is determined that the environment is normal. When the humidity is smaller than the lower threshold value, it is determined that the environment is low humidity. The determination may be made based on temperature or may be made based on temperature and humidity.

When it is determined in S12 that the environment is high humidity, a first confirmation image is displayed on the UI in S14. As will be exemplified later, the first confirmation image includes, for example, a description of a situation that may occur in the high-humidity environment, a message prompting a change to needle binding, and an operation element for changing a binding method. In S16, it is determined whether or not a change to needle binding has been instructed. When the change to needle binding has been instructed, a needle binding process is executed (this is a general one, and details thereof is not illustrated). When it is determined in S16 that the change to needle binding has not been instructed, the process proceeds to S22. When it is determined in S12 that the environment is normal, the process proceeds to S22.

Meanwhile, when it is determined in S12 that the environment is low humidity, a second confirmation image is displayed on the UI in S18. As will be exemplified later, the second confirmation image includes, for example, a description of a situation that may occur in the low-humidity environment, a message prompting a change to needle binding, and an operation element for changing a binding method. In S20, it is determined whether or not a change to needle binding has been instructed. When the change to needle binding has been instructed, a needle binding process is executed. When it is determined in S20 that the change to needle binding has not been instructed, the process proceeds to S22.

In S22, the needleless binding is executed. Even when the needleless binding is executed as a result in the high-humidity environment and the low-humidity environment, since the user is given an opportunity to recognize a situation that may occur when the needleless binding is executed prior to that, it can be avoided that the result of the needleless binding result is largely contrary to the expectation of the user. In addition, since the user is given an opportunity to change the method, it is possible to prevent the needleless binding from being executed wastefully. Even when the user does not recognize that the needleless binding is easily affected by the environment, according to the display of the confirmation image, it is possible to determine whether to maintain or change the binding method in consideration of, for example, the necessity of needleless binding and the magnitude of necessary holding force.

Each confirmation image may be displayed on a display other than the UI. For example, when designating post-processing on a PC screen, a confirmation image may be displayed on the screen. In the confirmation image, a message may be conveyed to the user by, for example, a symbol or an animation, instead of a text. Sound and light may be output together with the display.

Figure 6:
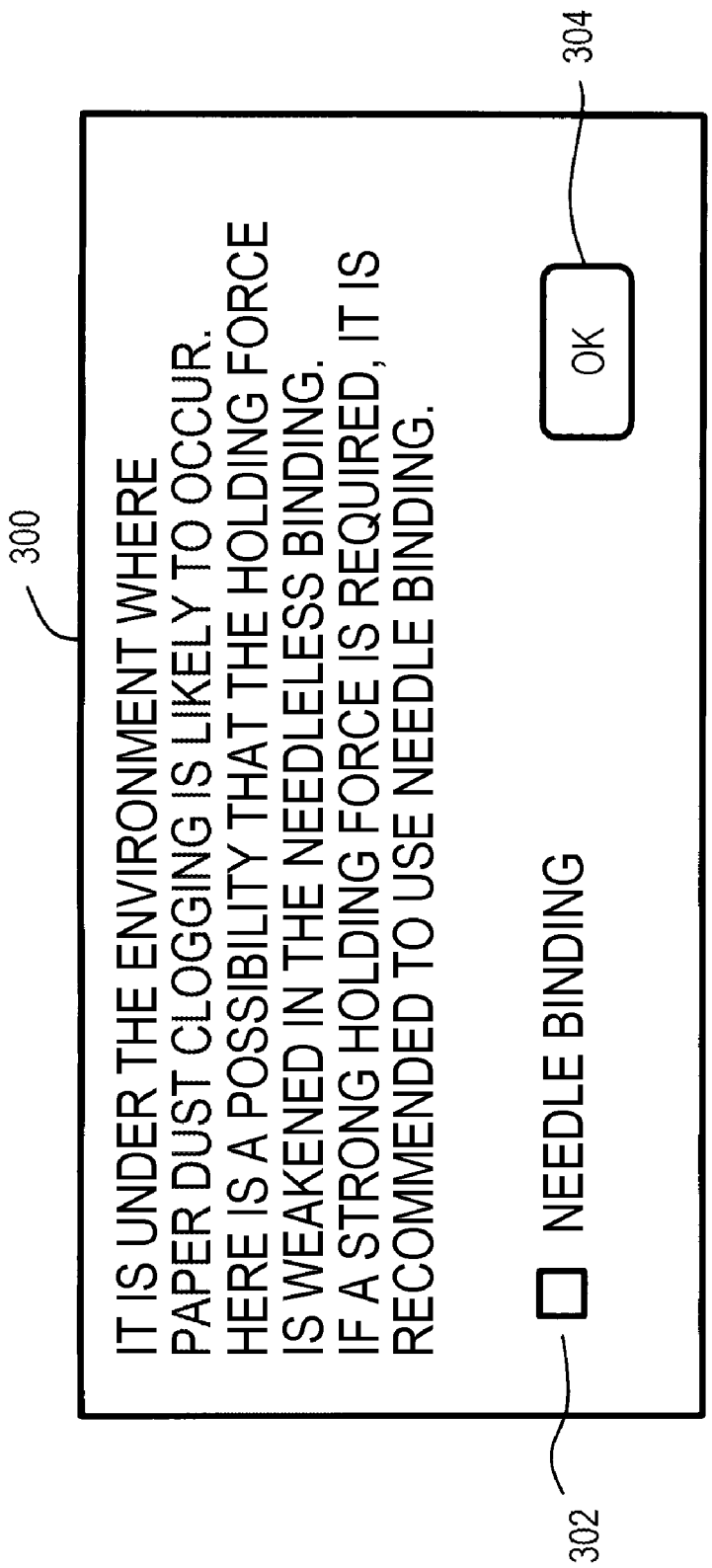
FIG. 6 is a view illustrating an example of a first confirmation image displayed in the first operation example.

FIG. 6 illustrates an example of the first confirmation image displayed in the high-humidity environment. The illustrated first confirmation image 300 includes a description of a situation that may occur when the needleless binding is executed in the high-humidity environment (paper dust clogging and decrease in holding force resulting therefrom). In addition, a message prompting selection of needle binding is included. Through the first confirmation image 300, it is possible for the user to recognize that strong holding force can be obtained by changing the binding method to the needle binding and that the above situation can be avoided. In the exemplary embodiment, the first confirmation image 300 further includes a check box 302 as an operation element for selecting needle binding, and further includes an OK button 304 for erasing the first confirmation image 300 and advancing the process. As an operation element, a button, an icon or the like may be displayed. The binding method may be changed by an operation of a physical button.

Figure 7:
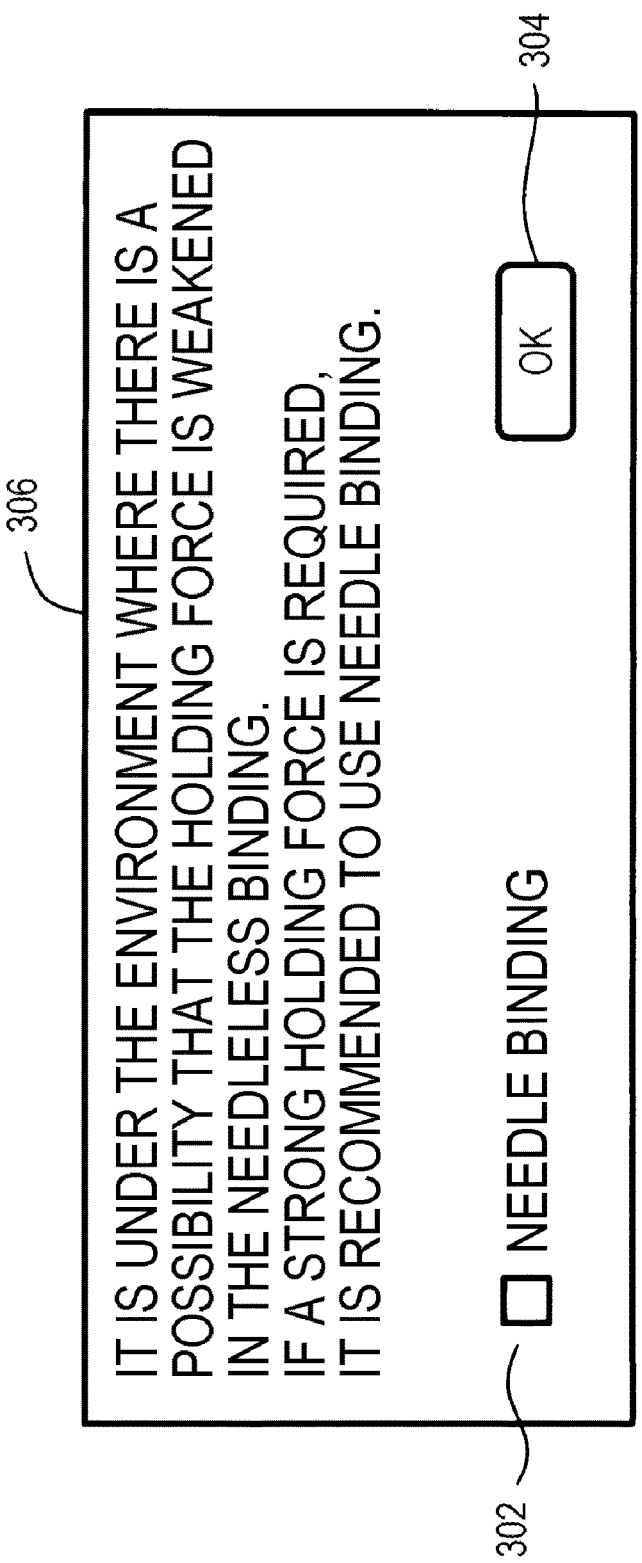
FIG. 7 is a view illustrating an example of a second confirmation image displayed in the first operation example.

FIG. 7 illustrates an example of the second confirmation image displayed in the low-humidity environment. The illustrated second confirmation image 306 includes a description of a situation that may occur when the needleless binding is executed under the low-humidity environment (reduction in holding force). In general, in the low-humidity environment, since the sheet moisture content is lowered and the holding force of the needleless binding part tends to decrease, it is notified to the user in advance. In addition, the second confirmation image 306 includes a message prompting selection of needle binding. Through such a message, it is possible for the user to recognize that strong holding force can be obtained by changing the binding method to needle binding and that the above situation can be avoided. In the exemplary embodiment, similarly to the above-described first confirmation image, the second confirmation image 306 includes a check box 302 as an operation element for selecting needle binding and an OK button 304 for erasing the second confirmation image 306 and advancing the process.

Figure 8:
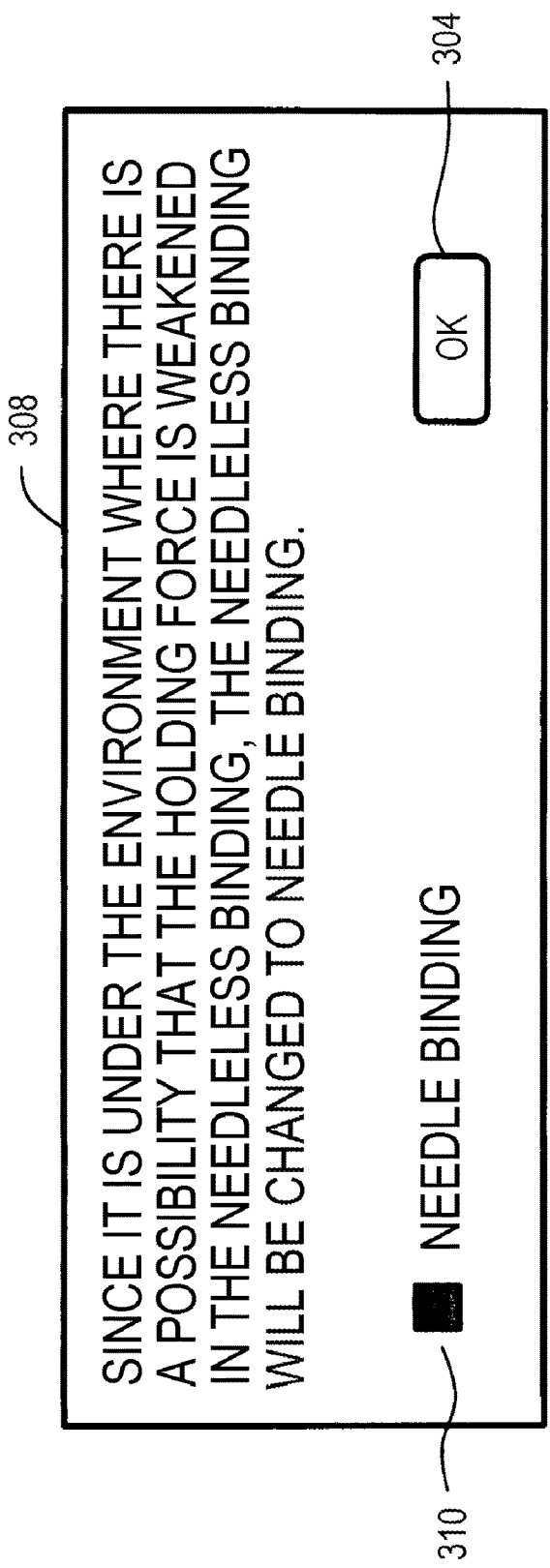
FIG. 8 is a view illustrating an example of another confirmation image displayed in the first operation example.

The confirmation images illustrated in FIGS. 6 and 7 are examples, and other confirmation images having similar functions may be displayed. In the exemplary embodiment, the confirmation image includes information for prompting a change and an object to be operated, and it exhibits plural functions. As the confirmation image, a confirmation image 308 as illustrated in FIG. 8 may be displayed. It is an image asking for confirmation about automatic change of the binding method. A check box 310 is checked from the beginning, and when it is desired to maintain the needleless binding, the check box 310 is touched to uncheck.

Figure 9:
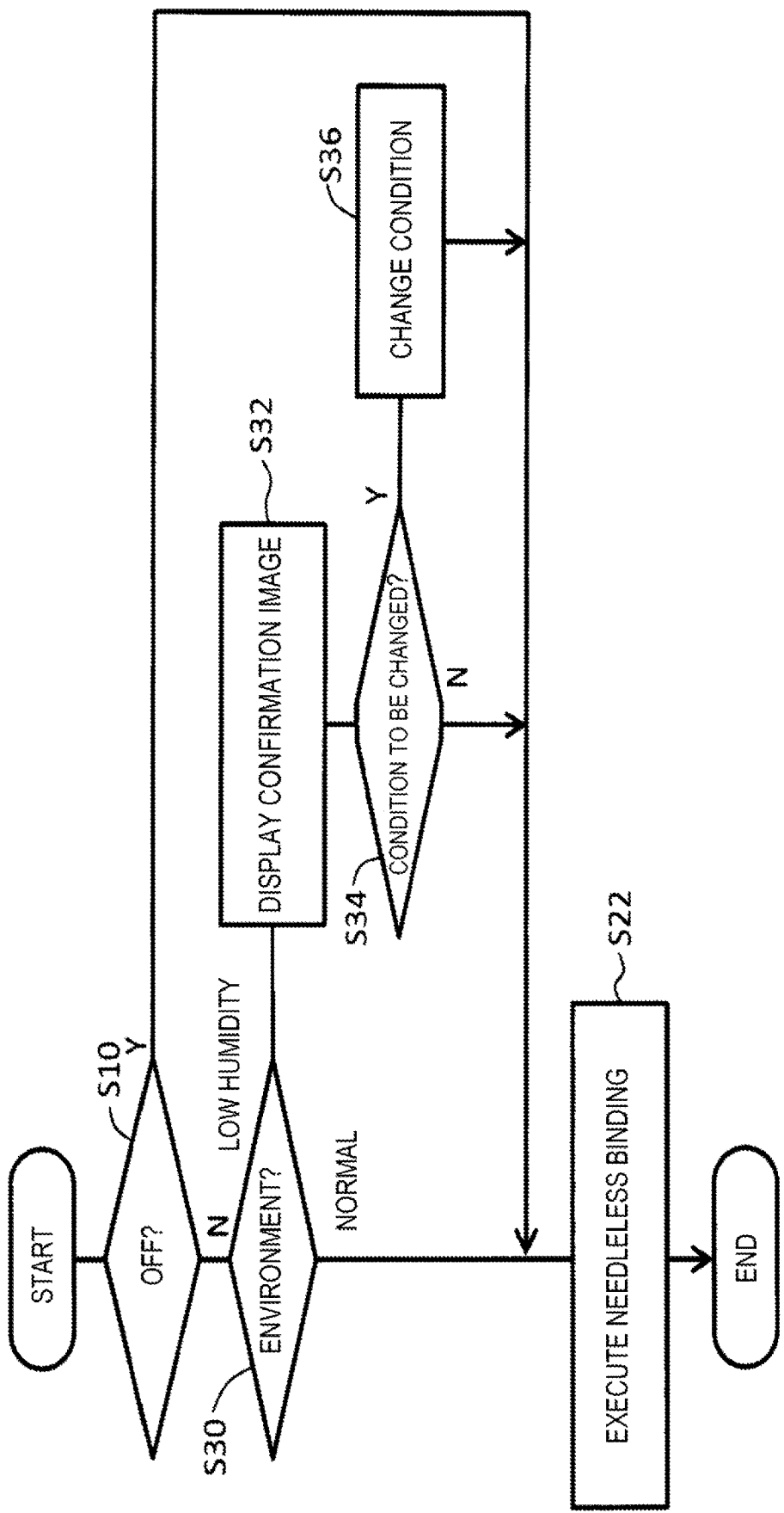
FIG. 9 is a flowchart illustrating a second operation example (second control example)

FIG. 9 illustrates a second operation example. A second control example by the controller will be described by way of explanation of the second operation example.

In S30, it is determined whether the current environment is a normal environment or a low-humidity environment, based on a value detected by the environment sensor. For example, when the humidity detected by the humidity sensor is equal to or larger than a predetermined value, it is determined that the environment is normal. When the detected humidity is smaller than the predetermined value, it is determined that the environment is low humidity. In the low-humidity environment, since the holding force of the needleless binding part is liable to decrease, prior to the execution of needleless binding (S22), a confirmation image is provided to the user in S32. The confirmation image includes a message notifying the user that the holding force of the needleless binding part may be lowered when the predetermined condition is satisfied under the current environment, as will be exemplified later. This is to request the user to confirm whether or not the predetermined condition is satisfied. In S34, it is determined whether or not the condition is changed. Here, the condition is an image forming condition, a binding condition or other conditions. When there is an instruction to change the condition, the condition is actually changed according to the instruction in S36. Thereafter, the needleless binding is executed in S22.

Since a process of changing to needle binding is not provided in the second operation example, the second operation example is also applicable to an image forming apparatus having no needle binding function. In addition, in the second operation example, the user may be provided with an opportunity to change to needle binding.

FIG. 10 illustrates an example of the confirmation image displayed in S32. In the illustrated example, a confirmation image 312 includes a message to inform a user that the holding force of the needleless binding part decreases when an image is included in a needleless binding target portion in a bundle of sheets under the current environment, and at the same time, to request the user to confirm whether or not an image is included in the needleless binding target portion. Further, the confirmation image includes a message to recommend image erasing. When execution of the image erasing is requested, a check box 314 is checked. The image erasing is also referred to as frame erasing, and partial areas are excluded from an image formation target by image processing and image formation control in the controller. When any one of the binding target portions of plural sheets constituting the bundle of sheets includes an image, there is a tendency that the holding force of the needleless binding part is weakened. Therefore, when there is even one binding target portion (accurately, an image formation surface) having an image, an instruction to erase the image is recommended. In a case of duplex printing, it is desirable to check the presence or absence of an image on the front side and the back side.

When the image erasing is instructed, a new screen for instructing the image erasing condition may be displayed, and for example, designation of a portion to which the image erasing is applied may be performed on the screen. However, since the position and the number of needleless binding parts in the bundle of sheets are known, the image erasing condition may be automatically determined from the needleless binding condition. In that case, for example, a management table 320 illustrated in FIG. 11 may be used. In FIG. 11, plural binding types are shown on the left side 322. Plural image erasing types associated with the plural binding types are shown on the right side 324. The binding type is classified, for example, from the viewpoints of, for example, a binding position, the number of bindings, and a binding direction. The management table 320 is to specify a binding type suitable for the image erasing type. For each binding type, a portion to erase an image is defined.

Figure 12:
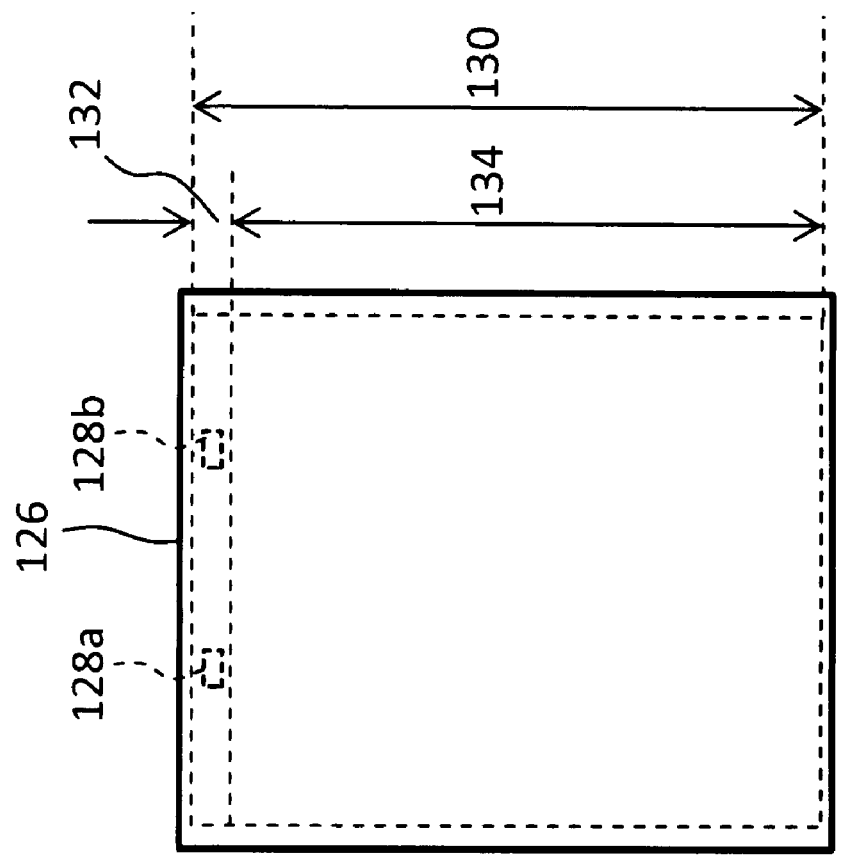
FIG. 12 is a view illustrating an example of image erasing.

For example, in FIG. 11, when a binding type C is instructed, an image erasure type C corresponding thereto is specified on the management table 320. The image erasing is executed accordingly. More specifically, FIG. 12 illustrates an image erasing area when the image erasure type C is selected. In the illustrated example, the formation of two binding parts 128a and 128b is planned on a sheet 126, and a band-like area 132 at the upper end portion is an image erasing area in the entire image forming area 130. That is, image formation is not performed for the band-like area 132 even when the image extends to the band-like area 132. An area 134 excluding the band-like area 132 is an image formable area. Since the band-like area 132 includes two binding parts 128a and 128b, no image is included in the band-like area. That is, a deterioration of the quality of the needleless binding part caused by image inclusion is avoided.

According to such automatic determination of image erasing area, the setting burden of the user may be reduced. In the above example, the band-like area is set as an erasing area, but it is also possible to set a binding area or a local area including the binding area as the erasing area.

Figure 13:
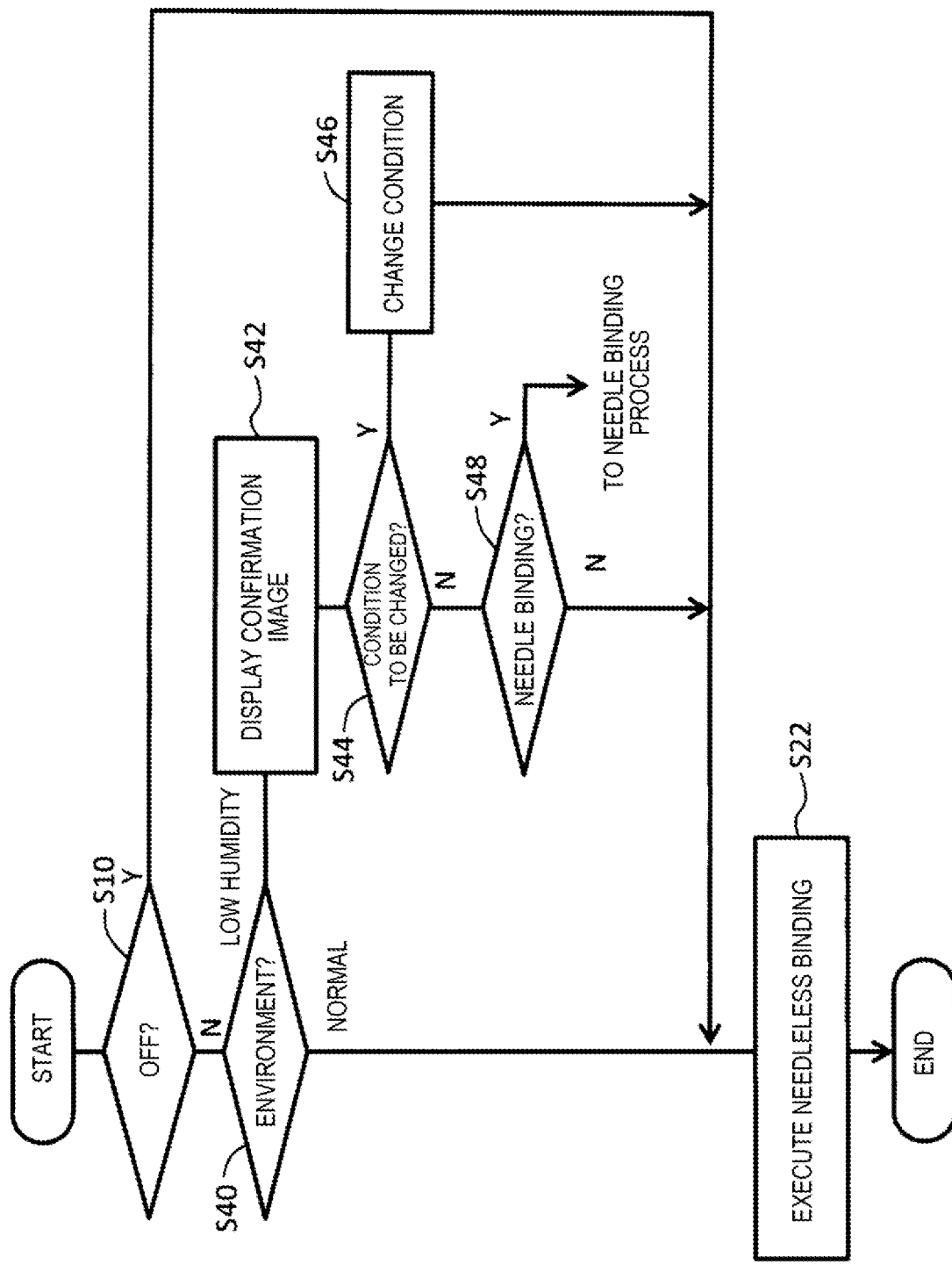
FIG. 13 is a flowchart illustrating a third operation example (third control example)

FIG. 13 illustrates a third operation example. A third control example by the controller will be described by way of explanation of the third operation example.

In S40, it is determined whether the current environment is a normal environment or a low-humidity environment, based on a value detected by the environmental sensor. When the current environment is the low-humidity environment, a confirmation image is displayed in S42. The confirmation image includes a message to request confirmation of a condition (condition or item that may affect needleless binding quality) and to prompt a change of the condition in a certain case, a message to recommend needle binding, and an operation element to instruct a change of a binding method. In S44, it is determined whether or not there is an instruction to change the condition from a user. When there is an instruction to change the condition, the condition is actually changed in S46. In S48, it is determined whether or not there is an instruction to change the binding method. When there is an instruction to change the binding method, a needle binding process is executed. In S22, the needleless binding is executed.

Figure 14:
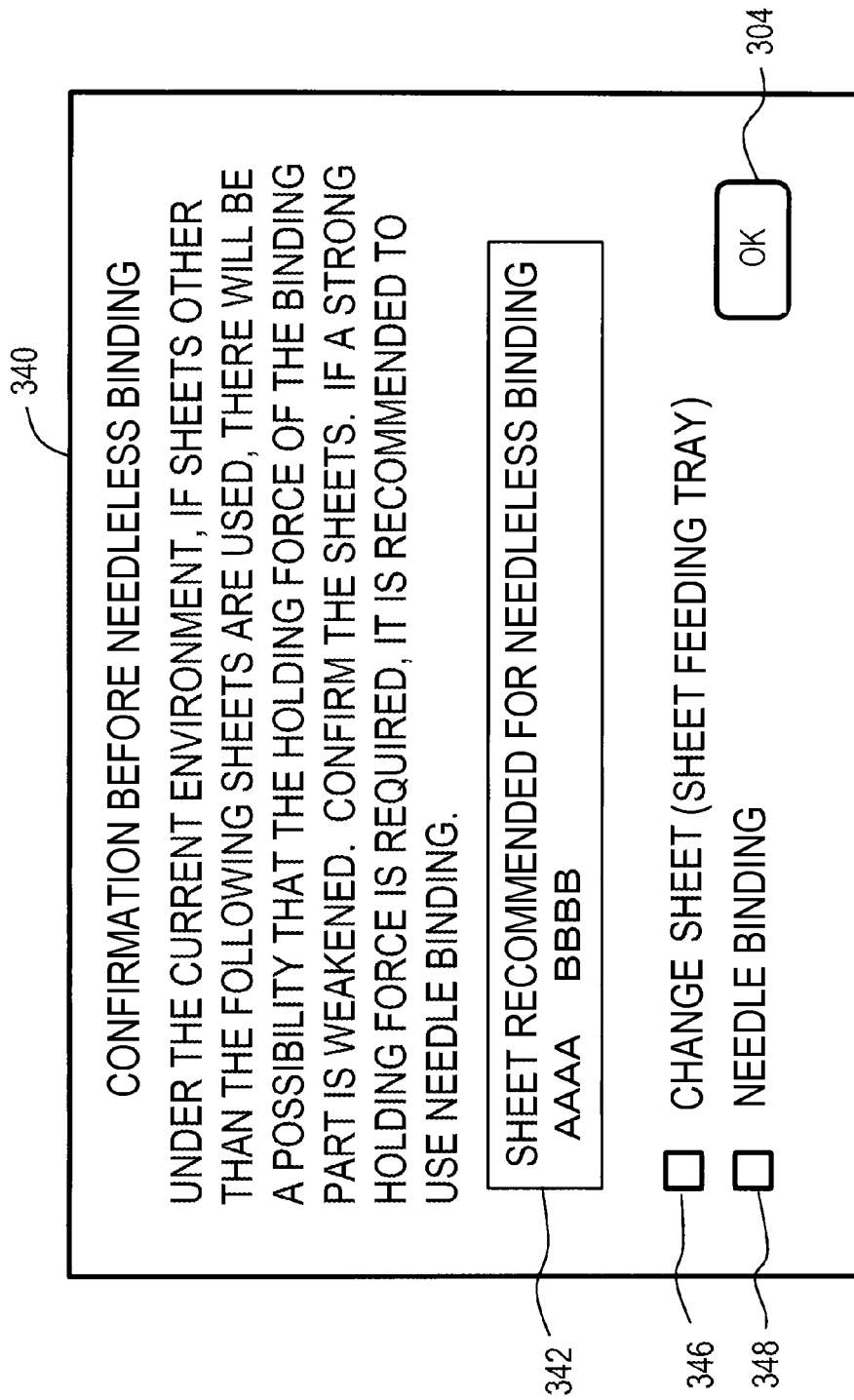
FIG. 14 is a view illustrating an example of a confirmation image displayed in the third operation example.

FIG. 14 illustrates an example of the confirmation image displayed in S42. The illustrated confirmation image 340 includes, for example, a sheet (sheet type) list 342 compatible with the current environment (low-humidity environment), a message to notify the possibility of reduction in holding force when a sheet not present in the sheet list is used, a message to prompt a change of a binding method, a check box 346 manipulated when a sheet (sheet feeding tray) is changed, and a check box 348 manipulated when an change of a binding method is instructed. The check box 346 is manipulated only when a sheet contained in the sheet list 342 is prepared on the sheet feeding tray.

FIG. 15 illustrates a management table referred to when displaying a sheet list. In the illustrated example, a management table 350 includes a sheet list 351 for the normal environment and a sheet list 352 for the low-humidity environment. When the current environment is the low-humidity environment, a sheet list in the confirmation screen is generated by referring to the sheet list 352 on the management table 350. For the normal environment, the sheet list 351 is referred to as necessary.

Figure 16:
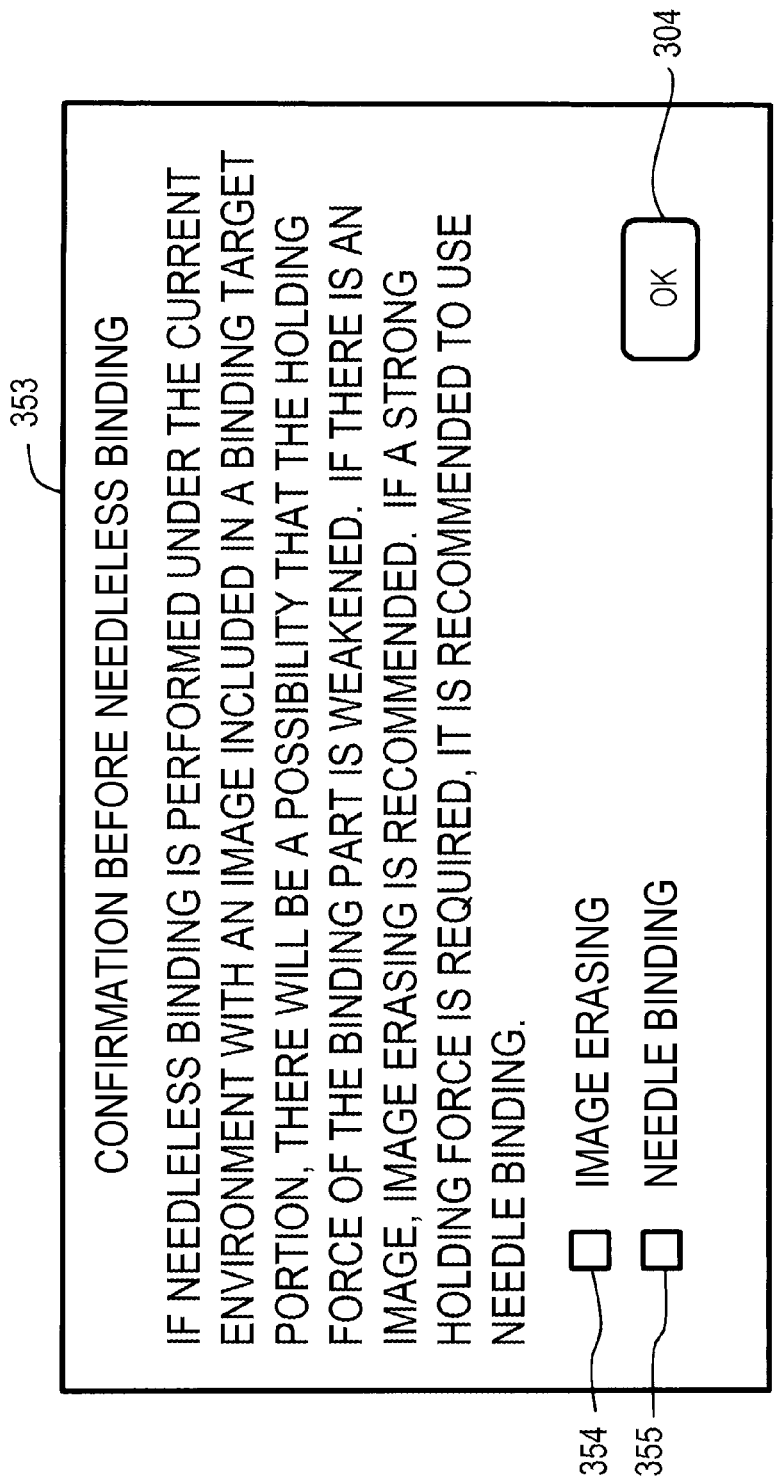
FIG. 16 is a view illustrating an example of another confirmation image displayed in the third operation example.

FIG. 16 illustrates another example of the confirmation image displayed in S42. The illustrated confirmation image 353 includes, for example, a message to inform a user that there is a possibility that the holding force of the needleless binding part will be weakened when an image is included in the needleless binding target portion, a message to request confirmation of the presence or absence of an image in the needleless binding target portion, and a message to prompt a change of a binding method. In addition, the confirmation image 353 includes a check box 354 for instructing image erasing and a check box 355 for instructing a change of the binding method. Unlike the confirmation image illustrated in FIG. 10, the confirmation image illustrated in FIG. 16 includes the message to prompt a change of the binding method and the check box 355 for instructing a change of the binding method.

Figure 17:
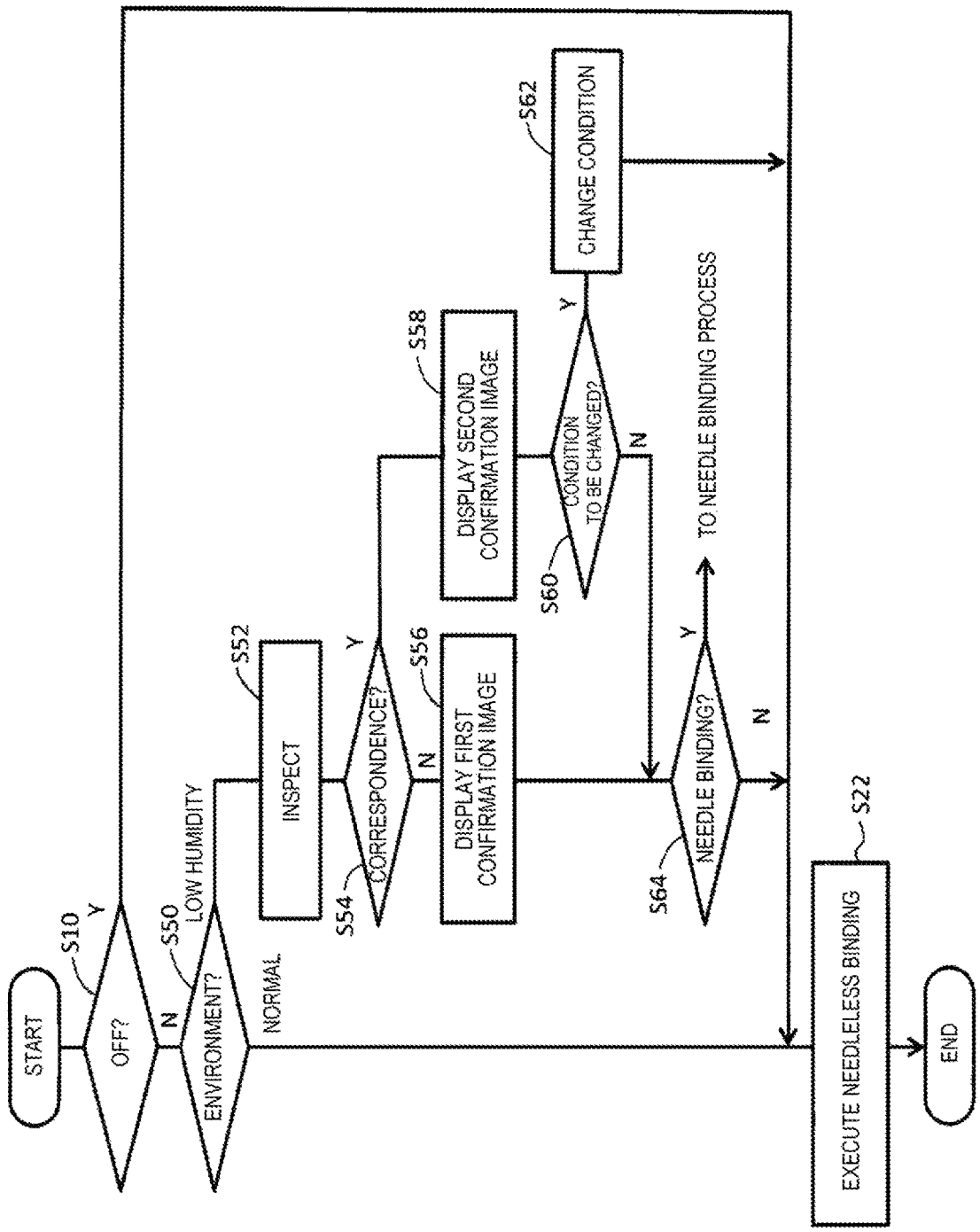
FIG. 17 is a flowchart illustrating a fourth operation example (fourth control example)

FIG. 17 illustrates a fourth operation example. A fourth control example by the controller will be described by way of explanation of the fourth operation example.

In S50, it is determined whether the current environment is a normal environment or a low-humidity environment, based on a value detected by the environmental sensor. When the current environment is the low-humidity environment, it is checked in S52 whether or not a predetermined condition (condition for determining switching of confirmation display) other than the low-humidity environment is satisfied. For example, it is determined whether or not an image quality mode is a high image quality mode. When the predetermined condition is not satisfied, a first confirmation image is displayed in S56. Meanwhile, when the predetermined condition is satisfied, a second confirmation screen is displayed in S58. After the first confirmation image is displayed in S56, it is determined in S64 whether or not to change the binding method. When a change of the binding method is instructed, a needle binding process is executed. Meanwhile, after the second confirmation image is displayed in S58, it is determined in S60 whether or not there is an instruction to change the predetermined condition (e.g., high image quality mode) to another condition (e.g., normal image quality mode). When there is an instruction to change the predetermined condition to another condition, the another condition is actually set in S62. When it is determined in S60 that there is no instruction to change the condition, the process proceeds to S64. In addition, the confirmation image illustrated in FIG. 6 may be an example of the first confirmation image displayed in S56.

Figure 18:
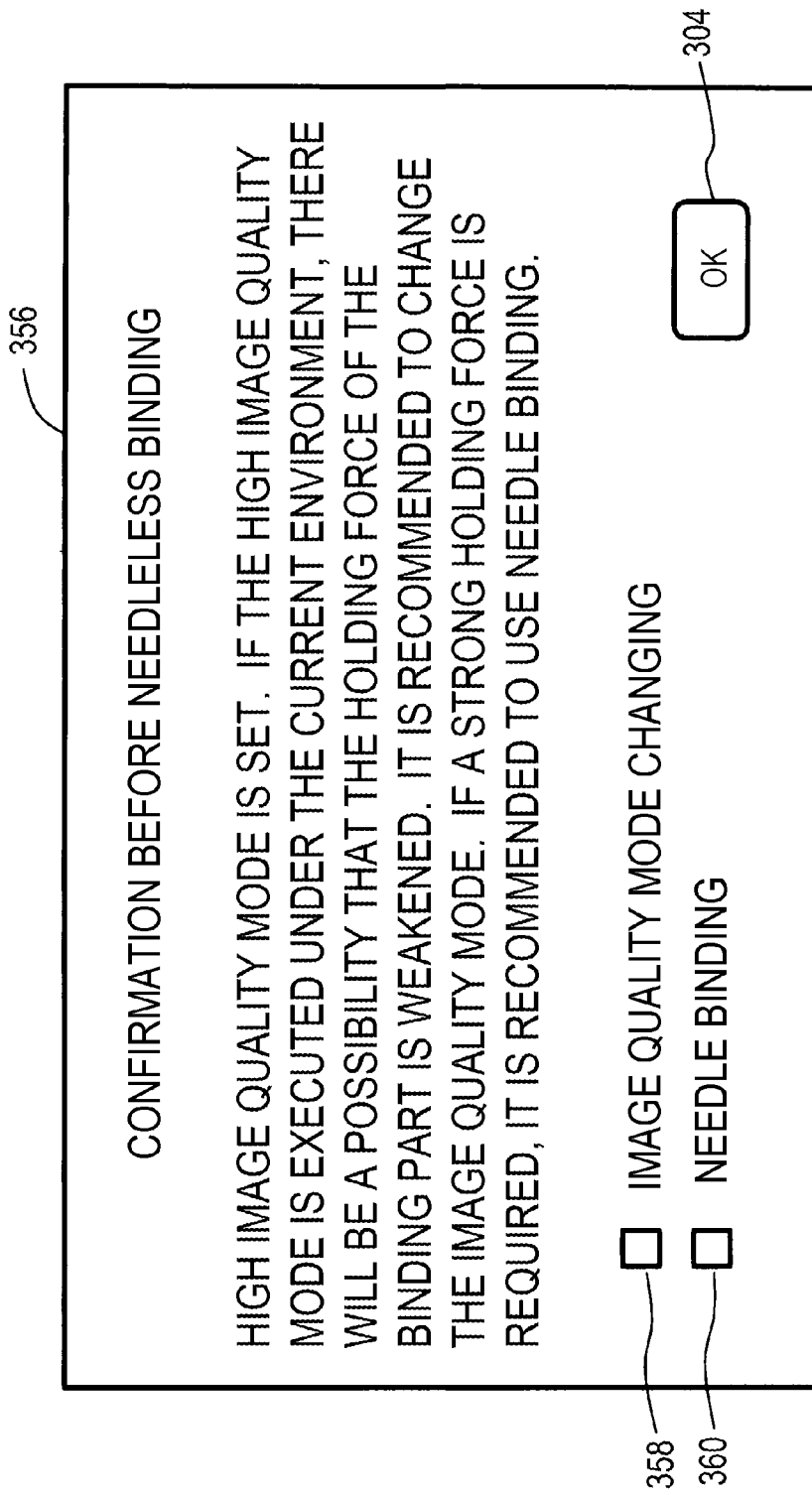
FIG. 18 is a view illustrating an example of a confirmation image displayed in the fourth operation example.

FIG. 18 illustrates an example of the second confirmation image displayed in S58. The illustrated second confirmation image 356 includes, for example, a message to inform the user that the high image quality mode which is a predetermined condition is set, a message to inform the user that there is a possibility that the holding force of the needleless binding part will be weakened when the high image quality mode is executed under the current low-humidity environment, a message to prompt a change of the image quality mode, a message to prompt needle binding, a check box 358 for instructing a change of the image quality mode, and a check box 360 for instructing a change of the binding method.

In the high image quality mode, the fixing temperature is higher than a predetermined temperature, which reduces the sheet moisture content. In combination with the low-humidity environment, this may decrease the holding force of the needleless binding part. According to the operation example described above, it is possible to display a special confirmation image in the low-humidity environment and the high image quality mode, thereby providing necessary information to the user and presenting plural options as countermeasures.

Figure 19:
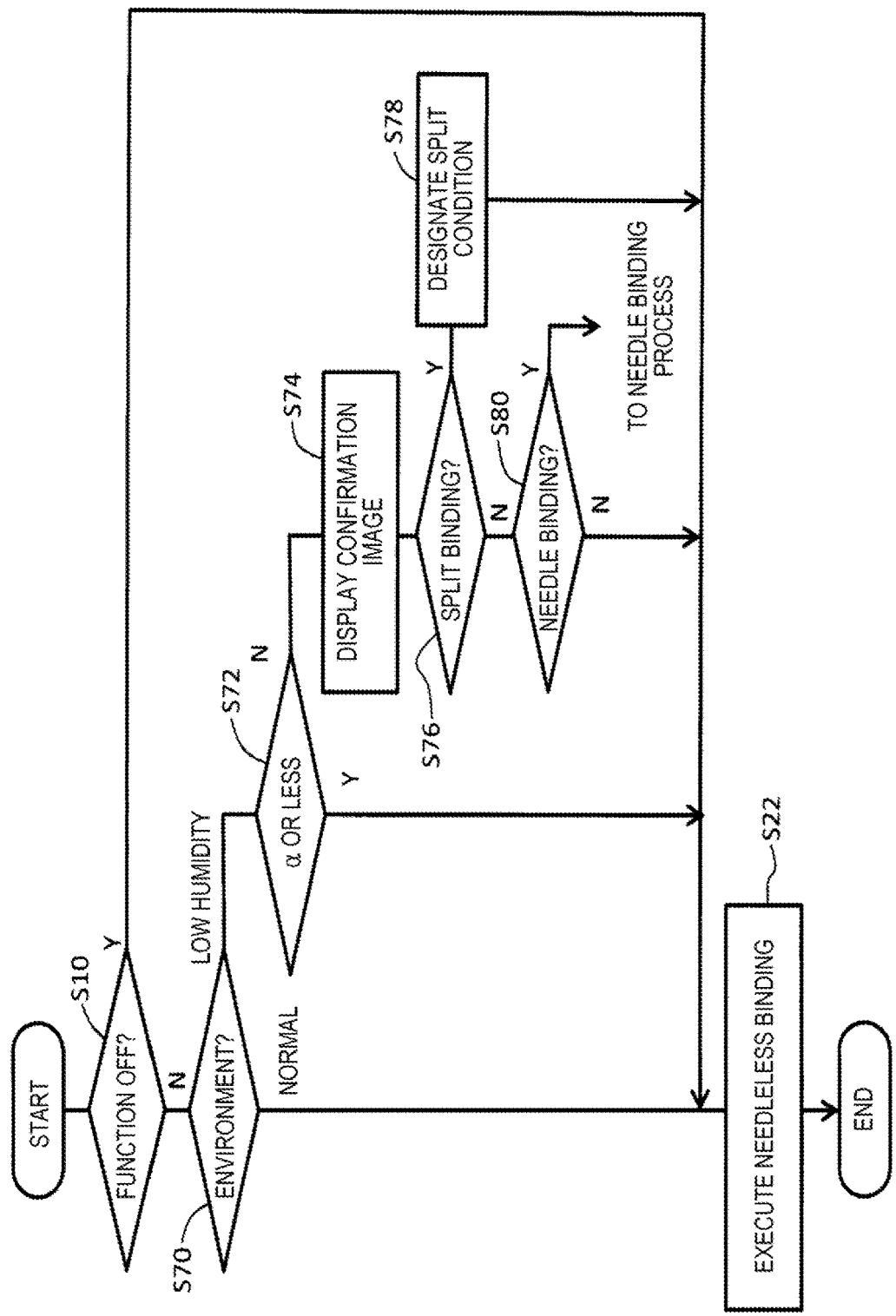
FIG. 19 is a flowchart illustrating a fifth operation example (fifth control example)

FIG. 19 illustrates a fifth operation example. A fifth control example by the controller will be described by way of explanation of the fifth operation example.

In S70, it is determined whether the current environment is a normal environment or a low-humidity environment, based on a value detected by the environment sensor. When the current environment is the low-humidity environment, it is determined in S72 whether or not the number of sheets constituting the bundle of sheets is equal to or smaller than α. When it is determined in S72 that the number of sheets is equal to or smaller than α, the process proceeds to S22. In that case, no confirmation image is displayed.

Meanwhile, when it is determined in S72 that the number of sheets is not equal to or smaller than α, a confirmation image is displayed in S74. The confirmation image includes, for example, a message to inform the user that there is a possibility that the holding force of the needleless binding part will be weakened in the current environment and the current number of needleless binding sheets, a message to prompt split binding for binding plural sheets to be stapled with no needle in an arbitrary number of two or more sheets, a message to prompt needle binding, an operation element to instruct split binding, and an operation element to instruct needle binding.

In S76, it is determined whether or not there is an instruction for split binding. When there is an instruction for split binding, a split condition is designated or selected by the user in S78, and then, the process proceeds to S22. In S80, it is determined whether or not there is an instruction for needle binding. When there is an instruction for needle binding, the needle binding process is executed. When there is no instruction for needle binding, the process proceeds to S22.

As described above, in the fifth operation example, in consideration of items that affect the quality of the needleless binding in addition to the environment, it is determined whether or not to display a confirmation image. That is, it is determined in a multifaceted way whether or not to display a confirmation image. Whether or not to display the confirmation image may be switched in consideration of three or more items including the environment.

Figure 20:
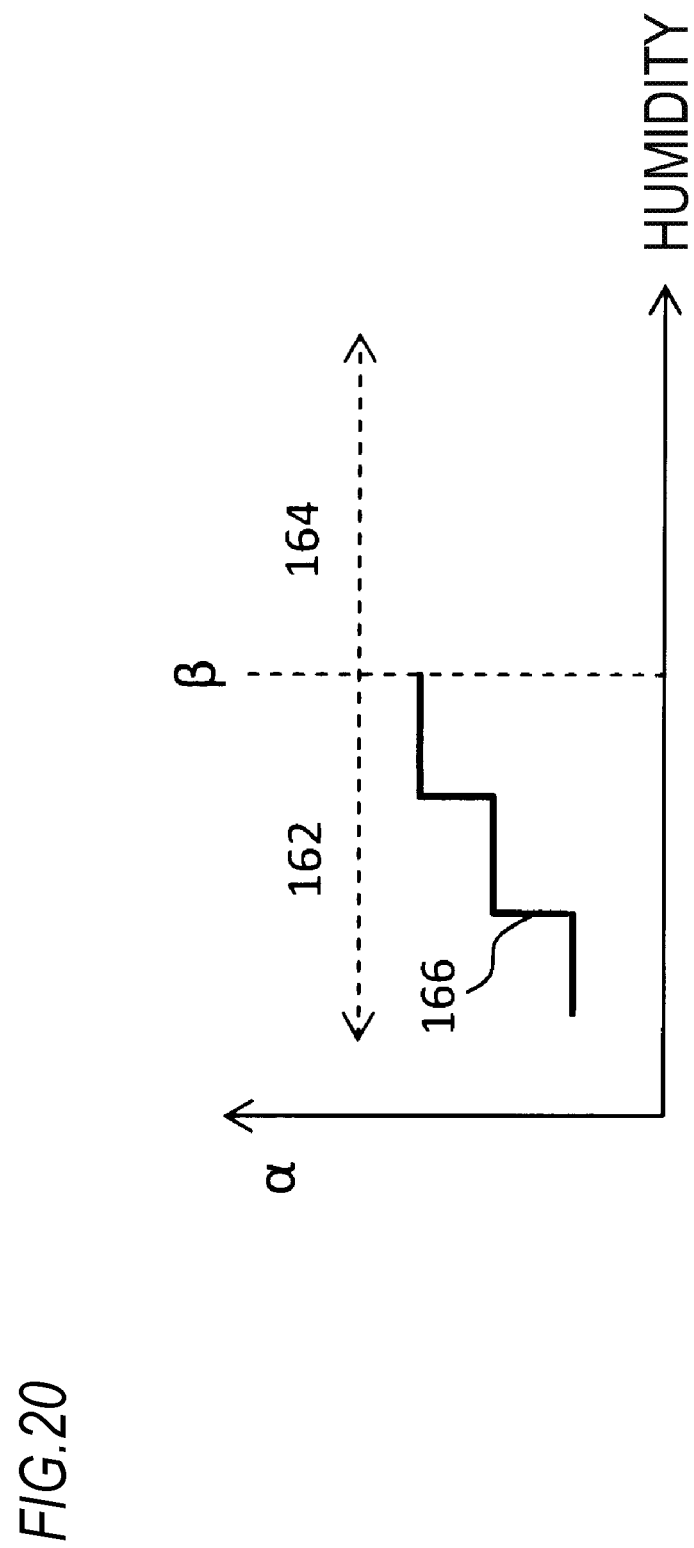
FIG. 20 is a view illustrating a relationship between humidity and a threshold value.

In FIG. 20, as indicated by reference numeral 166, α as a threshold value may be changed according to the magnitude of the humidity. Reference numeral 162 denotes a humidity range determined as the low-humidity environment, and reference numeral 164 denotes a humidity range determined as the high-humidity environment. In the low-humidity environment, α is stepwisely reduced as the humidity decreases. When the holding force of the needleless binding part becomes weaker as the humidity decreases, α may be varied in this way. The α may be continuously changed. Incidentally, β is a threshold value for discriminating between the low-humidity environment and the high-humidity environment and may be changed based on factors other than humidity. For example, β may be varied based on temperature, apparatus installation environment and others.

(4) Summary of Disclosure

The image forming apparatus according to the exemplary embodiment includes a needleless binding device configured to form a recessed or raised impression as a needleless binding part by performing needleless binding on a bundle of sheets; an environment sensor; and a controller configured to perform, based on a value detected by the environment sensor, control to display a confirmation image requesting a user to make confirmation on the needleless binding prior to execution of the needleless binding.

According to the above configuration, a confirmation image is displayed to a user prior to needleless binding under a certain environment, which makes it possible for the user to recognize a situation that may occur under the current environment or to give the user an opportunity to avoid such a situation. As a result, it is possible to prevent occurrence of a needleless binding result against the user's expectation. In the exemplary embodiment, a needle binding device is provided together with a needleless binding device, but the above configuration can function even with an image forming device having no needle binding device. The environmental sensor is, for example, a humidity sensor, a temperature sensor, or both. The confirmation image may include a text string, a symbol or a graphic symbolizing a matter for confirmation, or others.

In the exemplary embodiment, the confirmation image includes a message to request making confirmation on at least one item affecting the quality of the needleless binding part under the current environment. The concept of the item may include, for example, an item related to image formation or an item related to needleless binding. Although the message is conveyed by a text string in the exemplary embodiment, it may also be conveyed by a graphic or the like as described above. The same applies to other information. It is sufficient as long as the user can recognize the display contents.

In the exemplary embodiment, the item includes a sheet, and the confirmation image includes a list of sheets suitable for the current environment. Accordingly, it is possible for the user to refer to the list of sheets and to determine whether the sheet as a target for needleless binding is suitable. This gives the user, for example, an opportunity to change the sheets or an opportunity to change to needle binding.

In the exemplary embodiment, the above item includes the presence or absence of an image in the needleless binding target portion in the bundle of sheets, and the confirmation image includes a message to request making confirmation as to whether or not an image is included in the needleless binding target portion in the bundle of sheets. According to this, the user is given an opportunity to confirm the presence or absence of an image in the needleless binding target portion. That is, when an image is included in the needleless binding target portion under a certain environment (especially under a low-humidity environment), it is possible to cause the user to recognize that the quality of the needleless binding part may be deteriorated. In the exemplary embodiment, the confirmation image further includes a message to recommend image erasing. According to this, the user is given an opportunity to select the function. The image erasing is to manipulate an image formation range so that an image is not included in the needleless binding target portion, and its function is also called frame erasing. Such general function is utilized to secure the quality of the needleless binding part according to the environment. In the exemplary embodiment, an operation element (e.g., a check box or a button) for instructing image erasing is displayed together with the message. Such an operation element may be displayed on another image other than the confirmation image.

In the exemplary embodiment, the confirmation image includes a message to prompt a change from needleless binding to needle binding. According to this, it is possible for the user to recognize that a reduction in binding quality can be avoided by the needle binding, and an opportunity to change the binding method is given to the user. In the exemplary embodiment, an operation element for changing the binding method is displayed together with the message.

In the exemplary embodiment, when it is determined based on a detected value that the current environment is a high-humidity environment, a first confirmation image corresponding to the high-humidity environment is displayed as the confirmation image. When it is determined based on a detected value that the current environment is a low-humidity environment, a second confirmation image different from the first confirmation image and corresponding to the low-humidity environment is displayed as the confirmation image. According to this, it is possible to provide a confirmation image suited to the humidity condition to the user. In the exemplary embodiment, when it is determined based on a detected value that the current environment is neither a high-humidity environment nor a low-humidity environment, a confirmation screen is not displayed.

In the exemplary embodiment, the first confirmation image includes instruction of a phenomenon that may occur when needleless binding is executed under the high-humidity condition, and the second confirmation image includes instruction of a phenomenon that may occur when needleless binding is executed under the low-humidity condition. According to this, it is possible to determine whether or not to change the condition or the binding method after understanding of the reason. A separate problem may occur under a high-humidity environment even through such a problem hardly occurs under a low-humidity environment. Therefore, it is important to request the user for confirmation in both environments. Alternatively, the function of displaying the confirmation image may be turned off depending on the situation. The confirmation image may be displayed every time needle binding is instructed under a certain environment. In this case, depending on the circumstances, the operability may decrease or a burden unnecessary to the user may be forced. However, this function can be turned off so that this problem can be avoided.

In the exemplary embodiment, the controller determines whether or not to display the confirmation image based on a value detected by the environment sensor and the setting item that affects the quality of the needleless binding part. This feature makes it possible to determine in a multifaceted way whether or not to display the confirmation image. The concept of the setting item includes, for example, a setting item related to image formation and a setting item related to needleless binding. In the exemplary embodiment, the setting item includes an image quality mode, and the confirmation image includes a message to prompt changing the currently set image quality mode. For example, when the fixing temperature is raised in the high image quality mode, the sheet moisture content is liable to decrease. Thus, it is determined whether or not to display the confirmation image in consideration of both the sheet moisture content and the environment.

In the exemplary embodiment, the setting item includes the number of sheets for needleless binding, and the confirmation image includes a message to prompt changing the currently set number of sheets for needleless binding. This feature makes it possible to determine whether or not to display the confirmation image in consideration of both the number of sheets to be bound and the environment.

As described above, in the exemplary embodiment, which reflects the fact that the quality of the needleless binding part varies depending on the environment (particularly humidity), the confirmation image is displayed prior to the needleless binding so that the user is given an opportunity to reconsider whether or not to perform the needleless binding. As a result, the user's expectation about the quality of the needleless binding part is not betrayed.

Second Exemplary Embodiment

Hereinafter, a second exemplary embodiment of the present disclosure will be described with reference to the accompanying drawings.

(1) Image Forming Apparatus

A schematic configuration of an image forming apparatus according to a second exemplary embodiment is illustrated in FIG. 1 and is the same as described above.

Besides the needleless binding, for example, needle binding (staple), drilling (punching), and center folding are known as post-processing. In the post-processing unit 14, one or plural post-processing other than needleless binding may be executed. Needleless binding and plural post-processing including the needleless binding may be executed in the image forming unit 12. In that case, a single image forming unit 12 constitutes the image forming apparatus.

As will be described later, the controller 38 controls the operation of the needleless binding mechanism 44 via the control board 56 in the post-processing unit 14. A unit for controlling the needleless binding mechanism 44 may be provided in the post-processing unit 14, or may be provided across the image forming unit 12 and the post-processing unit 14.

The post-processing unit 14 includes a housing 43 in which the needleless binding mechanism 44 is provided. The sheet delivered from the image forming unit 12 is transported along a sheet transport path 32. When needleless binding is designated as the post-processing, the sheet is sent to the needleless binding mechanism 44.

The needleless binding mechanism 44 is a mechanism for forming a recessed or raised impression as a binding part on a bundle of sheets using a crimping method. In the exemplary embodiment, the needleless binding mechanism 44 has a high binding ability to form a binding part on a bundle of sheets including, for example, ten or a dozen sheets. In order to align the bundle of sheets, the needleless binding mechanism 44 is provided in an inclined state. The needleless binding mechanism 44 includes an inclined loading plate 46 and a needleless binding device 50 provided on the lower end side thereof. A bundle 48 of sheets is placed on the loading plate 46, and the needleless binding device 50 performs a needleless binding process on the end portion of the bundle 48 of sheets. Thus, a recessed or raised impression is formed as a binding part, and sheets are coupled with each other by the binding effect of the binding part. The binding effect is caused by entanglement of sheet fibers between the sheets.

The post-processing unit 14 includes the control board 56. As will be described later, the control board 56 includes, for example, a PWM (Pulse Width Modulation) controller for supplying a drive signal to a motor of the needleless binding device 50. The controller 38 in the image forming unit 12 controls the operation of the motor via the control board 56. Further, the controller 38 controls operations of various movable parts of the needleless binding mechanism 44. After the post-processing, the bundle of sheets is discharged onto a discharge tray 54.

(2) Configuration and Operation of Needleless Binding Mechanism

A specific configuration of the needleless binding mechanism 44 is illustrated in FIG. 2 and is the same as described above. The illustrated configuration is an example and various mechanisms may be adopted for needleless binding.

The main part of the needleless binding device is schematically illustrated in FIG. 3 and the same as described above.

Figure 21:
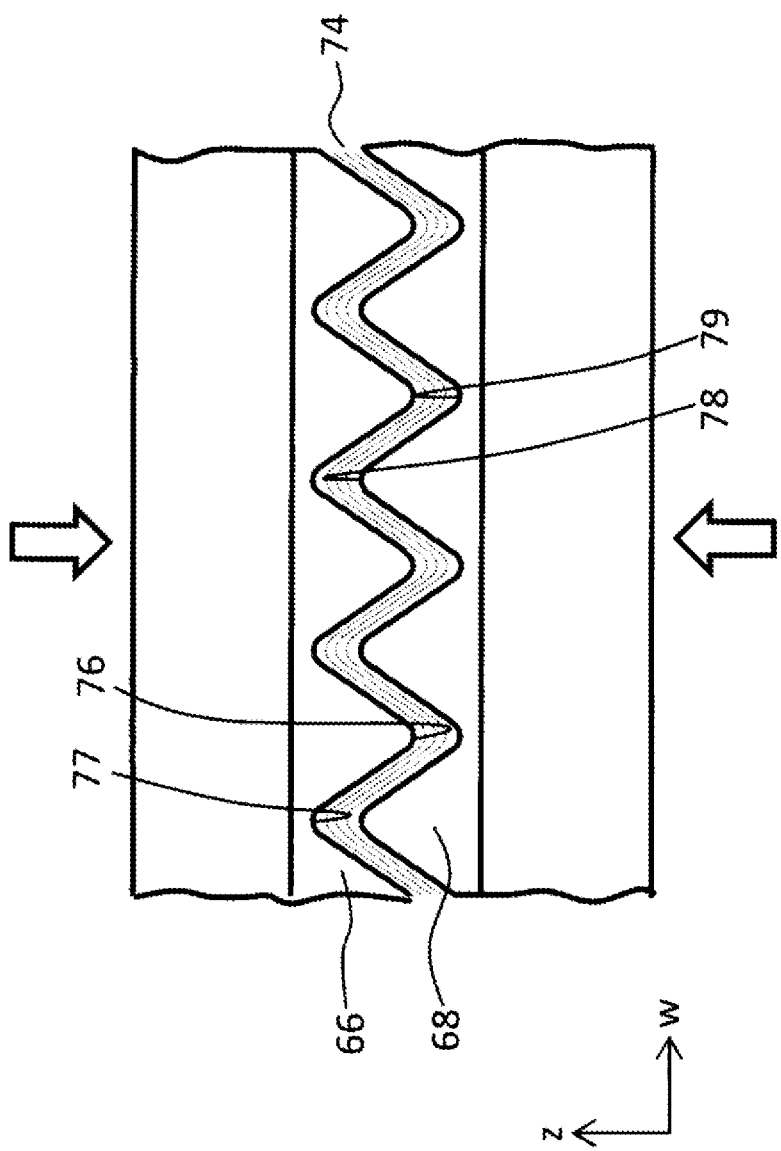
FIG. 21 is a view for explaining formation of a binding portion by a crimping method.

FIG. 21 illustrates the intermeshing state of an upper tooth row 66 and a lower tooth row 68 in the needleless binding device. On the page, the horizontal direction is the w direction and the vertical direction is the z direction. As will be described later, the needleless binding device has a function of moving around the edge of a bundle of sheets, and the w direction coincides with the y direction depending on the orientation of the needleless binding device.

The upper tooth row 66 has plural convex portions (downward crest portions) 76 arranged at regular intervals in the w direction. Concave portions (downward trough portions) 77 exist between adjacent convex portions 76. That is, plural concave portions 77 are arranged at regular intervals in the w direction. More specifically, the convex portions 76 and the concave portions 77 are alternately arranged. Similarly, the lower tooth row 68 has plural convex portions (upward crest portions) 78 arranged at regular intervals in the w direction. Concave portions (trough portions) 79 exists between adjacent convex portions 78. That is, plural concave portions 79 are arranged at regular intervals in the w direction.

As illustrated in the figure, in the intermeshing state, each convex portion 76 in the upper tooth row 66 enters the corresponding concave portion 79 in the lower tooth row 68, and at the same time, each convex portion 78 in the lower tooth row 68 enters the corresponding concave portion 77 in the upper teeth row 66. Thus, the bundle of sheets is partially plastically deformed into a recessed or raised shape or a waveform, and entanglement of fibers occurs between the sheets. The entanglement tends to occur particularly at a stretched portion. As a result of such crimping process, a binding part 74 with self-binding feature is formed.

Figure 22:
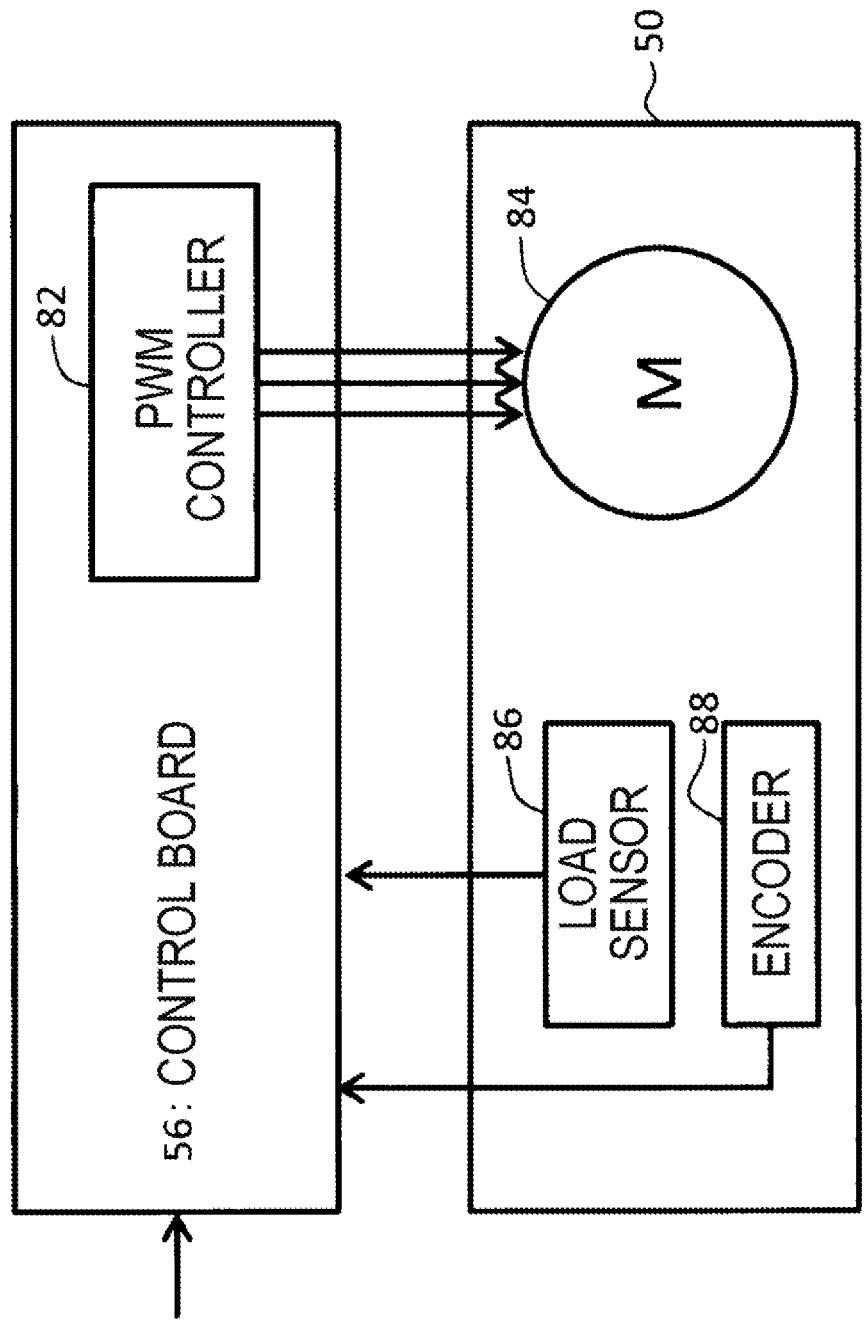
FIG. 22 is a view for explaining a control of a motor of a needleless binding device.

FIG. 22 schematically illustrates the electrical configuration of the needleless binding device 50. The needleless binding device 50 includes a motor 84 as a driving source. Further, the needleless binding device 50 includes a load sensor 86 and an encoder 88. The load sensor 86 is used to monitor a load in the process of forming the binding part and provided as necessary. The encoder 88 is used to monitor the rotational speed of the motor. A detection signal of the load sensor 86 and a detection signal of the encoder 88 are sent to the control board 56. The control board 56 functions as a local controller and is equipped with a PWM controller 82 in the illustrated configuration example. A drive signal is supplied from the PWM controller 82 to the motor 84. A device such as a driver is not illustrated in FIG. 5. The control board 56 may be provided in the image forming unit.

The PWM controller 82 is used to control the rotational speed of the motor 84 by varying a pulse width, that is, a duty. The rotational speed of the motor 84 is detected by the encoder 88, and the PWM controller 82 feedback-controls the rotational speed of the motor 84 so as to achieve a designated rotational speed. The rotational speed at that time is designated by the controller in the image forming unit. The rotational speed may be autonomously determined within the post-processing unit. The magnitude of the binding load is controlled by, for example, the number of pulses. In addition, the PWM control is an example and may adopt a rotational speed control system suitable for the type of the motor 84. For example, the rotational speed of the motor may be controlled by a voltage, a current, a frequency and others.

The rotational speed of the motor 84 defines the rotational speed of a cam member to be described later, through which the relative approaching speed (binding operation speed) of the upper tooth row and the lower tooth row and the relative separation speed (return operation speed) of the upper tooth row and the lower tooth row are defined. In other words, the rotational speed of the motor 84, the rotational speed of the cam member and the operation speed of the pair of tooth rows are in association with each other.

Figure 23:
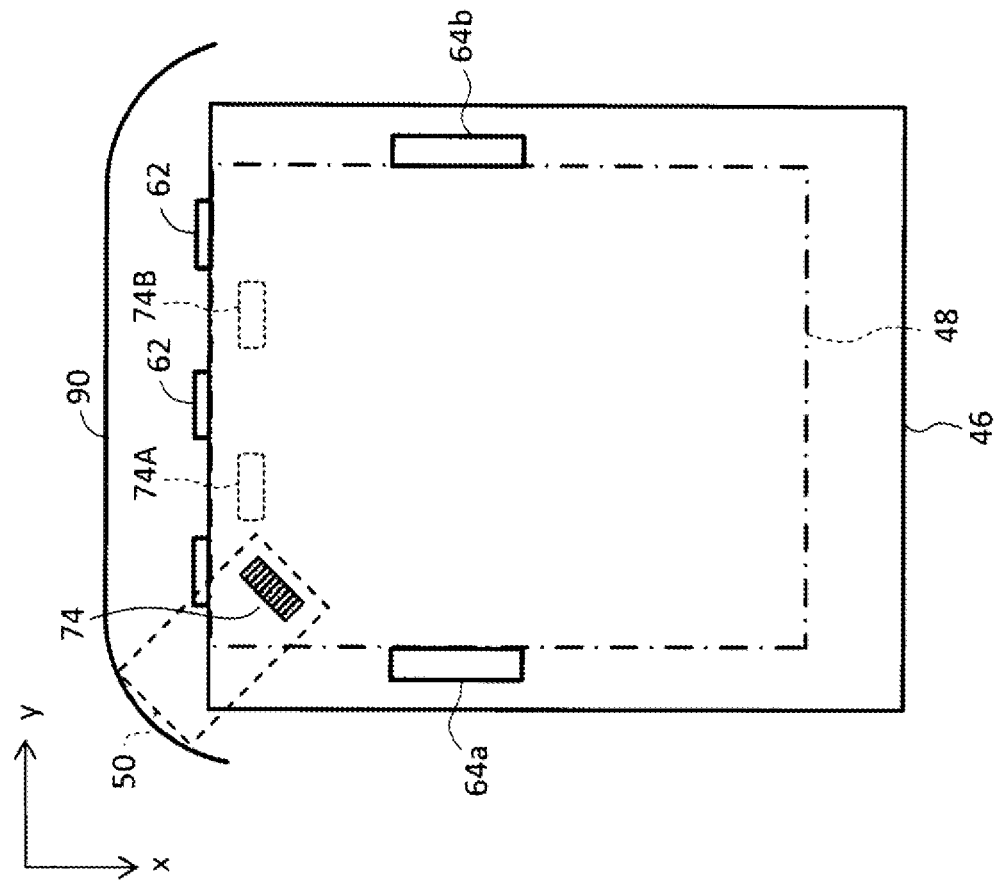
FIG. 23 is a view for explaining formation of a binding portion by a needleless binding device.

FIG. 23 illustrates the top surface of the loading plate 46. The bundle 48 of sheets after the alignment is placed on the loading plate 46. Both ends of the bundle 48 of sheets in the y direction are pressed by a pair of tamper members 64*a* and 64b. The end portion of the bundle 48 of sheets in the −x direction abuts against the end guide 62. In the illustrated configuration example, the needleless binding device 50 is movable along a rail 90 and performs a needleless binding operation at a designated location. For example, when forming the needleless binding part 74 with respect to the corner portion (upper left corner portion) of the bundle 48 of sheets, the needleless binding device 50 is set at an illustrated position, and the needleless binding is executed at that position. As indicated by reference numerals 74A and 74B, it is also possible to perform needleless binding at other positions. When both the needleless binding device 50 and a needle binding device (not illustrated) are provided, a structure (e.g., a retracting mechanism) for avoiding physical interference between these devices is provided.

Figure 24:
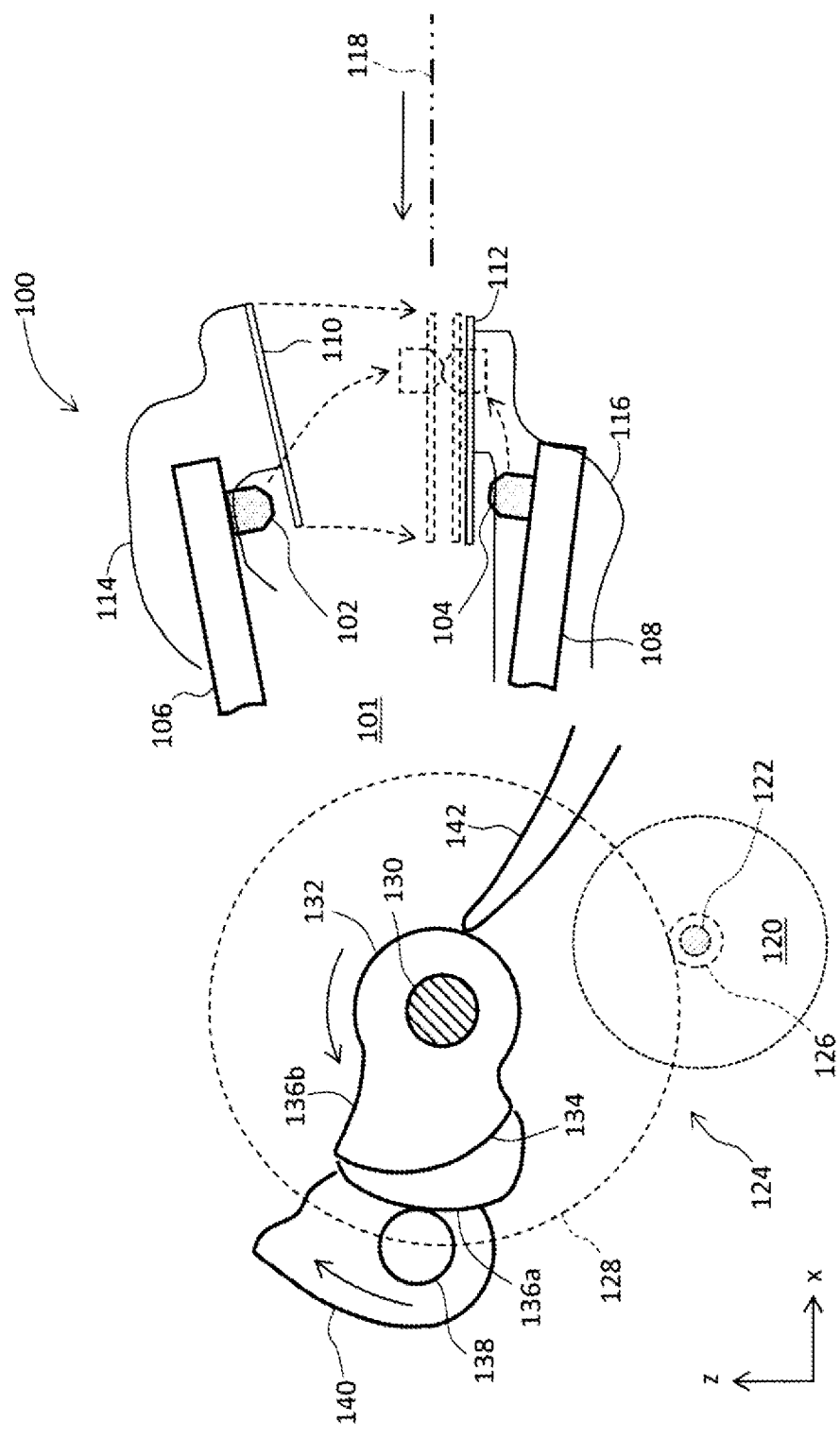
FIG. 24 is a schematic view illustrating a standby state.
Figure 25:
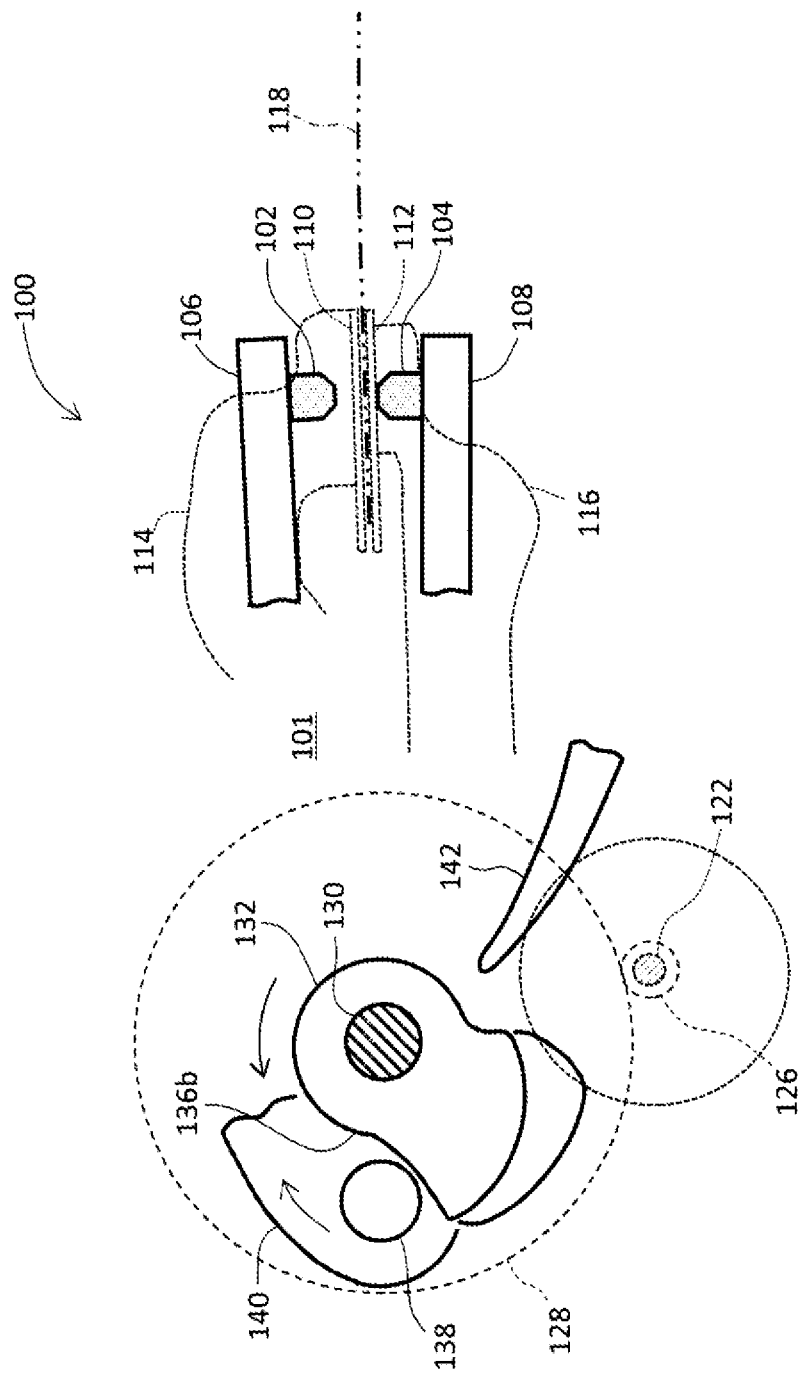
FIG. 25 is a schematic view illustrating a proximity state.
Figure 26:
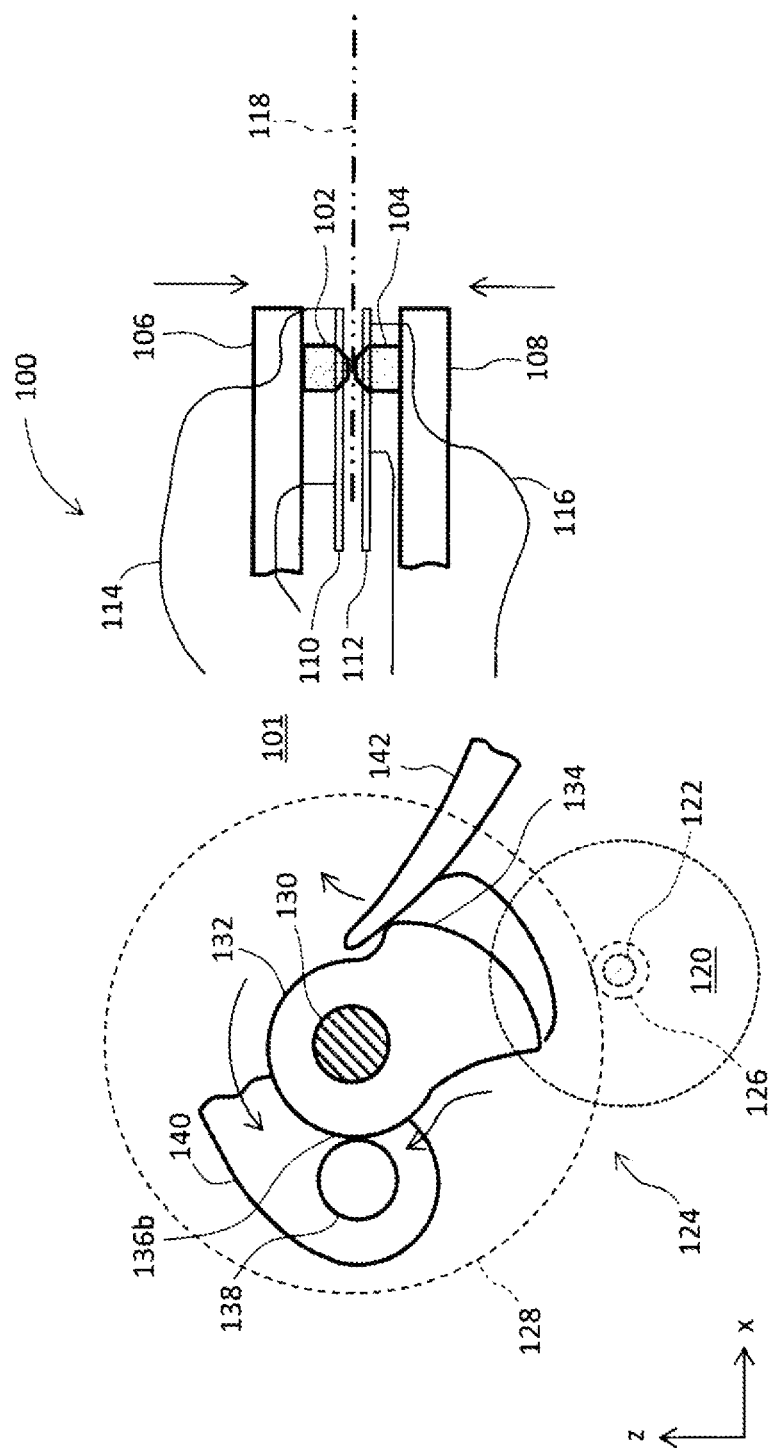
FIG. 26 is a schematic view illustrating an intermeshing state.

Next, a specific configuration example and operation example of the needleless binding device will be described with reference to FIGS. 24 to 26. An illustrated needleless binding device 100 has basically the same configuration as the needleless binding device 50 illustrated in FIGS. 1 to 3 and 21 to 23. FIG. 24 illustrates a standby state, FIG. 25 illustrates a proximity state, and FIG. 26 illustrates an intermeshing state. After the intermeshing state, the proximity state and the standby state sequentially occur. In FIGS. 24 to 26, for the purpose of clarifying the feature matters, a portion of the needleless binding device 100 is illustrated but other portions thereof are not illustrated.

In FIG. 24, a motor 120 is a driving source and its operation is controlled by the PWM control scheme as described above. The motor 120 has a rotating shaft 122 and its rotational motion is transmitted to a gear unit 124. The gear unit 124 includes plural gears 126 and 128. In FIG. 24, the gear unit 124 is briefly illustrated. In the illustrated configuration example, a cam shaft 130 is fixedly connected to the gear 128 in the gear unit 124. A cam plate 132 is fixedly connected to the cam shaft 130. The rotational motion force generated by the motor 120 causes the cam plate 132 to rotate. The cam plate 132 has plural contact surfaces 134, 136a, and 136b.

The needleless binding device 100 includes a link mechanism 101. The link mechanism 101 converts the rotational motion of the cam plate 132 into the opening/closing motion (approaching/separation movement) of the upper tooth row 102 and the lower tooth row 104, and at the same time, converts the rotational motion of the cam plate 132 into the opening/closing motion (approaching/separation movement) of a pair of pressing pieces 110 and 112. Some members included in the link mechanism 101 are illustrated in FIG. 24. Specifically, a link member 140, a link member 142, an arm member 106, an arm member 108, an arm member 114, and an arm member 116 are illustrated. A roller 138 is rotatably provided on the link member 140 and is in contact with the contact surface 136a of the cam plate 132. The operation of the link mechanism 101 will be described step by step with reference to FIGS. 24 to 26.

In the standby state illustrated in FIG. 24, the two arm members 106 and 108 are in the open state, and similarly, the two arm members 114 and 116 are also in the open state. The two arm members 106 and 108 correspond to the movable bases 70 and 72 illustrated in FIG. 3. In FIG. 24, an upper tooth row 102 is fixed downward on the lower surface of the arm member 106, and the lower tooth row 104 is fixed upward on the upper surface of the arm member 108. The pressing piece 110 is provided at the leading end of the arm member 114, and the pressing piece 112 is provided at the leading end of the arm member 116. These pressing pieces 110 and 112 constitute a pressing member. Only one of the pressing pieces 110 and 112 may be provided as long as a necessary pressing function is exerted.

In the standby state illustrated in FIG. 24, a bundle of sheets receiving space is generated between the upper tooth row 102 and the lower tooth row 104, and the end portion of the bundle 118 of sheets is inserted into the space. The bundle 118 of sheets is schematically illustrated in FIG. 24. However, the bundle 118 of sheets actually has a thickness corresponding to the number of sheets constituting the bundle 118 of sheets.

In FIG. 24, the movements of the upper tooth row 102 and the lower tooth row 104 are indicated by broken lines, and similarly, the movements of the pressing pieces 110 and 112 are indicated by broken lines. When the +x direction is taken as the forward direction and the -x direction is taken as the backward direction, in the binding movement process, the upper tooth row 102 moves forward obliquely downward and the lower tooth row 104 moves forward obliquely upward. The pressing piece 110 falls downward and the pressing piece 112 floats upward. In this course, the upper tooth row 102 slides horizontally with respect to the pressing piece 110, and the lower tooth row 104 slides horizontally with respect to the pressing piece 112.

As described above, as the cam plate 132 rotates in the counterclockwise direction, the upper tooth row 102, the lower tooth row 104 and the pressing pieces 110 and 112 move due to the action of the link mechanism 101. In addition, these movements are merely examples, and each member may perform movement other than the above movements as long as the needleless binding process can be executed appropriately.

FIG. 25 illustrates the proximity state. The same components as illustrated in FIG. 24 will be denoted by the same reference numerals as used in FIG. 24. This also applies to FIG. 26 to be described later.

Due to the rotation of the cam plate 132, the roller 138 rolls to the contact surface 136b, and the attitude and position of the link member 140 are changed accordingly. Other members constituting the link mechanism 101 are also in contact with the cam plate 132. The upper tooth row 102 and the lower tooth row 104 are brought close to each other by the change in position and attitude of the plural link members due to the rotational movement of the cam plate 132, that is, by the action of the link mechanism 101. Prior to this, the pressing pieces 110 and 112 are in contact with the bundle 118 of sheets from above and below. That is, the bundle 118 of sheets is sandwiched between pressing pieces 110 and 112. This proximity state also occurs during the return operation process after the binding operation process. In this state, the bundle of sheets is surely separated from the upper tooth row 102 and the lower tooth row 104 by the action of the pressing pieces 110 and 112.

FIG. 26 illustrates the intermeshing state. The cam plate 132 is further rotated, and the roller 138 reaches the back side of the contact surface 136b. The leading end of the link member 142 flips up in contact with the contact surface 134. The upper tooth row 102 and the lower tooth row 104 intermesh with each other with the bundle 118 of sheets sandwiched therebetween due to the change in position and attitude of these link members, that is, by the action of the link mechanism 101. At that time, the pressing pieces 110 and 112 are located at positions slightly retracted from the bundle 118 of sheets so as not to affect the intermesh between the upper teeth row 102 and the lower teeth row 104. However, as long as the intermesh can be formed with an appropriate load, the pressing pieces 110 and 112 may be in contact with the bundle 118 of sheets in an intermeshed state. After the intermeshing state is formed, the return operation is executed. In this course, the proximity state illustrated in FIG. 25 occurs, and finally returns to the standby state illustrated in FIG. 24.

The configurations illustrated in FIGS. 24 to 26 are merely examples, and various mechanisms constituting the needleless binding device 100 may be adopted. In the configurations illustrated in FIGS. 24 and 26, the movement of the above-described plural arm members is realized only by the rotational movement of the cam shaft by a single driving source. This configuration is implemented at low costs when paying attention on the electric configuration.

The encoder for detecting the rotational speed is provided on the motor shaft or another rotating shaft. For example, the load sensor is provided in the vicinity of the upper tooth row 102 and the lower tooth row 104 and at a position to receive the binding load. In addition, an origin sensor, a limit switch and the like are provided as necessary.

(3) Control of Binding Operation Speed

Hereinafter, the control of the operation of the needleless binding device will be described in detail. In the present exemplary embodiment, the controller in the image forming unit controls the operation of the needleless binding device, in particular, a binding operation speed and a return operation speed.

According to experiments conducted by the inventors, it has been found that a breakage point is more likely to occur within a binding part in the low-humidity environment (low-temperature, low-humidity environment) than the normal environment (high-temperature, high-humidity environment or general environment). When the breakage point occurs, the binding force decreases, which greatly decreases the quality of the binding part. On the premise of a bundle of sheets consisting of a certain number of sheets, it is necessary to apply a corresponding binding load in order to stably form the binding part, but at the same time, it is required to prevent occurrence of the breakage point as much as possible. In the present exemplary embodiment, the operation of the needleless binding device, particularly the binding operation speed, is controlled according to the environment. That will be specifically described below.

Figure 27:
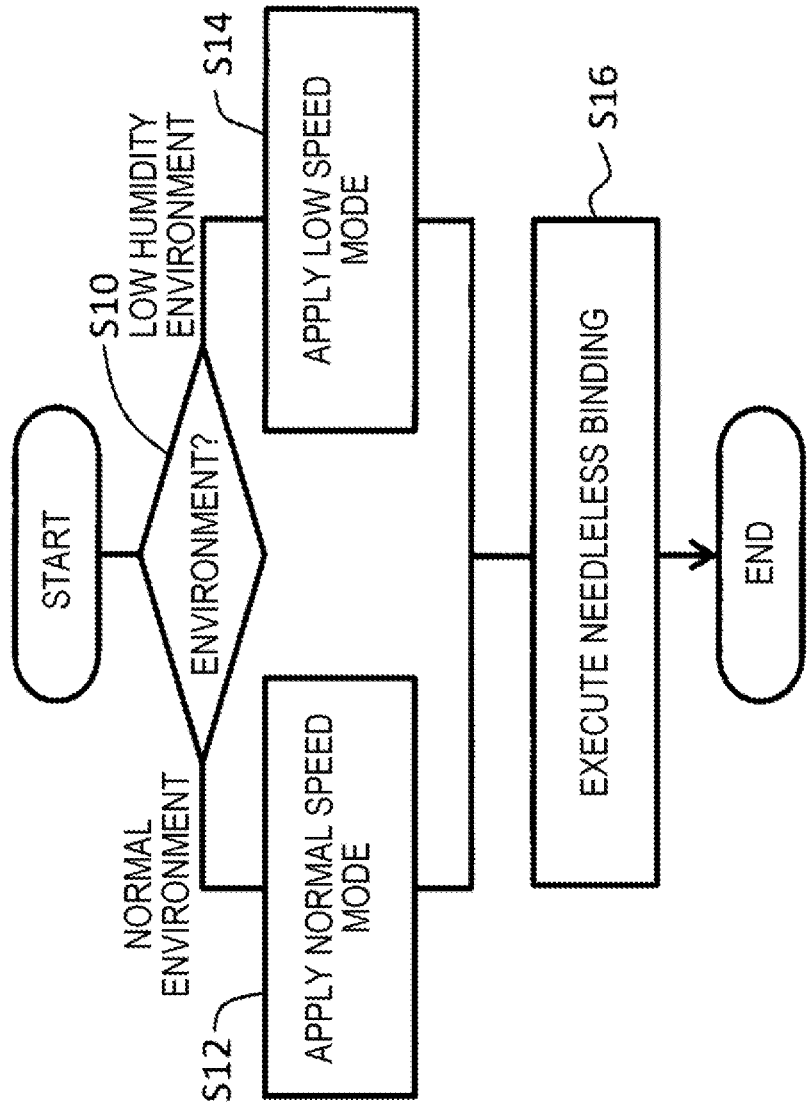
FIG. 27 is a flowchart illustrating a first operation example.

FIG. 27 illustrates a first operation example (first control example). In S10, based on the humidity detected by the humidity sensor, the controller in the image forming unit determines whether the current environment is the normal environment or the low-humidity environment. For example, by comparing the detected humidity with a threshold value, it is determined whether the current environment is the normal environment or the low-humidity environment. Humidity is one piece of information related to sheet stretchability. The low-humidity environment corresponds to a situation in which the sheets are less stretchable (the first situation), and the normal environment corresponds to a situation in which the sheets are stretchable (the second situation). Based on other information indicating the sheet stretchability, the environment in which the sheet is placed may be determined. As environmental information, temperature may be referred to instead of humidity, or both humidity and temperature may be referred to.

When it is determined in S10 that the current environment is the normal environment, the controller selects a normal speed mode in S12. In the normal speed mode, a binding operation is performed at a predetermined binding operation speed on the premise that a predetermined load (e.g., 6000 N) is applied to the bundle of sheets. Meanwhile, when it is determined in S10 that the current environment is the low-humidity environment, the controller selects a low speed mode in S12. In the low speed mode, a binding operation is performed at a binding operation speed that is slower than the predetermined binding operation speed on the premise that the predetermined load is applied to the bundle of sheets.

In S16, needleless binding is executed according to the speed mode selected in S12 or S14. That is, in the normal environment, the binding operation is executed at the predetermined binding operation speed. In the low-humidity environment, the binding operation is executed at a reduced binding operation speed. Here, from the viewpoint of preventing or reducing occurrence of a defective point, the binding operation speed to be controlled is a binding operation speed at the time of actually forming the binding part in the entire binding operation process, more specifically, a relative approaching movement speed of the upper tooth row and the lower tooth row at the start of formation of the binding part.

According to the above control, in the low-humidity environment where the sheet is less stretchable, the binding operation speed is set lower than the predetermined operation speed, a defective point (breakage point) is less likely to occur in the binding part. That is, the quality of the binding part can be enhanced in the low-humidity environment. Meanwhile, according to the above control, the binding operation time may be shortened in the normal environment as compared with a case where the binding operation speed is always set to be low independently of the environment.

Figure 28:
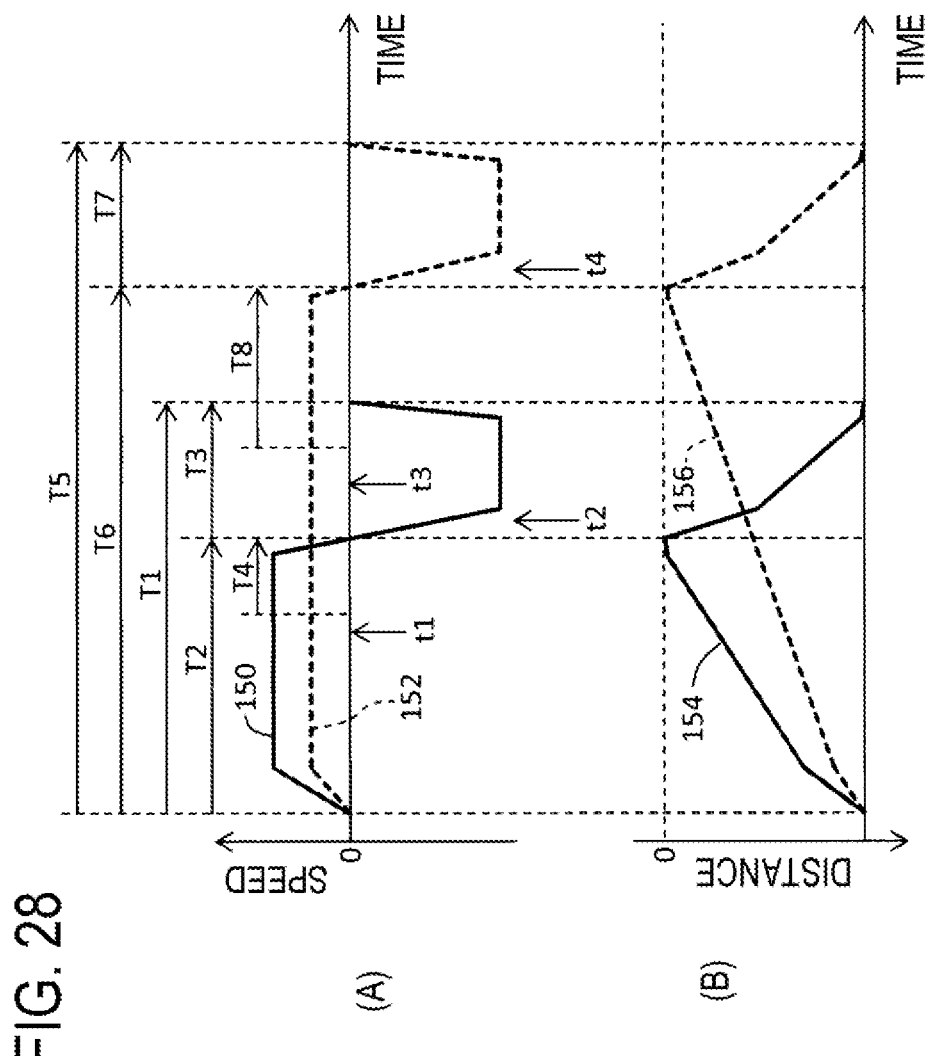
FIG. 28 is a view illustrating a speed change and a distance change in the first operation example.

The above-described first operation example will be described in more detail with reference to FIG. 28. In FIG. 28, a graph (A) represents a speed profile 150 when the normal speed mode is selected, and a speed profile 152 when the low speed mode is selected. The controller controls the binding operation speed and the return operation speed according to the speed profile selected according to the environment. The speed shown on the vertical axis is the relative movement speed between a pair of tooth rows, which corresponds to the rotational speed of the cam plate and the rotational speed of the motor. As illustrated in FIGS. 24 to 26, when each tooth row moves in the z direction and also in the x direction, the speed on the vertical axis in the graph (A) of FIG. 28 corresponds to a speed component in the z direction.

In FIG. 28, a graph (B) represents a distance profile 154 representing a change in distance between the pair of tooth rows when the normal speed mode is selected, and a distance profile 156 representing a change in distance between the pair of tooth rows when the low speed mode is selected. As illustrated in FIGS. 24 to 26, when each tooth row moves in the z direction and also in the x direction, the distance on the vertical axis in the graph (B) corresponds to a distance in the z direction. The distance at the point of time when the intermeshing state occurs and the approaching movement of the pair of tooth rows is stopped is set to 0. In the graphs (A) and (B), the profiles are schematically shown so as to clarify their characteristics or tendencies.

In the speed profile 150 in the normal speed mode, T1 represents the entire period of the binding process, T2 represents a binding operation period, and T3 represents a returning operation period. T4 represents a binding part forming period from the start of binding part formation to the end of binding part formation (the intermeshing stopping time). At a timing t1 before the start of binding part formation, the pair of pressing pieces comes into contact with the bundle of sheets. Thereafter, before the pair of tooth rows comes into contact with the bundle of sheets, or before the intermeshing stopping time, the pair of pressing pieces is retracted from the bundle of sheets. The pair of pressing pieces may be kept in contact with the bundle of sheets as long as the pair of pressing pieces does not affect the binding load. At a timing t2 after the start of the returning operation, the pair of pressing pieces again comes into contact with the bundle of sheets. In this pressed state, the pair of tooth rows is retracted.

In the speed profile 152 in the low speed mode, T5 represents the entire period of the binding process, T6 represents a binding operation period, and T7 represents a returning operation period. T8 represents a binding part forming period from the start of binding part formation to the end of binding part formation (the intermeshing stopping time). At a timing t3 before the start of binding part formation, the pair of pressing pieces comes into contact with the bundle of sheets. At a timing t4 after the start of the returning operation, the pair of pressing pieces again comes into contact with the bundle of sheets.

Upon comparing the speed profiles 150 and 152 with each other, in the binding operation periods T2 and T6, particularly, in the binding part forming periods T4 and T8, the binding operation speed is lower in the low-humidity environment than in the normal environment. In the illustrated example, in the low-humidity environment, since the binding operation speed is almost halved, the binding part is formed considerably slowly. When a pressing force is suddenly applied to a sheet, the sheet may fail to be stretched along with the pressing force, so that a stress tends to concentrate on a specific point, which can easily cause tearing. However, when the pressing force is slowly applied to the sheet, the sheet can be easily stretched, which would be less likely to cause tearing. In order to obtain a constant holding force or binding force, it is necessary to apply a constant load. Even when applying the same load to the same bundle of sheets, in a case where the binding speed is made slow in accordance with the environment, it is possible to reduce the possibility of occurrence of a defective point.

Upon comparing the binding operation periods T2 and T6 with each other, the latter is longer than the former. In the illustrated example, the latter is about twice the former. Similarly, upon comparing the binding part forming periods T4 and T8 with each other, the latter is longer than the former. In the illustrated example, the latter is about twice the former. Preferably, in the normal state, the binding operation speed is controlled so as to attain the predetermined binding operation speed at least at the start of binding part formation. In the illustrated example, the binding operation speed reaches the predetermined binding operation speed in the first half of the binding operation process and this speed is maintained. In the low-humidity state, the binding operation speed is controlled so that the binding operation speed is reduced at least at the start of binding part formation.

Meanwhile, upon comparing the returning operation periods T3 and T7 with each other, the returning operation periods are substantially the same. That is, even in the low-humidity environment, the same return speed control as in the normal environment is applied. As a result, the entire period T5 under the low-humidity environment becomes longer than the entire period T1 under the normal environment, but is shorter than twice the entire period T1. That is, even in the low-humidity environment, the returning operation period T7 is shortened, thereby reducing the processing time. When the operation sequence is determined such that the time difference between the returning operation periods T3 and T7 is smaller than the time difference between the binding operation periods T2 and T6, the needleless binding process efficiency may be enhanced even under the low-humidity environment. In order to further improve the processing efficiency, the time difference may be substantially reduced to zero. That is, the binding operation periods T2 and T6 may be made substantially the same.

It is also conceivable that the binding operation speed is uniformly reduced regardless of the environment, but in that case, the processing efficiency cannot be enhanced in the normal environment. Meanwhile, according to the first operation example, the processing efficiency can be enhanced under the normal environment.

The link mechanism moves the pair of pressing pieces in conjunction with the movement of the pair of tooth rows. In the process of binding operation, the operation speed of the pair of pressing pieces is reduced in the low-humidity environment, as compared with the normal environment. In the above example, its operation speed is, for example, halved. Thus, the pair of pressing pieces comes into softer contact with the bundle of sheets in the low-humidity environment than in the high-humidity environment. Further, in the low-humidity environment, the pair of pressing pieces comes into contact with the bundle of sheets at a timing earlier than the start of binding portion formation, as compared with the normal environment. After the start of the returning operation, the period of time until the pair of pressing pieces come into contact with the bundle of sheets is constant, regardless of the environment.

Figure 29:
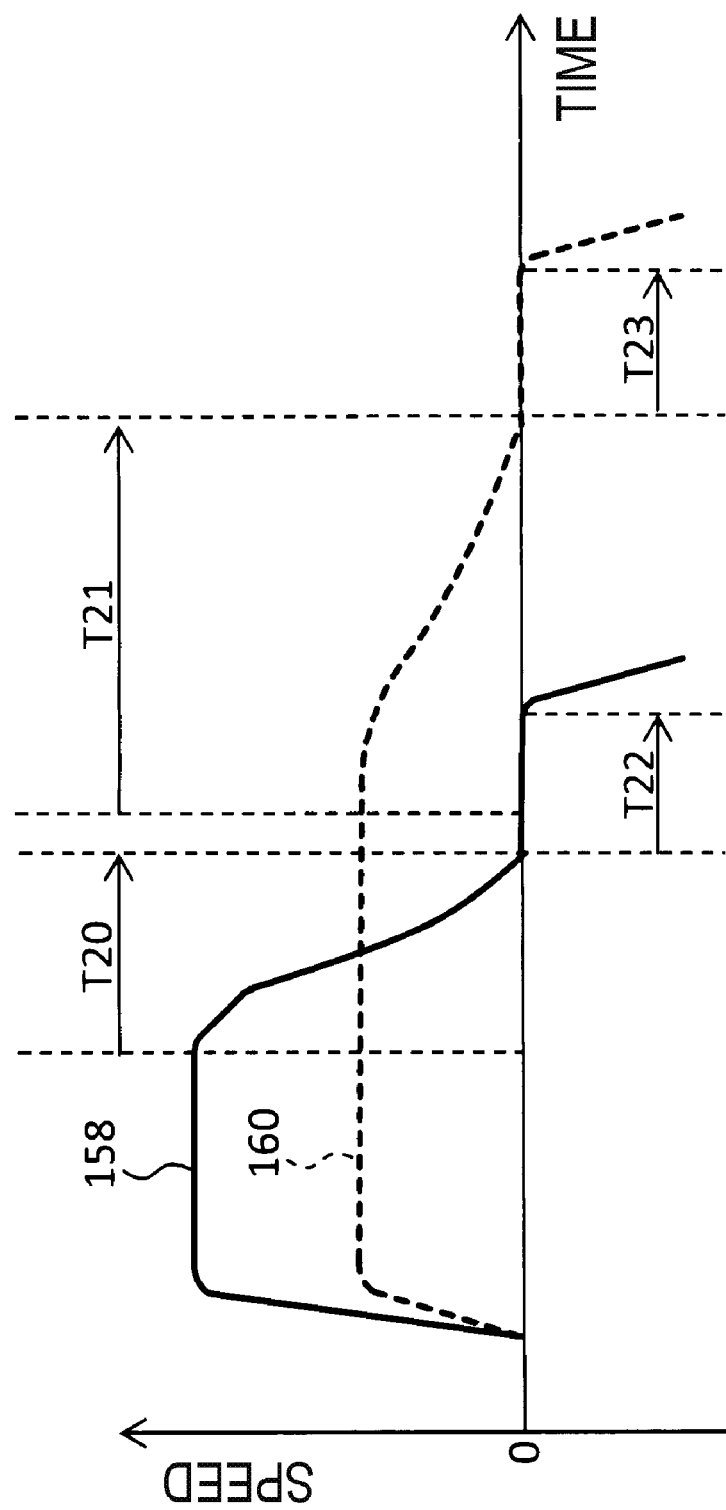
FIG. 29 is a view illustrating a speed change in a first modification.

FIG. 29 illustrates a first modification of the first operation example. A speed profile 158 represents a temporal change in binding operation speed when the normal speed mode is applied in the normal environment. A temporal change in returning operation speed is not illustrated in the speed profile 158. The profile form is slightly exaggerated in the longitudinal axis direction. In speed profiles 160 and 162 to be described below, a part thereof is not illustrated, and the profile form is exaggerated in the longitudinal axis direction.

The speed profile 160 represents a temporal change in binding operation speed when the low speed mode is applied in the low-humidity environment. T20 and T21 each represent a binding part forming period. Pausing periods T22 and T23 are provided after the binding part forming periods T20 and T21, that is, after intermeshing. The pausing periods T22 and T23 are periods for stabilizing the plastic deformation state of the bundle of sheets. The returning operation is executed after the pausing periods T22 and T23. The pausing period T23 under the low-humidity condition may be longer than or equal to the pausing period T22 under the high-humidity condition. In addition to changing the binding operation speed, other control parameters may be changed depending on the environment. For example, the binding load may be changed.

Figure 30:
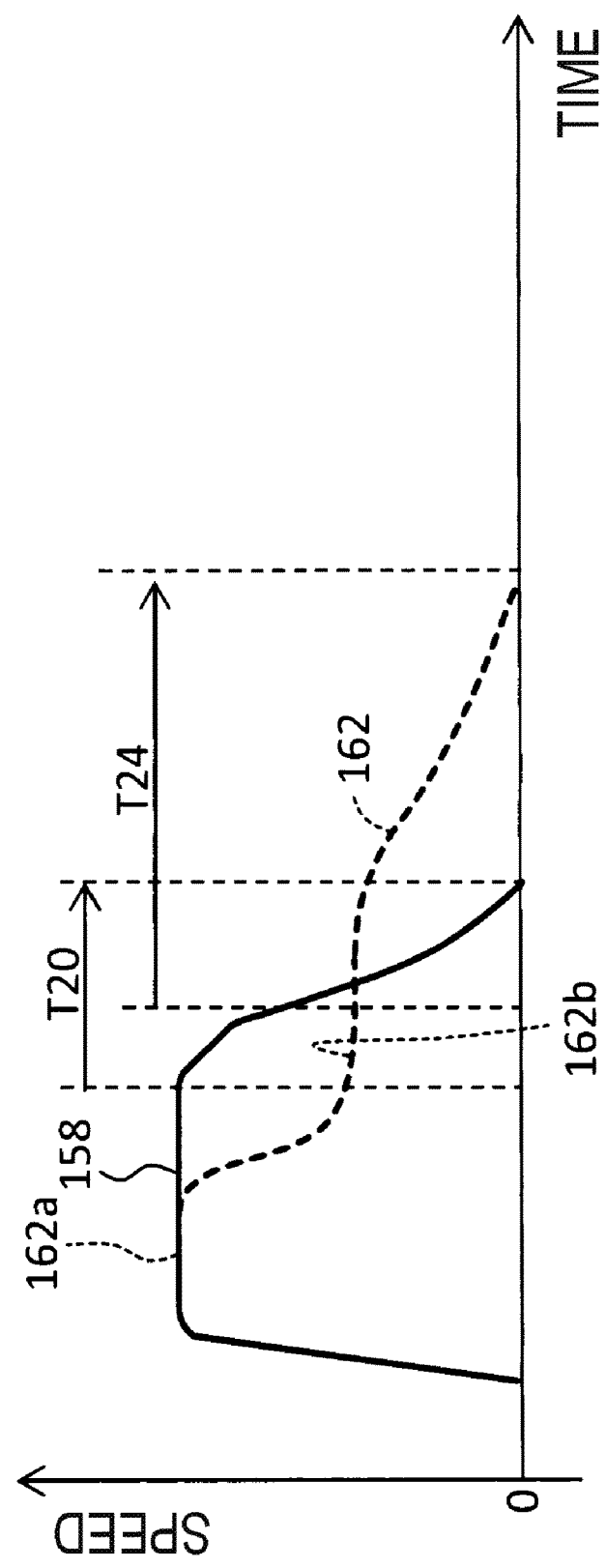
FIG. 30 is a view illustrating a speed change in a second modification.

FIG. 30 illustrates a second modification of the first operation example. A speed profile 158 represents a temporal change in binding operation speed when the normal speed mode is applied in the normal environment, which is the same as the speed profile 158 illustrated in FIG. 29. Meanwhile, a speed profile 162 represents a temporal change in binding operation speed when the low speed mode is applied in the low-humidity environment. T20 and T24 each represent a binding part forming period. Focusing on the speed profile 162, a large binding operation speed occurs at the initial stage, and a portion 162a thereof matches the speed profile 158. Thereafter, the binding operation speed is reduced (see reference numeral 162b), and the reduced binding operation speed is achieved at the start of binding part formation. That is, on the premise that the binding part is slowly formed, the initial binding operation speed is increased to shorten the entire binding operation period. However, according to such a second modification, in general, the speed control becomes complicated. In contrast, according to the first operation example, the speed control is simplified.

Figure 31:
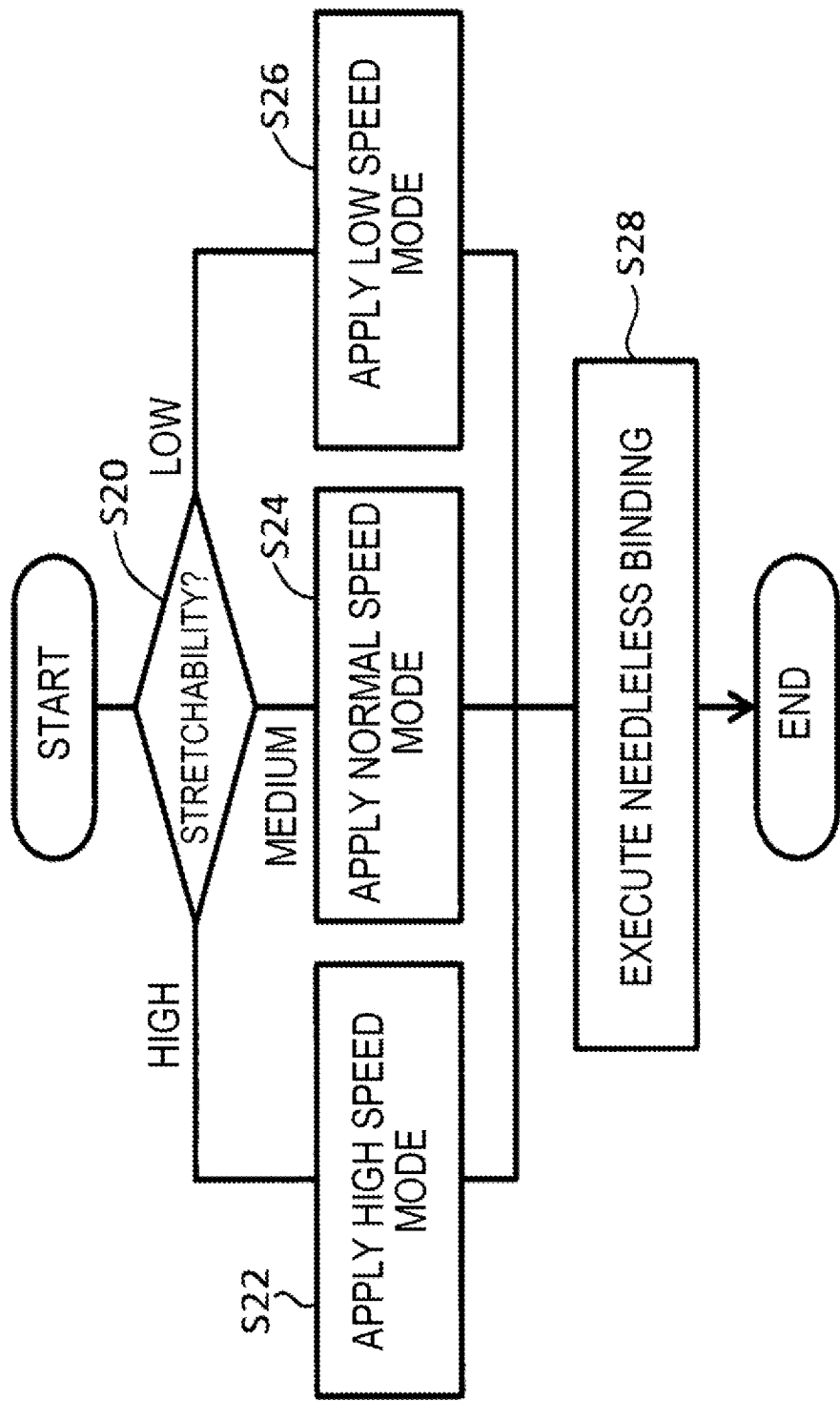
FIG. 31 is a flowchart illustrating a second operation example.

FIG. 31 illustrates a second operation example. In S20, the sheet stretchability in the current environment is evaluated. For example, the sheet stretchability is determined based on humidity, temperature, sheet quality, and other information related to the sheet stretchability. The humidity can be said to be an external factor that affects the sheet stretchability. The sheet quality can be said to be an internal factor that directly indicates the sheet stretchability. Therefore, in the second operation example, in a combination of humidity and sheet quality, the degree of sheet stretchability is evaluated on a specific sheet (bundle of sheets) that is an object of image formation under the current environment. The conditions at that time will be described later with reference to FIG. 32.

When it is determined in S20 that the degree of the sheet stretchability is "high," in the illustrated example, the high speed mode is selected in S22. The high speed mode is a mode for controlling the binding operation so that the binding operation speed exceeds the normal binding operation speed in the binding part forming process. When such a high speed mode is not permitted, the normal speed mode to be described below is selected in S22. When it is determined in S20 that the degree of the sheet stretchability is "medium," the normal speed mode is selected in S24. In the normal speed mode, the binding part is formed at a predetermined binding operation speed. When it is determined in S20 that the degree of the sheet stretchability is "low," as in the first operation example, the low speed mode is selected in S26. The low speed mode is a mode for controlling the binding operation so that the binding operation speed is lower than the normal binding operation speed at the time of forming the binding part.

In S28, the needleless binding process is actually executed according to the selected speed mode. According to the high speed mode, it is possible to further shorten the binding processing time while ensuring a constant binding part quality. According to the normal speed mode, it is possible to shorten the binding processing time while ensuring a constant binding part quality. According to the low speed mode, it is possible to reduce the possibility of occurrence of a defective point in the binding part. In the normal speed mode, the binding operation speed is controlled as illustrated in the speed profile 150 illustrated in FIG. 28. In the low speed mode, the binding operation speed is controlled as illustrated in the speed profile 152 illustrated in FIG. 28. In the high speed mode, the binding operation speed is controlled so that the binding operation speed becomes faster than that in the speed profile 150 illustrated in FIG. 28.

FIG. 32 illustrates the conditions for determining the sheet stretchability in S20 illustrated in FIG. 31. In the illustrated example, an environment 364 is roughly divided into high humidity (normal humidity) and low humidity. A sheet quality 366 is roughly divided into high and low from the viewpoint of tearing hardness. An overall evaluation 368 indicates the sheet stretchability under the current environment, which is roughly divided into high, medium, and low. When the sheet is at low humidity and is less stretchable, the overall evaluation is "low," and the low speed mode is selected (see reference numeral 370). When the sheet is at high humidity and is stretchable, the overall evaluation is "high," and the high speed mode is selected (see reference numeral 370). In the other two combinations, the overall evaluation is "medium," and the normal speed mode is selected (see reference numeral 370).

In the second operation example, since the sheet stretchability is evaluated in consideration of the sheet quality in addition to the humidity, a suitable speed mode can be easily selected depending on the situation. When a correlation is found between temperature and humidity, high humidity or low humidity may be determined based on temperature. Further, when the sheet moisture content can be measured, the speed mode may be selected based on the measured sheet moisture content. In the second operation example, both the binding operation speed and the binding load may be changed according to the sheet stretchability. The number of sheets constituting the bundle of sheets may be further taken into consideration in the binding speed control.

Sheet quality information may be registered in the image forming unit by a user or beforehand. Alternatively, sheet quality information may be given to the image forming unit from an external device connected to the image forming unit. A sensor for measuring a sheet quality may be provided in the image forming unit or in the post-processing unit, thereby obtaining the sheet quality information. It is also conceivable to inquire the user about the type or nature of a sheet and obtain information on the sheet quality from the user. A function of manually designating the environment or the sheet stretchability by the user may be added. If the binding part is torn, it may be automatically or manually registered in the image forming unit and the sheet quality information may be generated based on such registered information. As described above, the sheet quality information can be acquired by various methods. A part for acquiring the sheet quality information is a sheet quality information acquiring part.

(4) Summary of Disclosure

The image forming apparatus according to the exemplary embodiment includes a needleless binding device and a controller. The needleless binding device has a pair of tooth rows and is configured to form a recessed or raised impression as a binding part by pinching a bundle of sheets therebetween. The controller controls the operation of the needleless binding device according to information on the stretchability of the sheets so that the binding part is more slowly formed in a first situation where the sheets are less stretchable than in a second situation where the sheet is stretchable.

With this configuration, the binding part is slowly formed in the first situation, so that the possibility of occurrence of one or more defective points (breakage points causing binding force lowering) is reduced in the recessed or raised impression as the binding part. That is, the quality of the binding part can be maintained or improved. Meanwhile, the binding part is formed faster in the second situation than in the first situation, so that the binding processing time is shortened.

From another viewpoint, the controller controls the operation of the needleless binding device according to at least a detected humidity. For example, the controller controls the binding operation of the needleless binding device so that the binding part is formed in a longer time in a low-humidity situation than in a high-humidity situation.

As described above, in the image forming apparatus according to the exemplary embodiment, the binding operation is suitable for the sheet stretchability, so that a defective point hardly occurs in the binding part in the first situation or the low-humidity situation, and the binding processing time is shortened in the second situation or the high-humidity situation.

The information on the sheet stretchability is for performing the above-described operation control, and includes, for example, information directly indicating the sheet stretchability, information influencing the sheet stretchability, or information having a certain correlation with the sheet stretchability. The information includes, for example, a detected environmental value, a measured sheet value, or information indicating the nature or state of the sheet. The first and second situations are relative concepts, and are not individually strictly defined. Generally, the first situation where the sheets are less stretchable is typically a low-humidity condition or a low-temperature, low-humidity condition. However, the first situation may be any condition under which the sheets are less stretchable than in the second situation. Similarly, the second situation where the sheets are stretchable is typically a high-humidity condition (including a normal humidity condition) or a high-temperature, high-humidity condition (including room temperature and a normal humidity condition). However, the second situation may be any condition under which the sheets are generally stretchable as compared with the first situation.

In addition, the speed of binding part formation may be changed to three or more stages according to three or more situations. Alternatively, the speed of binding part formation may be continuously changed according to a continuous change in situation. Even in those cases, the first and second situations can be conceived. In addition to the information on the sheet stretchability, the speed of binding part formation may be changed in consideration of, for example, the number of sheets constituting the bundle of sheets. Depending on the situation, the binding load may be changed together with the speed of binding part formation.

In the exemplary embodiment, the information on the stretchability of sheets includes a value detected by the environment sensor. According to this, the binding operation is performed taking into account the influence of the environment on the sheets. The environment sensor typically detects one or both of humidity and temperature. When the binding operation is controlled in consideration of both the detected value and the sheet quality information, the binding operation is performed taking into account the influence of the environment on the sheets and the nature of the sheets themselves, so that a defective point is less likely to occur in the binding part in the first situation.

In the exemplary embodiment, the controller controls the binding operation speed in the binding operation according to the information on the stretchability of sheets so that the binding part is slowly formed in the first situation. That is, the speed of binding part formation is changed by controlling the binding operation speed of the needleless binding device. In general, the binding operation speed is a movement speed in relative movement of a pair of tooth rows, but it can also be regarded as a rotational speed of, for example, a cam or a motor which causes the movement. A mode in which the binding operation is controlled indirectly or as a result of actions may be used instead of a mode in which the binding operation speed is controlled directly. Further, the pressing force, the stroke length, or other operation conditions than the binding operation speed may be changed so that the binding part can be formed more slowly in the first situation where the sheets are less stretchable than in the second situation where the sheets are stretchable.

In the exemplary embodiment, on the premise that the same load is applied to the same type of sheet bundles, the binding operation speed is controlled so that the binding operation time in the first situation is longer than the binding operation time in the second situation or the binding operation speed at the start of binding part formation in the first situation is lower than the binding operation speed at the start of binding part formation in the second situation. As described above, the slow binding operation prevents a breakage point from occurring in the binding part in the first situation. The time taken to form the binding part is generally short. In order to slowly form the binding part, a lower binding operation speed should be typically used at the start of binding part formation, which makes the binding operation control reliable and simple.

In the exemplary embodiment, the needleless binding device performs a returning operation after the binding operation, and the controller controls the binding operation speed and the returning operation speed, in which the binding operation time in the first situation is referred to as a first binding operation time, the binding operation time in the second situation is referred to as a second binding operation time, the returning operation time in the first situation is referred to as a first returning operation time, the returning operation time in the second situation is referred to as a second returning operation time. The returning operation time difference between the first returning operation time and the second returning operation time is smaller than the binding operation time difference between the first binding operation time and the second binding operation time. Such control makes it possible to shorten the time required for the binding process in the first situation while preventing or reducing the occurrence of a breakage point, which would otherwise occur if a long time is taken to form the binding part. That is, since the returning operation speed is not directly related to the occurrence of the breakage point, the returning operation speed can be increased so that the binding processing time can be shorten. The returning operation time difference may be substantially zero. For example, it can be said that the returning operation time difference is zero when the returning operation time difference is within 5% of the binding operation time difference normalized to 100%. For example, the speed profile in the returning operation process in the first situation may be substantially equal to the speed profile in the returning operation process in the second situation.

In the exemplary embodiment, the needleless binding device has a pressing member in contact with the bundle of sheets in the binding operation, and the controller controls the pressing operation speed of the pressing member according to the information on the sheet stretchability, so that the pressing action of the pair of pressing pieces becomes slower in the first situation than in the second situation. With this configuration, the physical action by the pressing member to exert on the bundle of sheets is more relaxed in the first situation than in the second situation. The pressing member may include, for example, a single pressing piece or plural pressing pieces. In the exemplary embodiment, a pair of tooth rows and a pair of pressing pieces are operated in conjunction by a single driving source.

Third Exemplary Embodiment

Hereinafter, a third exemplary embodiment will be described with reference to the accompanying drawings.

(1) Image Forming Apparatus

Figure 33:
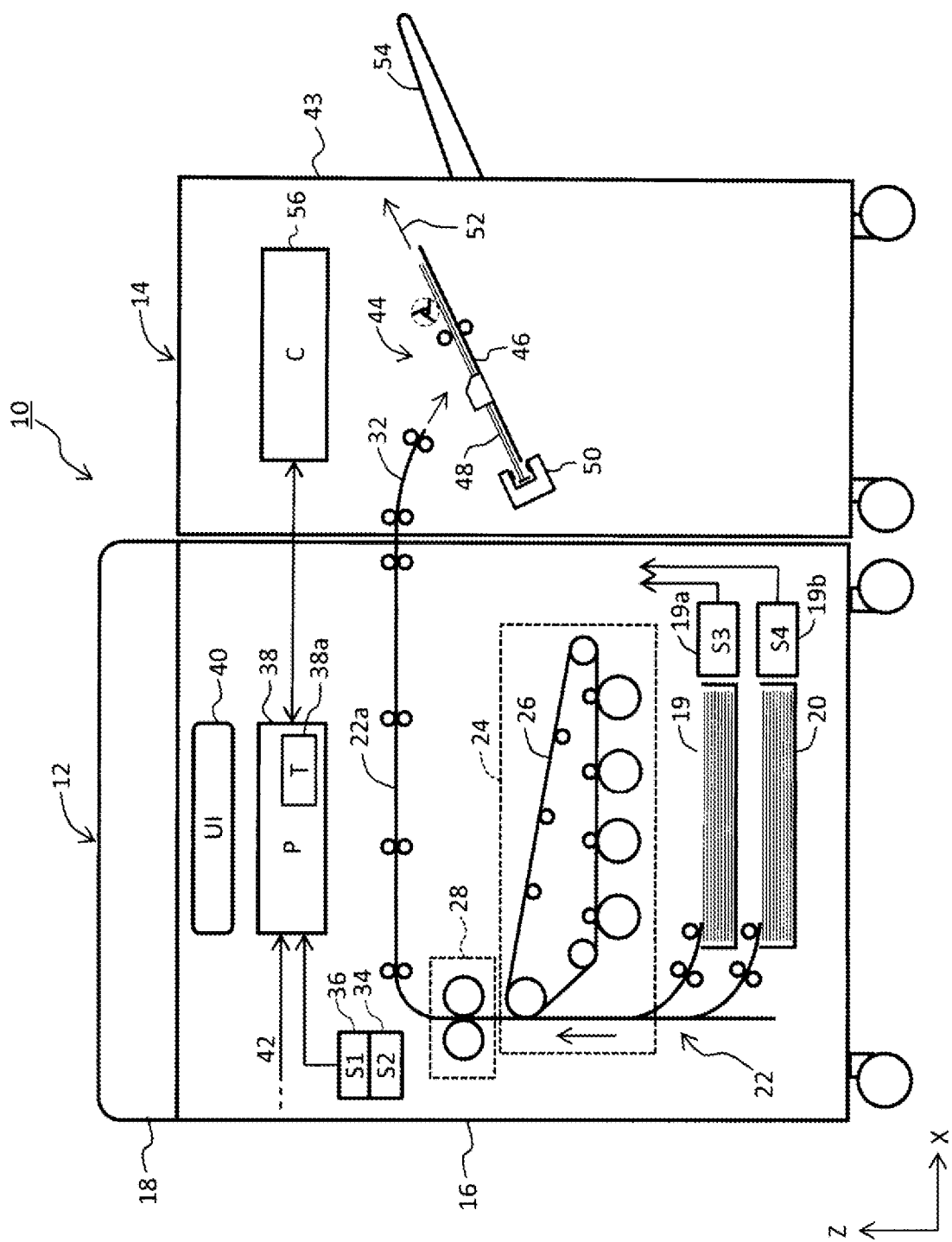
FIG. 33 is a schematic view illustrating an image forming apparatus according to another exemplary embodiment.

FIG. 33 illustrates a schematic configuration of an image forming apparatus according to a third exemplary embodiment. This apparatus is similar to the apparatuses of the first and second exemplary embodiments, but is different therefrom in terms of features to be described below.

A sensor unit S3 provided in a sheet feeding cassette 19 is configured by a sensor for detecting running out of sheet and a sensor for detecting the setting state of the sheet feeding cassette. Output signals from these sensors are sent to a controller 38. Similarly, a sensor unit S3 provided in a sheet feeding cassette 19 includes a sensor for detecting running out of sheet and a sensor for detecting the setting state of the sheet feeding cassette. Output signals from these sensors are sent to a controller 38.

The controller 38 has a timer 38a. As necessary, the elapsed time after setting is measured for each of the sheet feeding cassettes 19 and 20 by the timer 38a. Specifically, after detection of running out of sheet, the sheet feeding cassettes 19 and 20 are drawn out and a stack of sheets is accommodated in the stack of sheets cassettes 19 and 20. Thereafter, when the sheet feeding cassettes 19 and 20 are set, the timer 38a starts time counting. Thereafter, each time indicated by the timer 38a is the elapsed time after the stack of sheets is loaded. As will be described later, by comparing the elapsed time with a threshold value, it is determined whether a sheet is in a moisture-uncontrolled state or in a moisture-controlled state. A wrapped stack of sheets maintains the sheet moisture content within a certain range. However, when the stack of sheets is unwrapped, the sheet moisture content gradually changes depending on the environment. For example, when 24 hours have elapsed after the setting, it is determined that the sheet is in the moisture-controlled state close to the environmental humidity. That will be described in detail later.

As described above, the needleless binding mechanism 44 is a mechanism that forms a recessed or raised impression as a binding part on a bundle of sheets by a crimping method. The binding part is usually formed at the end portion of the bundle of sheets. However, the binding part may be formed in a portion other than the end portion of the bundle of sheets.

(2) Configuration and Operation of Needleless Binding Mechanism

Figure 45:
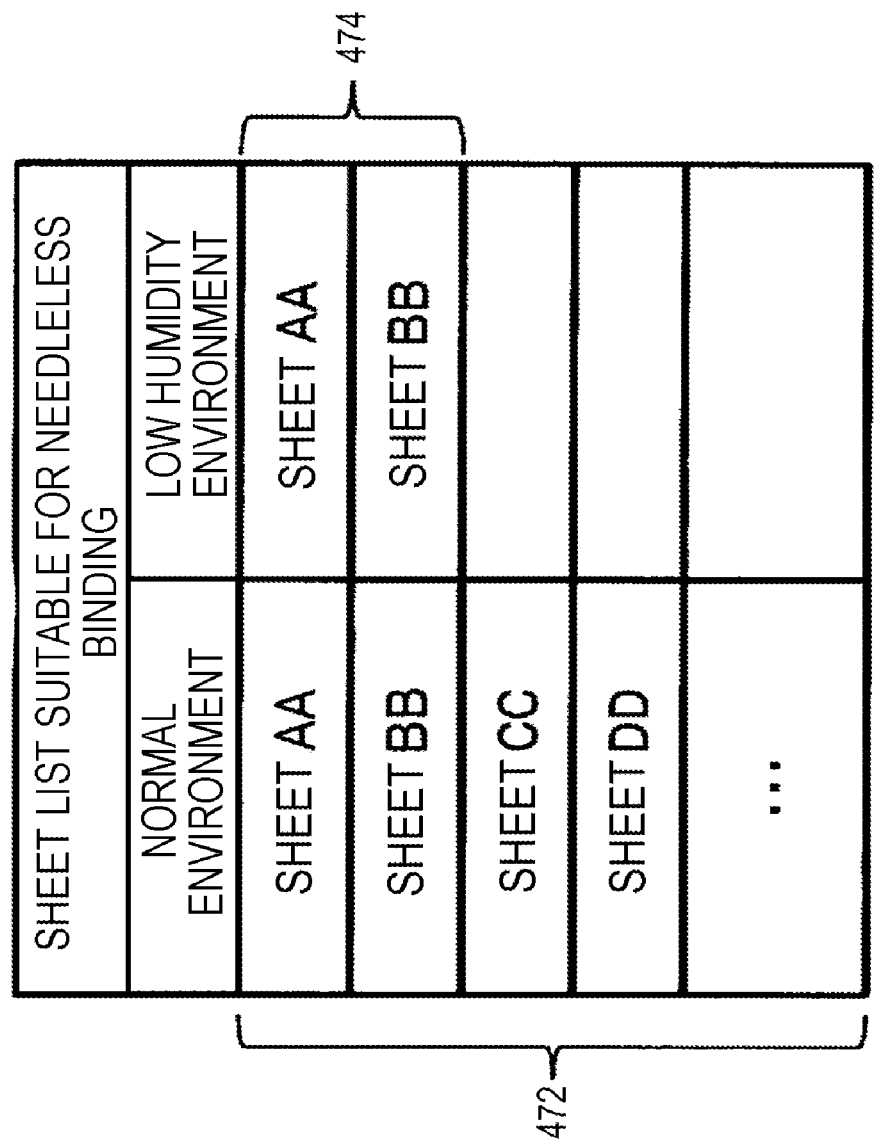
FIG. 45 is a view illustrating an example of a compatible sheet table.

The needleless binding mechanism 44 in the third exemplary embodiment has the same configuration and operation as that in the second exemplary embodiment. The specific configuration thereof is illustrated in FIG. 2. The main part of the needleless binding device is illustrated in FIG. 3. The intermeshing state of the upper tooth row 66 and the lower tooth row 68 is illustrated in FIG. 45.

The electrical configuration of the needleless binding device 50 is schematically illustrated in FIG. 46 and is similar to that in the second exemplary embodiment.

The PWM controller 82 is used to control the rotational speed of the motor 84 by varying a pulse width, that is, a duty. The PWM controller 82 is also used to control the binding load by varying the number of pulses. In addition, the PWM control is an example and may adopt a control system suitable for the type of the motor 84. For example, the binding load and the binding speed may be controlled by a voltage, a current, a frequency and others.

Figure 47:
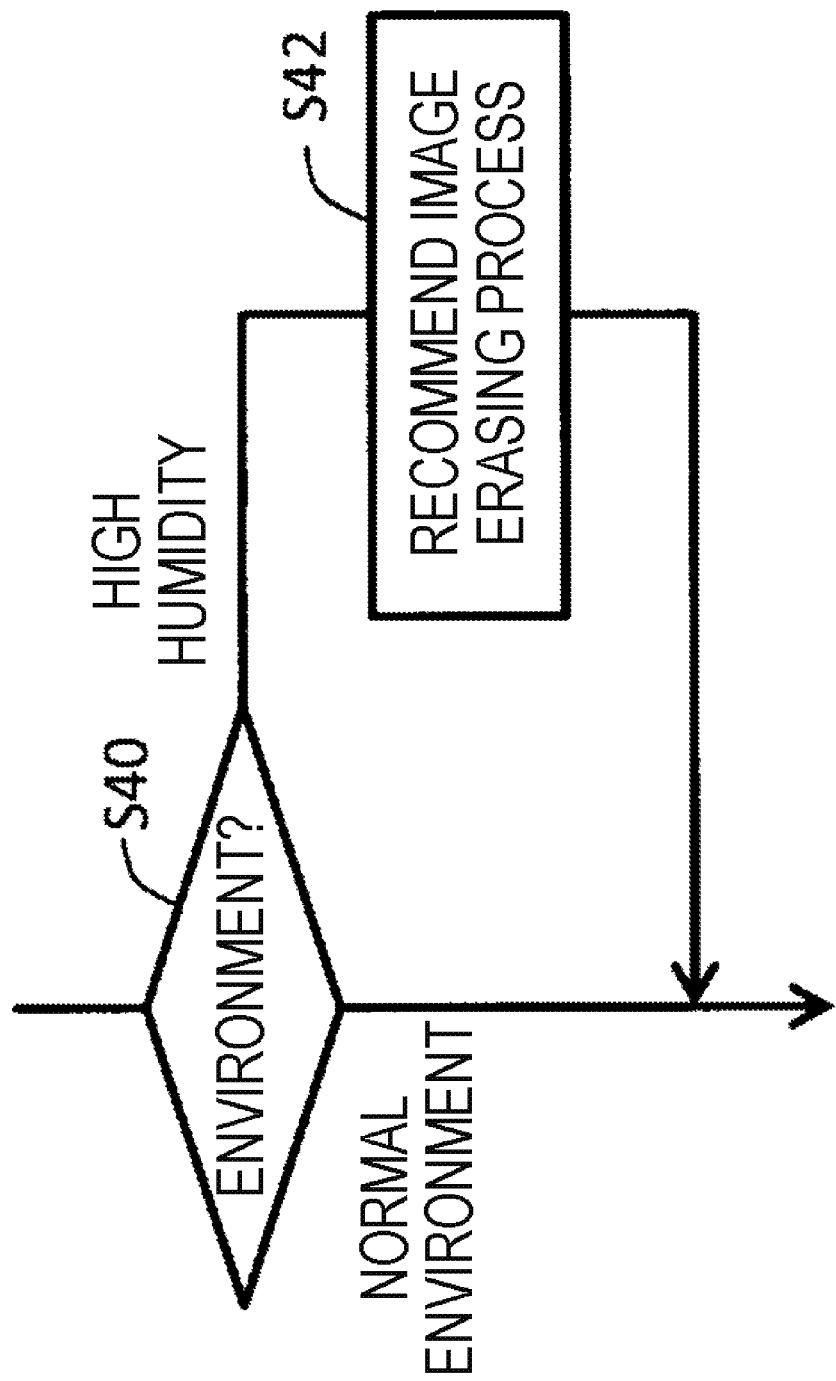
FIG. 47 is a view illustrating a second example of the display control before the binding operation.

The upper surface of the loading plate 46 is exemplified in FIG. 47 and is similar to that in the second exemplary embodiment. In FIG. 47, the rail 90 is conceptually illustrated.

A specific configuration example and operation example of the needleless binding device in the third exemplary embodiment are similar to those in the second exemplary embodiment illustrated in FIGS. 22 to 26.

(3) Binding Operation Control

Next, the control of the needleless binding device will be described in detail. As described above, the binding operation of the needleless binding device is controlled by the controller in the image forming unit. In this exemplary embodiment, the operation mode of the needleless binding device includes a normal mode and a paper dust reduction (paper dust clogging reduction) mode.

Figure 34:
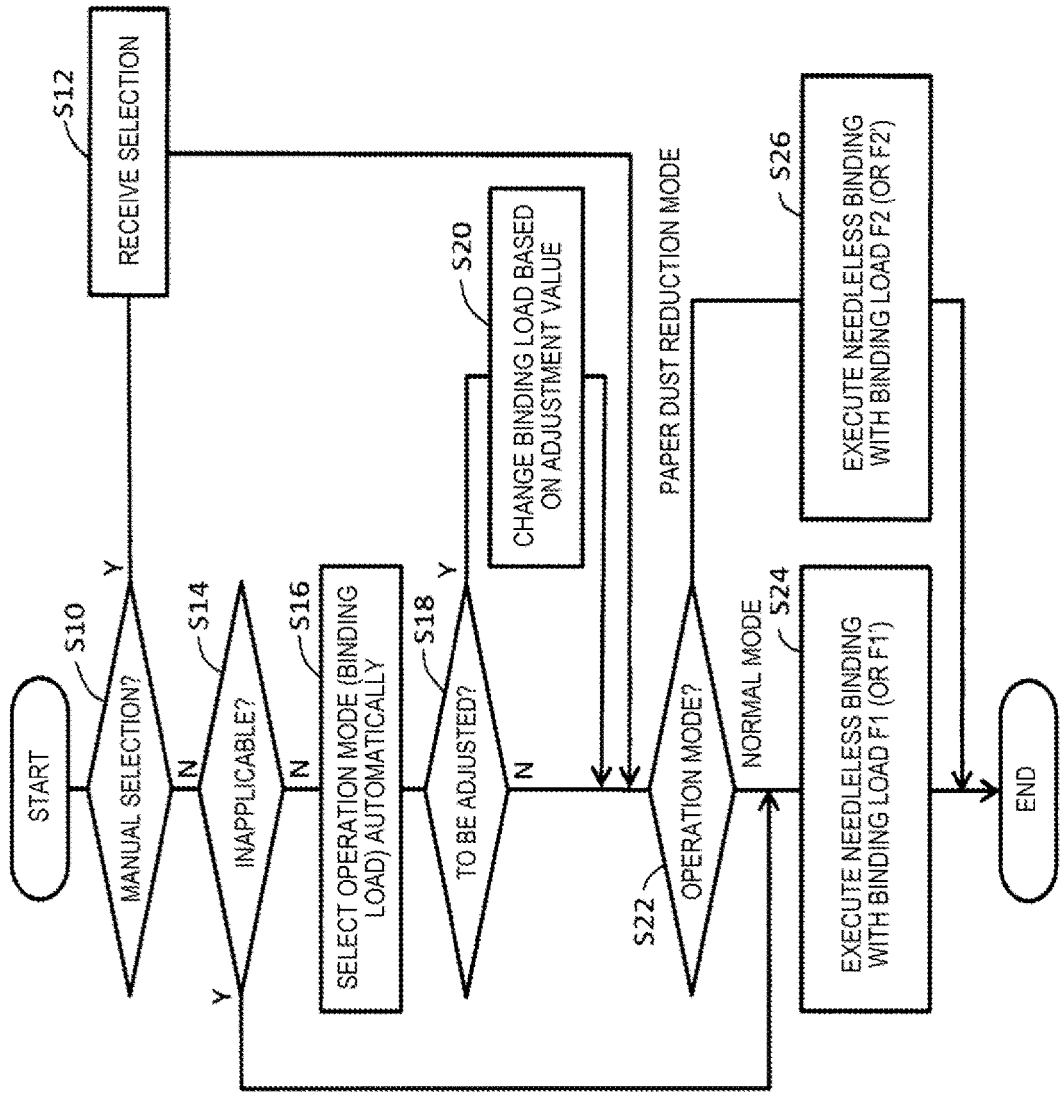
FIG. 34 is a flowchart for explaining a binding operation control.

The control illustrated in FIG. 34 is executed when needleless binding is designated. In S10, it is determined whether or not manual selection of the operation mode is requested. When a user desires to manually select the operation mode, the operation mode selected by the user is received in S12.

When manual selection of the operation mode is not requested, in S14, the controller determines whether or not to exclude the operation mode automatic selection function. For example, as illustrated in FIG. 35, when the user turns off the operation mode automatic selection function, when the operation mode automatic selection function corresponds to a predetermined non-applicable determination condition, such as when the needleless binding target is a specific type of sheet (for example, a sheet containing a lot of ash), or when an image exists in the binding target portion, the automatic operation mode selection function is excluded.

Figure 36:
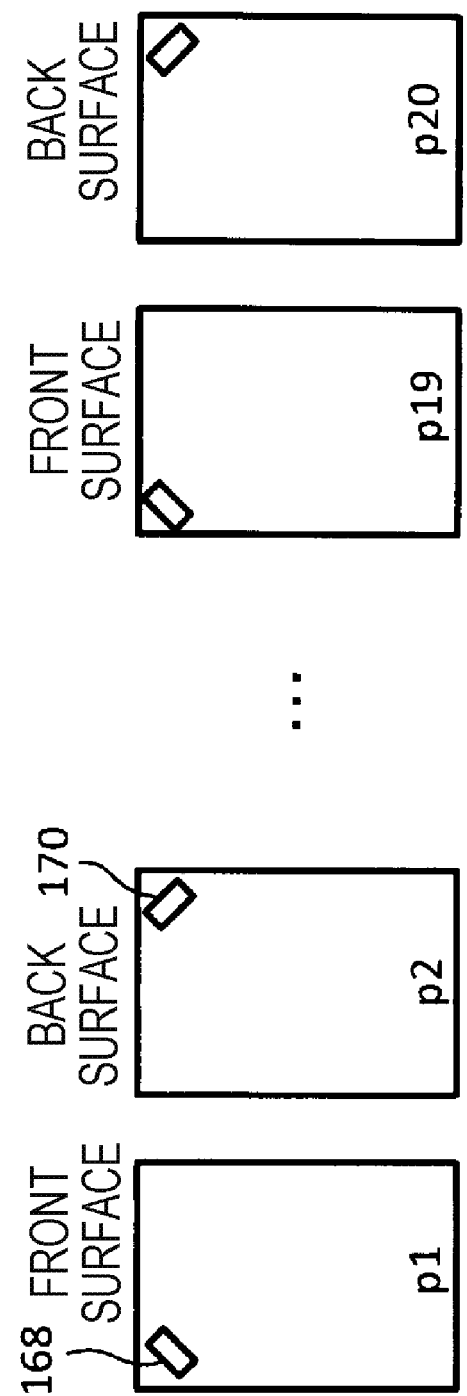
FIG. 36 is a view illustrating a portion where a binding portion is formed.

For example, as illustrated in FIG. 36, when binding target portions 168 and 170 are specified in each sheet constituting a bundle of sheets and at least one of all the binding target portions 168 and 170 includes an image, the operation mode automatic selection function may be excluded from application. When an image is included in a binding target portion, since the binding force tends to be weakened, the quality of the binding part is prioritized rather than the residual paper dust. In a case where duplex printing is performed as illustrated in FIG. 36, it is investigated whether or not there is an image in the binding target portions 168 and 170 for each of the front side and the back side.

Meanwhile, when it is determined in S14 illustrated in FIG. 34 that the operation mode automatic selection function does not correspond to the non-applicable determination condition, the controller automatically selects the operation mode in S16. FIG. 37 illustrates a first example of the operation mode selection method. As illustrated, for example, when the environment 450 is low humidity, the normal mode is selected as the operation mode 452. The standard binding load 454 in the normal mode is, for example, 5,000 N. When the environment 450 is high humidity, the paper dust reduction mode is selected as the operation mode 452. The standard binding load 454 in the paper dust reduction mode is, for example, 4,500 N. That is, in the high-humidity environment, since paper dust is liable to remain and paper dust clogging is liable to occur, by reducing the binding load (e.g., reducing the binding load by 10%), paper dust is prevented from remaining as much as possible, thereby reducing the possibility of paper dust clogging. In the high-humidity environment, since constant binding part quality can be obtained without increasing the binding load, even when the binding load is reduced to a certain level in the paper dust reduction mode, no major problem usually occurs. In a case where the quality of the binding part is problematic due to the reduction of the binding load, it is only necessary to manually select the normal mode (see S12) or to turn off the operation mode automatic selection function. By the turning-off, the process shifts from S14 to S22 in FIG. 34. That is, as a result, the paper dust reduction mode is not selected. In addition, a manual adjustment function to be described below may be used to change the actual binding load from the standard binding load.

In the exemplary embodiment, the controller determines, based on a value detected by the humidity sensor, whether the sheet is under a low or high-humidity condition. For example, the determination is made by comparing the detected humidity with a threshold value. Here, the low and high-humidity conditions are relative concepts and may be determined as desired. Where a correlation is found between the temperature and the humidity, it may be determined, based on a value detected by the temperature sensor, whether the sheet is under a low- or high-humidity condition. From a combination of humidity and temperature, a low-temperature, low-humidity condition and a high-temperature, high-humidity condition may be determined so that binding operation conditions suitable for each condition can be used.

In S18, the controller determines whether or not adjustment of the binding load in the manual is required. An adjustment value may be designated in advance. Alternatively, in S18, an inquiry about necessity of adjustment may be made to the user. When the adjustment value is designated, in S20, the standard binding load is adjusted by the adjustment value, whereby the actual binding load is set.

Figure 38:
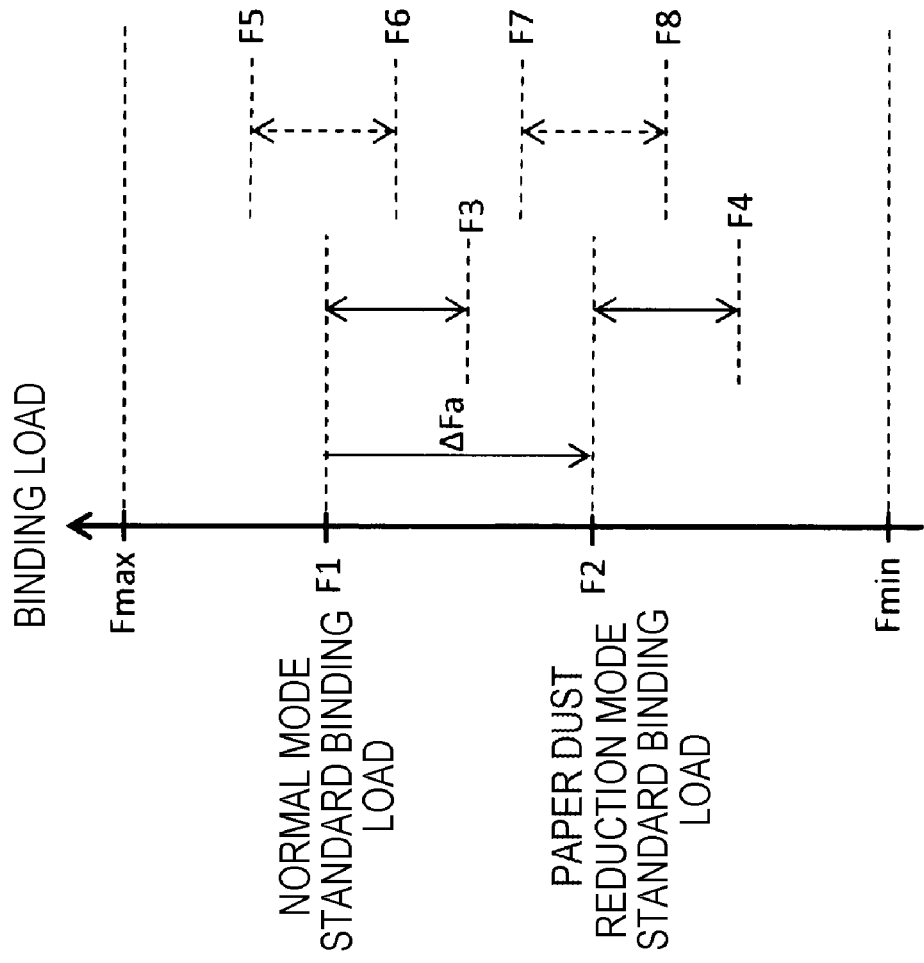
FIG. 38 is a view for explaining a standard binding load and its adjustment.

Here, the manual adjustment of the binding load will be described with reference to FIG. 38. Fmax represents the binding load maximum value, and Fmin represents the binding load minimum value. The standard binding load in the normal mode is denoted by F1, and the standard binding load in the paper dust reduction mode is denoted by F2. For example, when each standard binding load is determined as the upper limit value of an adjustable range, in the normal mode, a binding load F1' after adjustment within a range from the standard binding load F1 to a binding load F3 lower than the standard binding load F1 may be designated. When an adjustment value $\Delta F$ is designated in advance, the adjustment value $\Delta F$ is subtracted from the binding load F1 to determine the adjusted binding load F1'. When the paper dust reduction mode is selected, a binding load F2' after adjustment within a range from the standard binding load F2 to a binding load F4 lower than the standard binding load F2 may be designated. Even in this case, when an adjustment value $\Delta F$ is designated in advance, at the point of time when the operation mode is determined, the adjustment value $\Delta F$ is subtracted from the standard binding load F2 to determine the adjusted binding load F1'.

Each standard binding load may be determined as an intermediate value of the adjustable range. In that case, as illustrated in FIG. 38, in the normal mode, the binding load can be adjusted in the vertical direction within a range from a binding load F5 to a binding load F6 on the basis of the standard binding load F1. In that case, the adjustment value may be designated in advance in the form of $+\Delta F$ or $-\Delta F$. Similarly, in the paper dust reduction mode, the binding load can be adjusted in the vertical direction within a range from a binding load F7 to a binding load F8 on the basis of the standard binding load F2.

In FIG. 34, when the selected operation mode is the normal mode, the process proceeds from S22 to S24 where the binding operation is executed so that the binding load F1 or the adjusted binding load F1' is generated. When the selected operation mode is the paper dust reduction mode, the process proceeds from S22 to S26 where the binding operation is executed so that the binding load F2 or the adjusted binding load F2' is generated.

As described above, according to the exemplary embodiment, since the binding load is reduced in the high-humidity environment, it is possible to reduce the possibility of occurrence of paper dust clogging. As a result, it is possible to prevent or reduce the deterioration of the binding part quality due to paper dust clogging, and at the same time, it is possible to protect the needleless binding device. Meanwhile, in the low-humidity environment, since the binding operation is performed with a sufficient binding load, the quality of the binding part can be maintained or improved.

FIG. 39 illustrates a second example of the operation mode selection method. In the second example, as the situation 456, the humidity condition (environmental condition) and the sheet state are determined. That is, it is determined whether the sheet is under the high-humidity condition or under the low-humidity condition and it is also determined whether the sheet is in the moisture-uncontrolled state or in the moisture-controlled state. The operation mode 458 is automatically selected from the combination of the two determined results.

Figure 40:
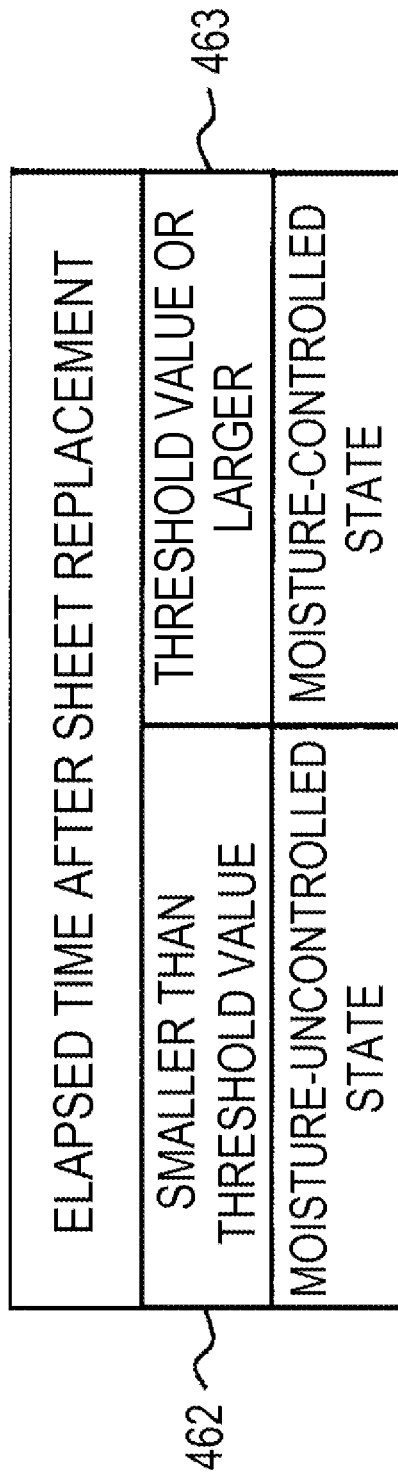
FIG. 40 is a view for explaining a method of determining whether or not a sheet is in a moisture-controlled state.

For example, as illustrated in FIG. 40, it may be determined based on the elapsed time after sheet loading whether the sheet is in the moisture-uncontrolled state or in the moisture-controlled state. As described above, by counting with a timer the elapsed time from the point of time of setting of the sheet feeding cassette after loading the stack of sheets and determining whether the elapsed time is less than a threshold value (see reference numeral 462) or greater than the threshold value (see reference numeral 463), it may be determined whether the sheet is in the moisture-uncontrolled state or in the moisture-controlled state. The threshold value may be arbitrarily determined according to the situation. It may be determined by another method whether the sheet is in the moisture-uncontrolled state or in the moisture-controlled state.

In FIG. 39, when the sheet is under the high-humidity condition and in the moisture-controlled state, the paper dust reduction mode is selected as the operation mode 458. The binding load as the binding operation condition in the paper dust reduction mode is, for example, 4,500 N. In the case of other combinations, the normal mode is selected as the operation mode 458. The binding load as the binding operation condition in the normal mode is, for example, 5,000 N.

FIG. 41 illustrates a third example of the operation mode selection method. In addition to the humidity condition (low-humidity condition/high-humidity condition) and the sheet state (the moisture-uncontrolled state/moisture-controlled state), the sheet type (plain paper/recycled paper) is taken into consideration as the situation 464. As illustrated, the operation mode 465 is selected according to the combination thereof. In the illustrated example, under the low-humidity condition, the normal modes 1 to 4 are selected according to the sheet state and the sheet type. Under the high-humidity condition, the paper dust reduction modes 1 to 4 are selected according to the sheet state and sheet type. The standard binding load 466 is individually determined for each individual operation mode.

All in all, the standard binding load determined for the paper dust reduction modes 1 to 4 is lower than the standard binding load determined for the normal modes 1 to 4. As for a recycled paper, since it tends to cause paper dust, the binding load is lower than that in a case where a plain paper is used. When the recycled paper is used under the high-humidity condition and in the moisture-controlled state, the standard binding load is the lowest. Each of the standard binding loads described in this specification is an example, and the standard binding load may be arbitrarily determined for each individual operation mode.

Figure 42:
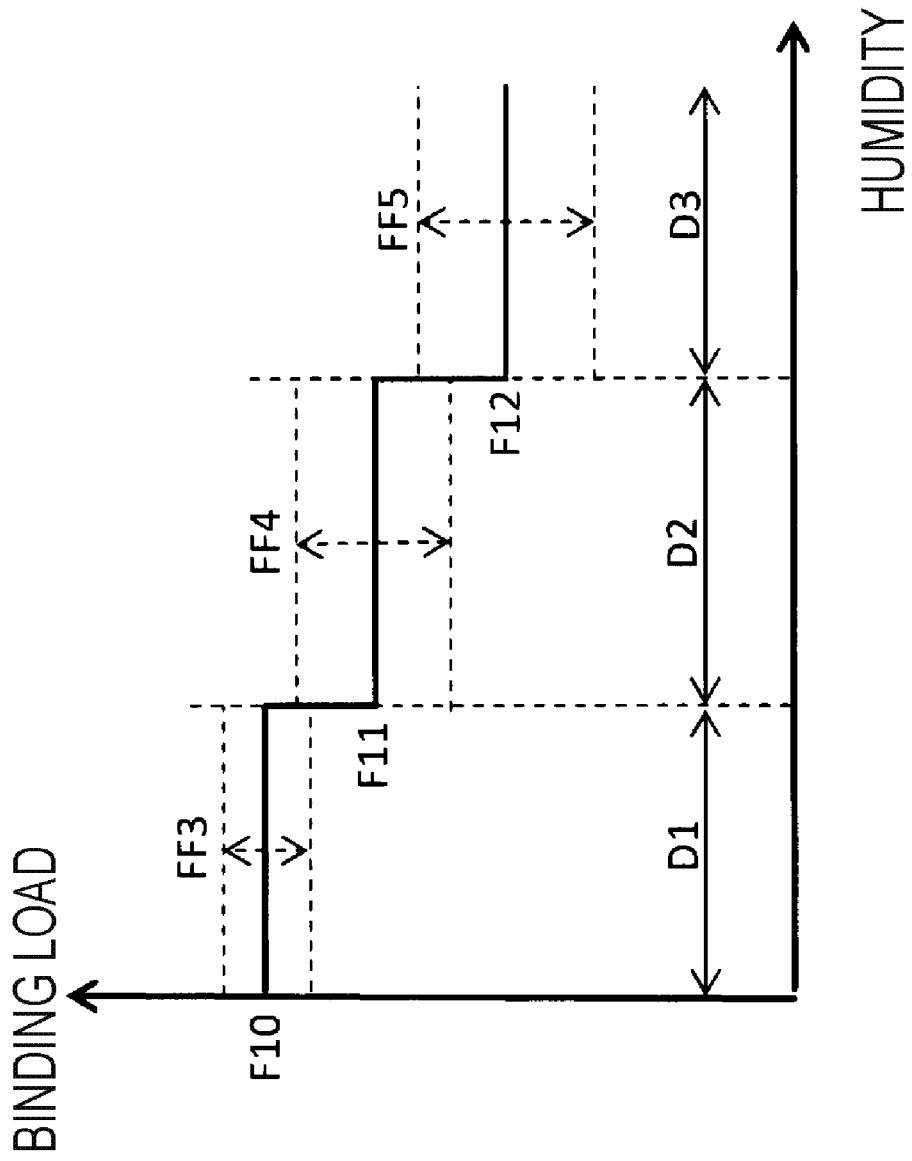
FIG. 42 is a view illustrating a stepwise switching of a standard binding load.

As illustrated in FIG. 42, the standard binding load may be changed by three or more levels according to the magnitude of humidity. In the illustrated example, when the humidity is within a range D1, a binding load F10 is set as the standard binding load. When the humidity is within a range D2, a binding load F11 is set as the standard binding load. When the humidity is within a range D3, a binding load F12 is set as the standard binding load. Binding load ranges that can be manually adjusted in the ranges D1, D2, and D3 are denoted by FF3, FF4, and FF5, respectively. In the illustrated example, the adjustable ranges are different for the respective humidity ranges D1, D2, and D3.

Figure 43:
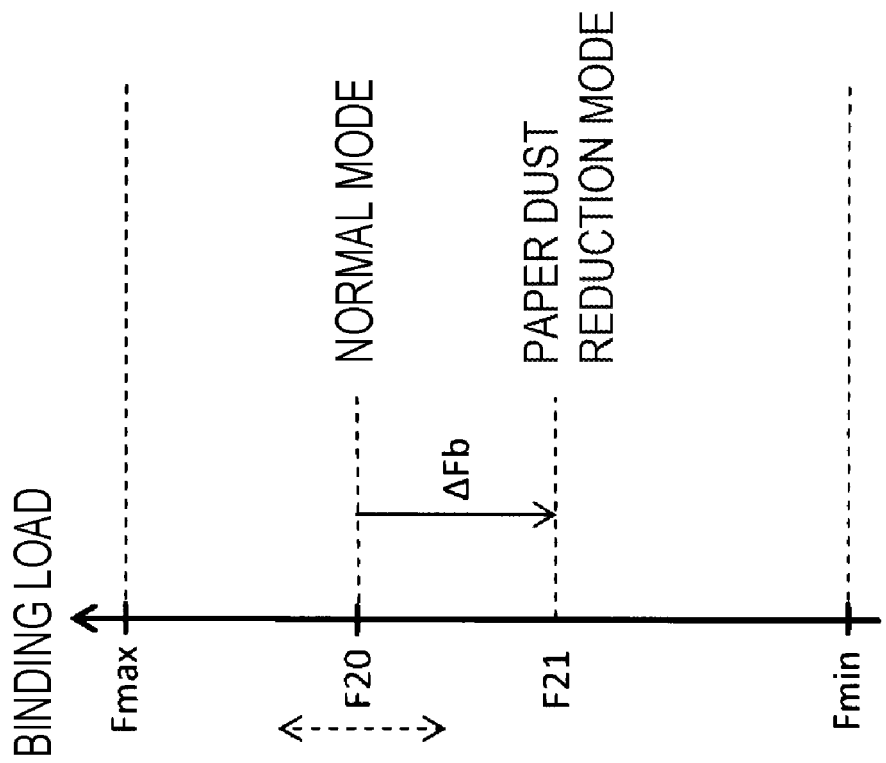
FIG. 43 is a view illustrating a modification in which the standard binding load is manually specified.

Further, as illustrated in FIG. 43, a binding load F21 in the paper dust reduction mode may be determined by allowing the user to designate a binding load F20 in the normal mode and subtracting a certain load ΔFb therefrom. In a case where there are plural modes, plural binding loads in plural paper dust reduction modes may be determined by uniformly subtracting a certain binding load in this manner.

Figure 44:
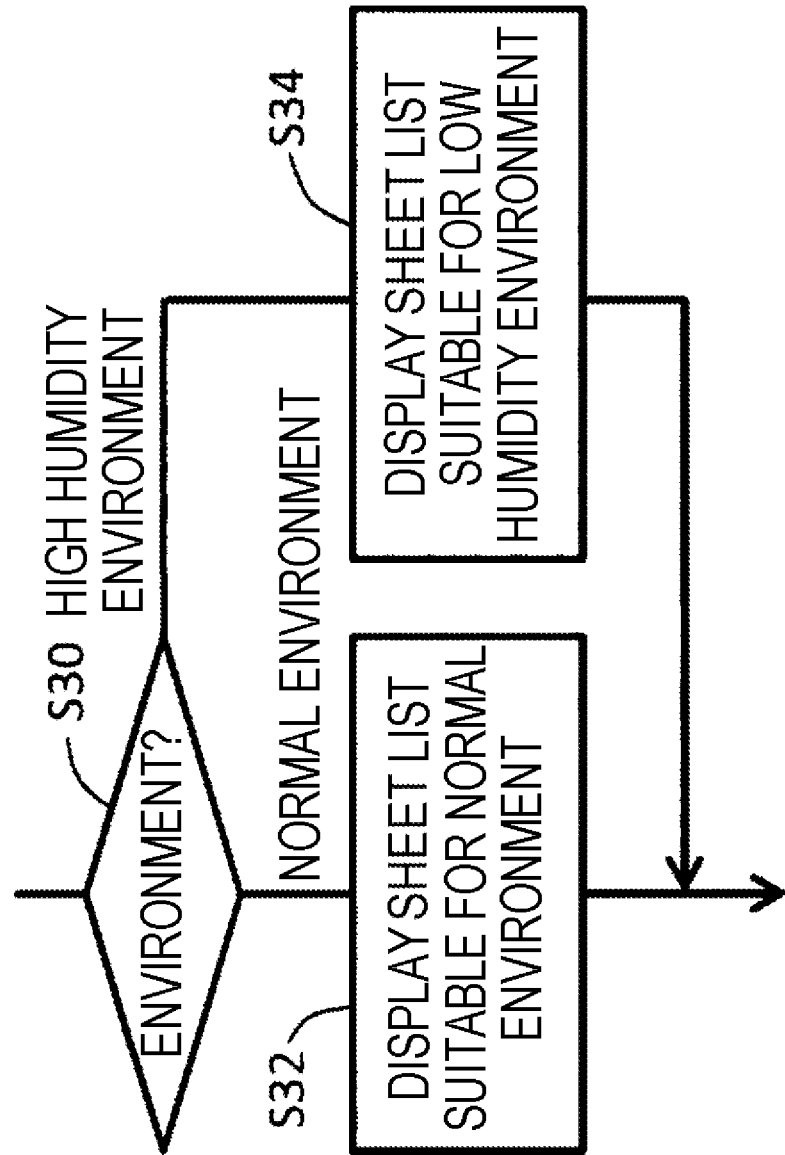
FIG. 44 is a view illustrating a first example of a display control before a binding operation.

Sheet list display control will be described with reference to FIGS. 44 to 22. This is to urge the user to use a sheet (sheet type) suitable for the environment before execution of needleless binding. The operation illustrated in FIG. 44 is executed, for example, when needleless binding is designated by the user.

In S30, the current environment is determined. Specifically, it is determined whether the current environment is the normal environment or the high-humidity environment, based on the detected humidity. When the current environment is the normal environment, a sheet list suitable for the environment is displayed on the UI in S32. When the current environment is the high-humidity environment, a sheet list suitable for the environment is displayed on the UI in S34. In order to control the display of the sheet list, a table as illustrated in FIG. 45 may be managed. The table includes a sheet list 472 suitable for the normal environment and a sheet list 474 suitable for the high-humidity environment. In S32 and S34, for example, a message 476 as illustrated in FIG. 46 is displayed on the UI. The message 476 includes a recommended sheet list 478. The contents of the message 476 and the contents of the sheet list 478 vary according to the environment. In addition, this display control may be applied to an image forming apparatus having no paper dust reduction mode.

Figure 49:
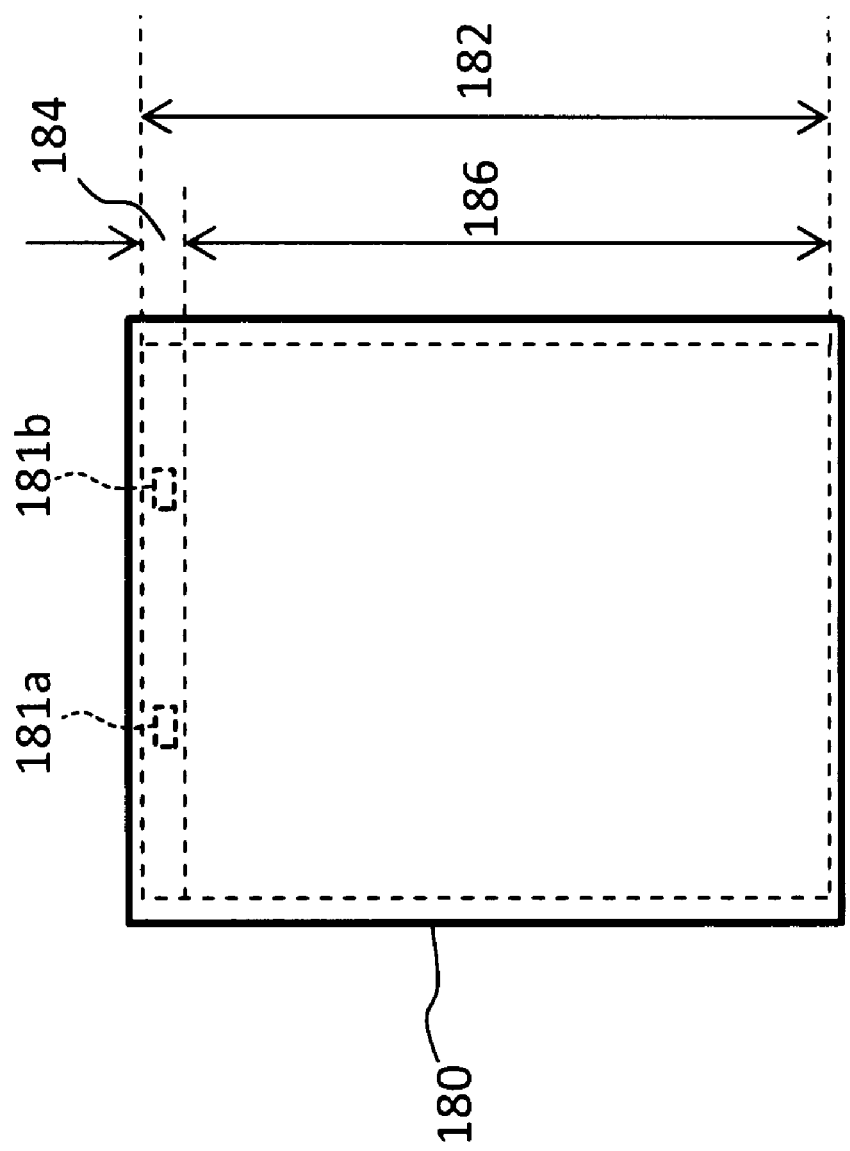
FIG. 49 is a view for explaining an image erasing process.

The control of display recommending an image erasing process will be described with reference to FIGS. 47 to 49. The control is to recommend the image erasing process to the user according to the environment before executing the needleless binding. In FIG. 47, in S40, it is determined whether the current environment is the normal environment or the high-humidity environment. When the current environment is the high-humidity environment, a message recommending the image erasing process is displayed to the user in S42. For example, a display example is illustrated in FIG. 48. When the image erasing process is selected, for example, the image erasing process as illustrated in FIG. 49 is executed. In the illustrated example, it is an image area 182 that an image exists in the entire sheet 180. Binding target portions 181a and 181b are included in the upper area 184 in the image area 182. In the illustrated example, an area 186 excluding the upper area 184 is an area where an image is actually formed. The upper area 184 is an area out of an image forming target. That is, by putting a portion of the image out of the print target, it is ensured that there is no image in the binding target portion. This function is also called a frame erasing process. A portion to be erased may be limited to the binding target portion. Since the position and number of binding target portions are already known in the image forming apparatus, the frame erasing processing conditions may be automatically determined according to the position and number of binding target portions. Further, it is also possible to prevent the binding target portion from overlapping with the image by reducing the size of the image or changing the printing position. In addition, this display control may be applied to an image forming apparatus having no paper dust reduction mode.

Figure 50:
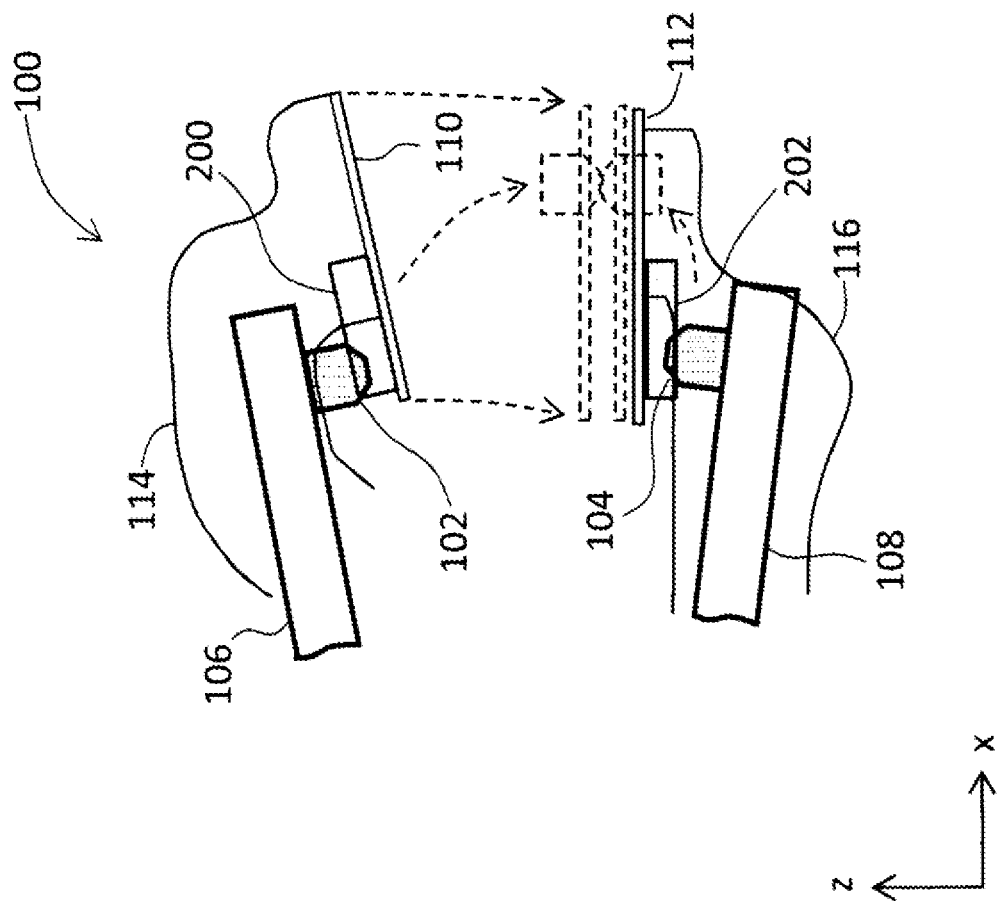
FIG. 50 is a view illustrating an arrangement of a pair of brush members.

FIG. 50 illustrates the xz plane of a pair of brush members 200 and 202 constituting an interdental cleaning unit. The brush member 200 is provided upward on the upper surface side of the pressing piece 110. The brush member 202 is provided downward on the lower surface side of the pressing member.

As described previously, in the course of binding movement, the upper tooth row 102 slides relative to the pressing piece 110. At that time, the brush member 200 comes in contact with the upper tooth row 102 to scrap away the paper dust existing between the teeth. Sliding movement in the opposite direction also occurs in the course of returning operation and paper dust cleaning is performed on the upper tooth row 102. Meanwhile, the lower tooth row 104 slides relative to the pressing piece 112 in the course of binding movement. At that time, the brush member 202 comes in contact with the lower tooth row to scrap away the paper dust existing between the teeth. This also applies to the returning operation process. A place where the pair of tooth rows 102 and 104 is cleaned with the pair of brush members 200 and 202 is different from a place where the bundle of sheets is bound by the pair of tooth rows 102 and 104, as illustrated in FIG. 50, so that the paper dust scrapped away by the pair of brush members 200 and 202 does not affect the binding force.

Figure 51:
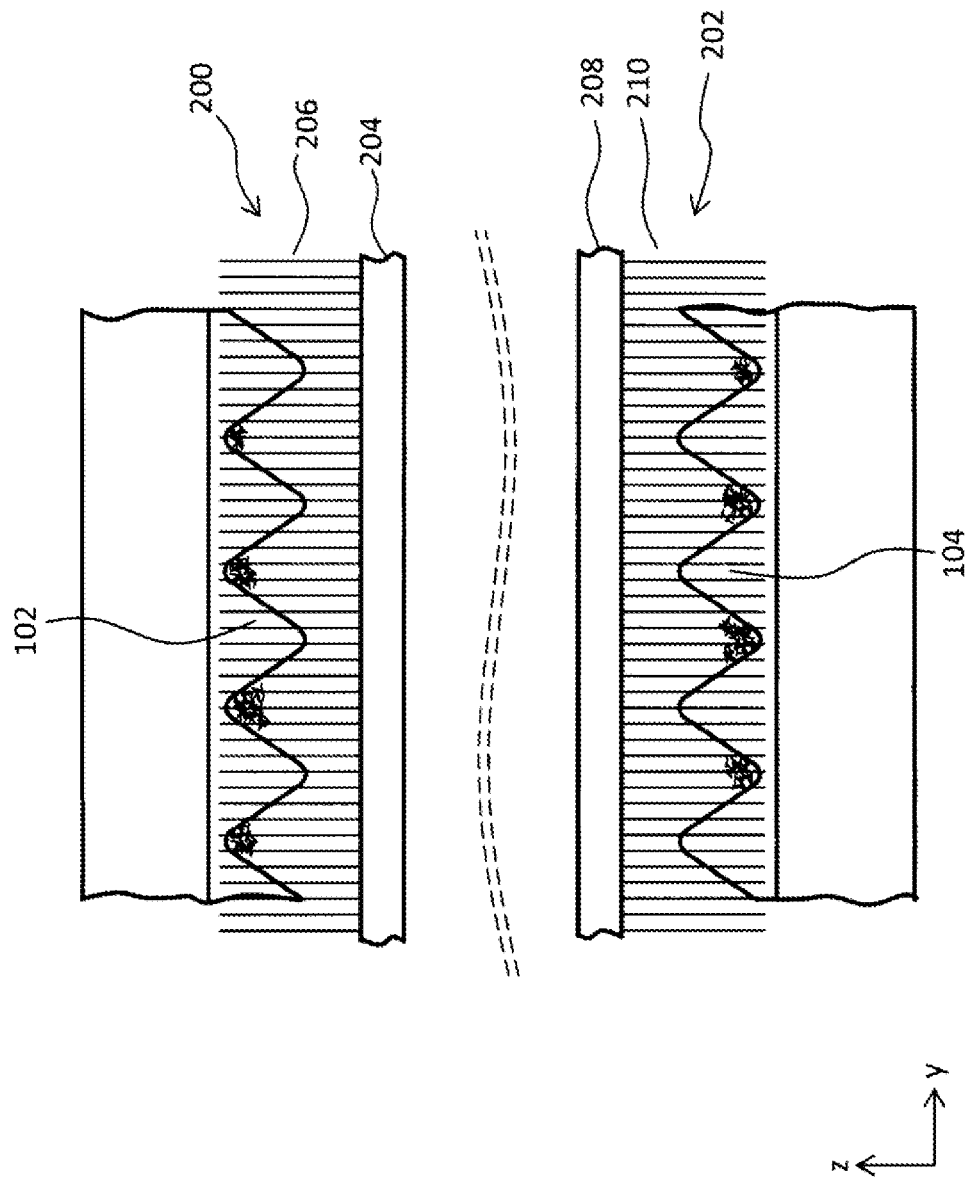
FIG. 51 is a view illustrating an operation of a pair of brush members.

FIG. 51 is an enlarged view of the yz plane of the pair of brush members 200 and 202. Here, the paper dust remains in plural concave portions in the upper tooth row 102 and the lower tooth row 104. The brush members 200 and 202 includes bases 204 and 208 and flock groups 206 and 210, respectively. In the course of relative movement of the tooth rows 102 and 104 with respect to the pressing pieces 110 and 112, plural linear bodies constituting the flock groups 206 and 210 enter into the respective concave portions to brush the paper dust out of the concave portions. Such interdental cleaning is performed twice per binding process.

As described above, since brushing of the pair of tooth rows 102 and 104 can be performed using the relative movement of the pair of tooth rows 102 and 104 with respect to the pair of pressing pieces 110 and 112, it is possible to prevent or reduce the residual paper dust with the simple configuration. On the premise of two interdental cleaning (frequent interdental cleaning) in the unit of binding process, since the possibility of paper dust residue and paper dust deposit growth can be lowered, the binding load in the paper dust reduction mode does not have to be excessively low. That is, it is possible to achieve both prevention of paper dust clogging and maintenance of binding part quality. Each of the brush members 200 and 202 may be disposed so as to be exchangeable.

An interdental cleaning operation may be executed separately from the binding processing operation. The interdental cleaning may be executed at, for example, a timing at which the necessity of cleaning is detected, a timing at which a cleaning instruction from the user is inputted, or a timing at which the preset time condition is satisfied. At the time of interdental cleaning not accompanied by the binding processing operation, the movement of the pair of brush members may be stopped at the point of time when the pair of brushes pass over the pair of tooth rows in the course of binding movement and then the pair of brush members may be returned. The pair of brush members may be repeatedly reciprocated in a state where the pair of brush members is in contact with the pair of tooth rows. In addition, the cleaning force of the pair of brush members may be adjusted based on the output of the environment sensor. The adjustment of the cleaning force can generally be performed by adjusting a force with which each brush member is pressed against each tooth row. The cleaning force may be adjusted by varying the relative speed of each brush member to each tooth row. The frequency of interdental cleaning may be adjusted based on the output of the environment sensor. The controller functions as a unit for controlling the interdental cleaning operation and adjusting the interdental cleaning condition. Other parts may be responsible for that function.

(4) Summary of Disclosure

The image forming apparatus according to the exemplary embodiment includes a needleless binding device and a controller. The needleless binding device has a pair of tooth rows and is configured to form a recessed or raised impression as a binding part by pinching a bundle of sheets therebetween. The controller controls the operation of the needleless binding device according to an operation mode selected from a group of operation modes including a normal mode and a paper dust reduction mode. When the paper dust reduction mode is selected, the controller uses a binding operation condition under which paper dust is less likely to occur than under a binding operation condition for use when the normal mode is selected.

With this configuration, not only the normal mode but also the paper dust reduction mode (which may be referred to as a paper dust clogging reduction mode) are provided as modes for operation of the needleless binding device, which makes it possible to execute the paper dust reduction mode automatically or manually in a situation where paper dust (in particular, paper dust residue) is likely to occur or in a situation where it is desired to reduce the possibility of severe paper dust clogging. Thus, it is possible to reduce the residual amount of paper dust or to reduce the possibility of paper dust clogging.

Experiments conducted by the inventors have revealed that paper dust clogging is more likely to occur in a high-humidity (particularly, high-temperature, high-humidity) environment than in a low-humidity (particularly, low-temperature, low-humidity) environment. Generally, in the high-humidity environment, the binding part can be formed with constant quality even under a lower binding load. Therefore, in the exemplary embodiment, when the paper dust reduction mode selection condition including the high-humidity condition is satisfied, the paper dust reduction mode is selected and the needleless binding is executed under a lower binding load.

In the exemplary embodiment, the normal mode and the paper dust reduction mode are in a relative relationship from the viewpoint of the binding load. In the exemplary embodiment, the binding load in the normal mode is higher than the binding load in the paper dust reduction mode. In other words, the binding load in the paper dust reduction mode is lower than the binding load in the normal mode. During execution of the paper dust reduction mode, the binding load may be changed stepwisely or continuously according to other conditions. For example, the binding load may be changed according to the number of sheets to be bound. Operation modes other than the two operation modes may be provided. The binding operation condition may include, in addition to the binding load, for example, a binding operation speed. Paper dust clogging may be prevented or reduced by reducing the binding operation speed according to circumstances. In the paper dust reduction mode, both the binding load and the binding operation speed may be lowered.

In the exemplary embodiment, the controller selects an operation mode based on at least an output from the environment sensor. Whether or not paper dust or paper dust clogging is more likely to occur is determined based on a value detected by the environment sensor. In the exemplary embodiment, the environment sensor is a sensor that detects at least humidity. The controller selects the paper dust reduction mode when the paper dust reduction mode selection condition is satisfied, which includes the result that the detected humidity satisfies a high-humidity condition. In this manner, the paper dust reduction mode is automatically selected according to the environment. This reduces a burden on the user. A temperature sensor may be provided as an environment sensor, or a humidity sensor and a temperature sensor may be provided as environment sensors.

In the exemplary embodiment, the paper dust reduction mode selection condition further includes a condition under which the bundle of sheets satisfies a moisture-controlled state, and the controller selects the paper dust reduction mode based on satisfaction of the high-humidity condition and satisfaction of the moisture-controlled state. At the time of loading sheets, usually, a wrapping sheet with which a stack of sheets is wrapped is removed, and the stack of sheets exposed accordingly is accommodated in the sheet feeding cassette. The environment begins to have an influence on each sheet from that point of time. In general, the sheet moisture content increases in the high-humidity environment and decreases in the low-humidity environment. Therefore, in the exemplary embodiment, when the operation mode is selected, whether or not the bundle of sheets for needleless binding satisfies the moisture-controlled state is taken into consideration. For example, in the high-humidity environment, when the bundle of sheets is in the moisture-controlled state, the paper dust reduction mode is selected. The moisture-controlled state is a state in which the sheet moisture content is in equilibrium to some extent depending on the environmental humidity.

In the exemplary embodiment, the controller determines whether or not the bundle of sheets satisfies the moisture-controlled state based on the elapsed time after the sheet loading. According to this, it can be determined whether or not the bundle of sheets is in the moisture-controlled state based on the temporal standard. The beginning of the elapsed time is determined as, for example, a time at which running out of sheet is detected, or a time at which a sheet feeding cassette is set after the detection of running out of sheet and after sheet loading (a time when the sheet feed preparation is completed). In the exemplary embodiment, there are plural sheet feeding cassettes and the elapsed time is managed for each sheet feeding cassette. In addition, it is determined whether or not the bundle of sheets for needleless binding is in the moisture-controlled state based on the elapsed time corresponding to the bundle of sheets to be bound without needle. Even when it is impossible to strictly specify the opening time, it can be determined whether or not the bundle of sheets is in the moisture-controlled state with a certain probability, which makes it possible to improve the convenience or enhance the reliability of the needleless binding operation in contrast to a case where the sheet state is not taken into account at all.

In the exemplary embodiment, the paper dust reduction mode selection condition further includes a sheet state satisfied by each sheet of the bundle of sheets, and the controller selects the paper dust reduction mode based on the satisfaction of the high-humidity condition and the satisfaction of the sheet state. The amount of paper dust and the holding force of the binding part vary depending on the sheet type. Therefore, when the operation mode is selected, whether or not the sheet state is satisfied is taken into consideration. The sheet state includes, for example, the sheet type such as a plain paper and a recycled paper.

In the exemplary embodiment, the binding load in the paper dust reduction mode is a standard binding load. The apparatus includes an adjustment unit for manually adjusting the standard binding load. The controller controls the operation of the needleless binding mechanism according to the binding load set after the adjustment. With this configuration, the binding operation can be performed under the adjusted binding load even when the paper dust reduction mode is selected. This makes it possible to adapt the binding operation conditions to specific situations and needs. In the exemplary embodiment, the standard binding load is an upper limit value in an adjustable range and is lowered by the adjustment unit. Alternatively, the standard binding load is an intermediate value in the adjustable range and can be adjusted up and down by the adjustment unit. The intermediate value is a reference value, and a value other than the median value may be employed as the intermediate value.

In the exemplary embodiment, the controller does not select the paper dust reduction mode when the user makes an input to turn off the function of automatically selecting the paper dust reduction mode. When it is desired to prioritize the quality of the binding part rather than the reduction of the possibility of paper dust clogging, the function of automatically selecting the paper dust reduction mode is turned off. In the exemplary embodiment, the controller does not select the function of automatically selecting the paper dust reduction mode when the sheet state is not suitable for the paper dust reduction mode. For example, when the holding force of the binding part in the sheets tends to decrease, the normal mode is selected, for example, in a case where an image is included in the binding part.

In another aspect, the image forming apparatus according to the exemplary embodiment includes a needleless binding device that has a pair of tooth rows and is configured to form a recessed or raised impression as a binding part by pinching a bundle of sheets therebetween, and a controller configured to control the operation of the needleless binding device and to apply a binding load that is less likely to cause paper dust clogging under a first condition satisfying a high-humidity condition than under a second condition satisfying a low-humidity condition. Under the first condition, a binding load that is less likely to cause paper dust clogging is used during formation of the binding part.

In the exemplary embodiment, the needleless binding device has an interdental cleaning unit for performing interdental cleaning on a pair of tooth rows. With this configuration, it is possible to reduce the possibility of occurrence of paper dust clogging in combination of the interdental cleaning and the paper dust reduction mode. The interdental cleaning is performed each time the binding process is performed or at a necessary timing. In the exemplary embodiment, the interdental cleaning unit includes a pair of brush members for performing the interdental cleaning when the pair of tooth rows moves. When brushing is performed using one or both of the binding operation and the returning operation, the number of parts may be reduced. Paper dust may be removed from the space between the teeth by methods other than the brushing. For example, jet air spraying or other methods may be used. The interdental cleaning unit may be provided for a needleless binding device having no paper dust reduction mode.

In such an aspect, the image forming apparatus according to the exemplary embodiment includes a needleless binding device that has a pair of tooth rows and is configured to form a recessed or raised impression as a binding part by pinching a bundle of sheets therebetween, and an interdental cleaning unit for removing paper dust from the pair of tooth rows.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
    a needleless binding device configured to form a recessed or raised impression as a needleless binding part by performing needleless binding on a bundle of sheets;
    an environment sensor; and
    a controller configured to perform, based on a value detected by the environment sensor, control to display a confirmation image requesting a user to make confirmation on the needleless binding prior to execution of the needleless binding.

2. The image forming apparatus according to claim 1, wherein
    the confirmation image includes a message to request making confirmation on at least one item affecting quality of the needleless binding part under a current environment.

3. The image forming apparatus according to claim 1, wherein
    the confirmation image includes a message to prompt changing the needleless binding to needle binding.

* * * * *